US012574968B2

(12) United States Patent
Ko et al.

(10) Patent No.: US 12,574,968 B2
(45) Date of Patent: Mar. 10, 2026

(54) METHOD AND WIRELESS COMMUNICATION TERMINAL FOR TRANSMITTING/RECEIVING FRAME IN WIRELESS COMMUNICATION SYSTEM

(71) Applicant: WILUS INSTITUTE OF STANDARDS AND TECHNOLOGY INC., Gyeonggi-do (KR)

(72) Inventors: Geonjung Ko, Gyeonggi-do (KR); Juhyung Son, Gyeonggi-do (KR); Sanghyun Kim, Seoul (KR); Hanseul Hong, Seoul (KR); Jinsam Kwak, Gyeonggi-do (KR)

(73) Assignee: WILUS INSTITUTE OF STANDARDS AND TECHNOLOGY INC., Gyeonggi-do (KR)

( * ) Notice: Subject to any disclaimer, the term of this patent is extended or adjusted under 35 U.S.C. 154(b) by 297 days.

(21) Appl. No.: 18/132,367

(22) Filed: Apr. 8, 2023

(65) Prior Publication Data

US 2023/0262768 A1 Aug. 17, 2023

Related U.S. Application Data

(63) Continuation of application No. PCT/KR2021/013948, filed on Oct. 8, 2021.

(30) Foreign Application Priority Data

Oct. 8, 2020 (KR) ........................ 10-2020-0130622
Oct. 12, 2020 (KR) ........................ 10-2020-0131504
(Continued)

(51) Int. Cl.
*H04W 74/0816* (2024.01)
*H04W 74/04* (2009.01)

(52) U.S. Cl.
CPC ....... *H04W 74/0816* (2013.01); *H04W 74/04* (2013.01)

(58) Field of Classification Search
None
See application file for complete search history.

(56) References Cited

U.S. PATENT DOCUMENTS

2017/0195954 A1 7/2017 Ghosh
2017/0257888 A1 9/2017 Kneckt et al.
(Continued)

FOREIGN PATENT DOCUMENTS

CN 107743721 2/2018
CN 109155977 A 1/2019
(Continued)

OTHER PUBLICATIONS

Office Action dated Nov. 5, 2024 for Japanese Patent Application No. 2023-521645 and its English translation provided by Applicant's foreign counsel.
(Continued)

*Primary Examiner* — Anh Vu H Ly
(74) *Attorney, Agent, or Firm* — EIP US LLP

(57) ABSTRACT

Disclosed is a method for transmitting a frame of a wireless communication system. A non-AP STA receives a beacon frame comprising a request type field from an AP and can receive a downlink frame or transmit an uplink frame in accordance with a specific field value included in the beacon frame. Here, the request type field comprises a specific field for indicating a target wake time (TWT) for a low latency operation, and, if the value of the specific field is set as a first specific value, a broadcast TWT service period (SP) is a TWT SP for the low latency operation.

22 Claims, 64 Drawing Sheets

(30)     Foreign Application Priority Data

Nov. 10, 2020    (KR) ........................ 10-2020-0149759
Dec. 4, 2020     (KR) ........................ 10-2020-0169023

(56)          References Cited

U.S. PATENT DOCUMENTS

| | | | | |
|---|---|---|---|---|
| 2019/0253967 | A1 | 8/2019 | Xiao et al. | |
| 2021/0329500 | A1* | 10/2021 | Cariou | H04W 74/002 |
| 2021/0360646 | A1* | 11/2021 | Chu | H04W 72/569 |
| 2022/0078844 | A1* | 3/2022 | Cherian | H04W 74/08 |
| 2022/0110053 | A1* | 4/2022 | Chu | H04W 52/0216 |
| 2023/0247668 | A1* | 8/2023 | Akhmetov | H04W 74/0816 |
| | | | | 370/329 |

FOREIGN PATENT DOCUMENTS

| | | |
|---|---|---|
| CN | 110784937 | 2/2020 |
| CN | 110999415 A | 4/2020 |
| CN | 114080049 | 2/2022 |
| KR | 10-2015-0030178 | 3/2015 |
| KR | 10-2020-0028208 | 3/2020 |
| WO | 2017/026807 | 2/2017 |
| WO | 2020/013874 | 1/2020 |
| WO | 2020/040587 | 2/2020 |
| WO | 2022/075821 | 4/2022 |

OTHER PUBLICATIONS

Office Action dated Nov. 15, 2024 for European Patent Application No. 21 878 071.6.
International Search Report for PCT/KR2021/013948 mailed on Feb. 4, 2022 and its English translation from WIPO (now published as WO 2022/075821).
Written Opinion of the International Searching Authority for PCT/KR2021/013948 mailed on Feb. 4, 2022 and its English translation by Google Translate (now published as WO 2022/075821).
Chunyu Hu et al.: "Protected TWT Enhancement for Latency Sensitive Traffic", IEEE 802.11-20/1046r1, Aug. 28, 2020, slides 1-20.
Jason Yuchen Guo et al.: "Multi Link Group Addressed Frame delivery for non-STR MLD", IEEE 802.11-20/0761r1, Aug. 5, 2020, slides 1-14.
Chunyu Hu et al.: "Protected TWT Enhancement for Latency Sensitive Traffic", IEEE 802.11-20/1046r5, Jul. 29, 2020, slides 1-18.
Boyce Yangbo et al.: "Access mechanisms to meet the requirements of low latency traffic", IEEE 802.11-20/1355r5, Sep. 9, 2020, slides 1-28.
Specification of U.S. Appl. No. 63/086,166, Title: "Frame Transmission for NS, EP and QoS Support", Liwen Chu et al.
Extended European Search Report dated Feb. 16, 2024 for European Patent Application No. 21878071.6.
Liwen Chu et al.: "Low Latency Support", Doc.: IEEE 802.11-20/1058r0, Oct. 7, 2020, slides 1-10.
Chunyu Hu et al.: "Protected TWT Enhancement for Latency Sensitive Traffic", IEEE 802.11-20/1046r3, Sep. 7, 2020, slides 1-17.
Office Action dated Feb. 19, 2024 for Indian Patent Application No. 202327026888.
Office Action dated Apr. 8, 2024 for Japanese Patent Application No. 2023-521645 and its English translation provided by Applicant's foreign counsel.
Office Action (1st) dated May 22, 2025 for Korean Patent Application No. 10-2023-7012098 and its English translation provided by Applicant's foreign counsel.
Office Action (1st) dated May 31, 2025 for Chinese Patent Application No. 202180069261.7 and its English translation provided by Applicant's foreign counsel.
Hearing Notice dated Jun. 26, 2025 for Indian Patent Application No. 202327026888 and its English translation.
Chinese Notice of Allowance issued in 202180069261.7, dated Oct. 14, 2025, 6 pgs.
European Search Report issued in 25201861.9, dated Oct. 24, 2025, 8 pgs.
Cavalcanti (Intel Corporation): "Enhancements for QoS and low latency in 802.11be R1", IEEE Draft; 11-20-1350-00-00BE-Enhancement-for-QoS-and-Low-Latency-in-802-11BE-RI, IEEE-SA Mentor, Piscataway, NJ USA/vol. 802.11 EHT; 802.11be Aug. 28, 2020 (Aug. 28, 2020), pp. 1-17, XP068172364, Retrieved from the Internet: URL:https://mentor.ieee.org/802.11/dcn/20/11-20-1350-00-00be-enhancements-for-qos-and-low-latency-in-802-11be-r1.pptx [retrieved on Aug. 28, 2020] * the whole document *.
Research on Power Management Technology in the MAC Layer of 802.11ah, Jun. 16, 2018, 傅新星, 《中国优秀硕士学位论文全文数据库 信息科技辑》 IEEE 802.11ah MAC 层功率管理技术研究, 67 pgs.
Korean Office Action issued in KR 10-2023-7012098 on Jan. 19, 2026, 8 pgs.

* cited by examiner

Communication Unit

Processor

Memory

220

260

(a) 11a/g PPDU (b) 11ax HE PPDU (c) 11be EHT PPDU (d) L-SIG
RL-SIG (e) U-SIG (f) MU PPDU
Format-specific bits

FIG.14

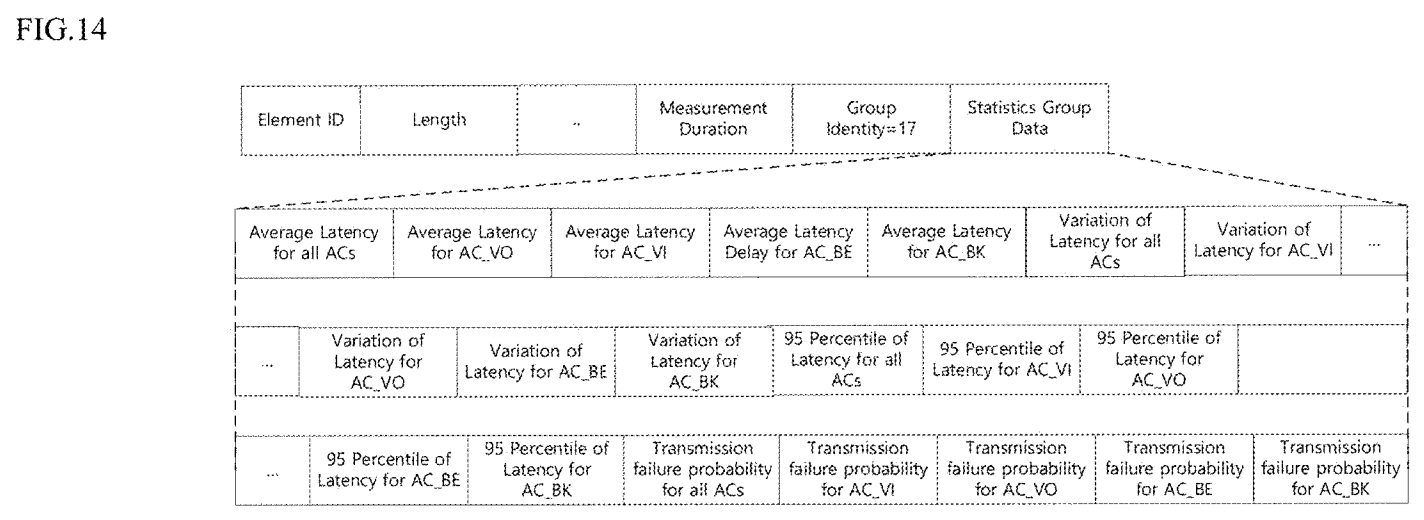

| Element ID | Length | .. | Measurement Duration | Group Identity=17 | Statistics Group Data |
|---|---|---|---|---|---|

| Average Latency for all ACs | Average Latency for AC_VO | Average Latency for AC_VI | Average Latency Delay for AC_BE | Average Latency for AC_BK | Variation of Latency for all ACs | Variation of Latency for AC_VI | ... |
|---|---|---|---|---|---|---|---|

| Variation of Latency for AC_VO | Variation of Latency for AC_BE | Variation of Latency for AC_BK | 95 Percentile of Latency for all ACs | 95 Percentile of Latency for AC_VI | 95 Percentile of Latency for AC_VO | |
|---|---|---|---|---|---|---|

| 95 Percentile of Latency for AC_BE | 95 Percentile of Latency for AC_BK | Transmission failure probability for all ACs | Transmission failure probability for AC_VI | Transmission failure probability for AC_VO | Transmission failure probability for AC_BE | Transmission failure probability for AC_BK |
|---|---|---|---|---|---|---|
| ... | | | | | | |

FIG.27
(a)
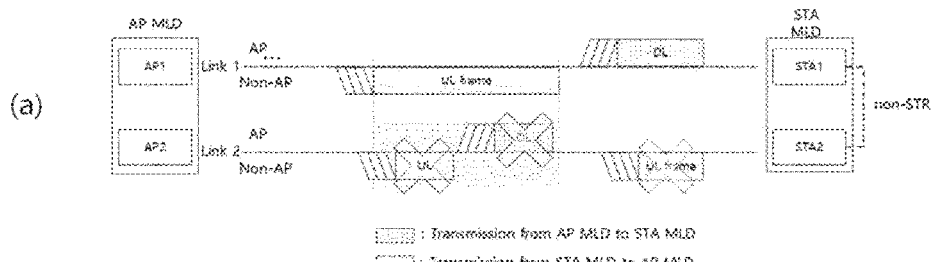
(b)
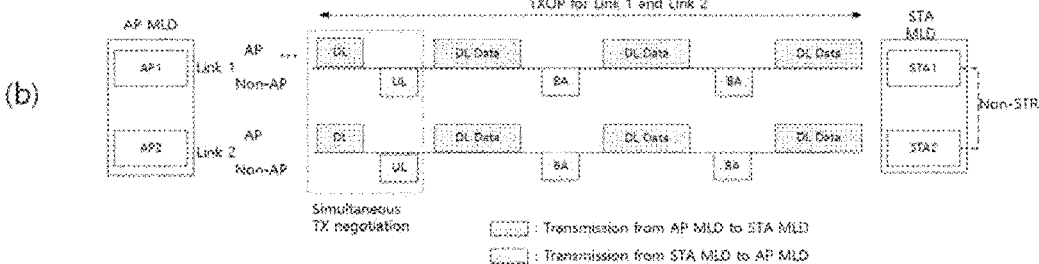
(c)
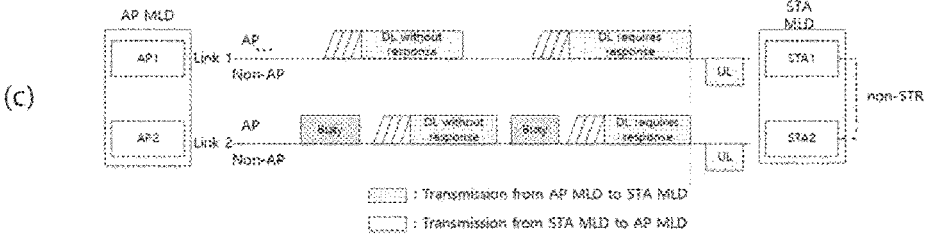

FIG.28
AP's operation
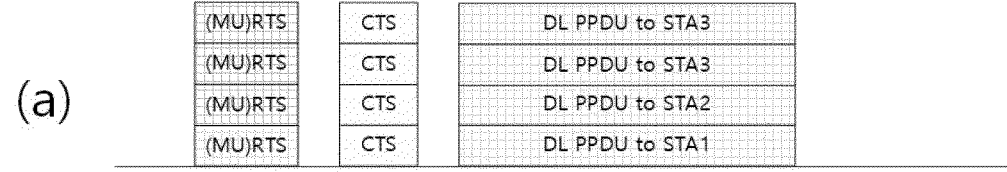
(a)
STA1's operation
(b)
STA2's operation
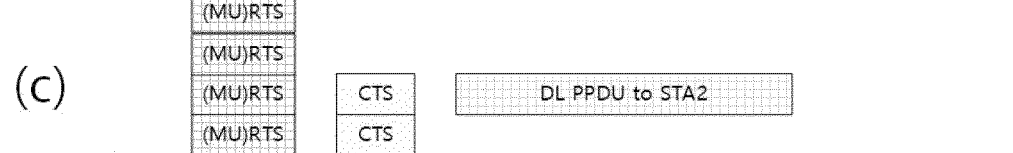
(c)
STA3's operation
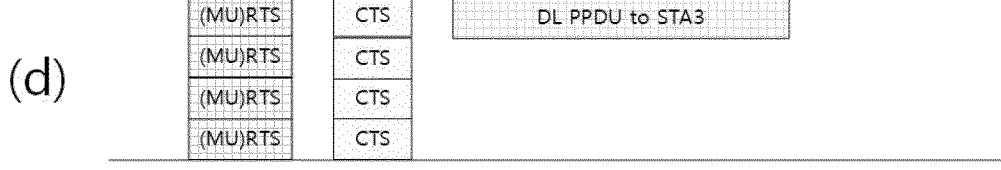
(d)
: Transmission from AP to non-AP STA
: Transmission from non-AP STA to AP FIG.33
(a)
| (MU)RTS | CTS | DL PPDU to STA3 |
| (MU)RTS | CTS | DL PPDU to STA2 |
| (MU)RTS | CTS | DL PPDU to STA1 |
(b)
| (MU)RTS |
| (MU)RTS |
| (MU)RTS | CTS | DL PPDU to STA1 |
(c)
| (MU)RTS |
| (MU)RTS | CTS | DL PPDU to STA2 |
| (MU)RTS |
(d)
| (MU)RTS | CTS | DL PPDU to STA3 |
| (MU)RTS | CTS |
| (MU)RTS | CTS |
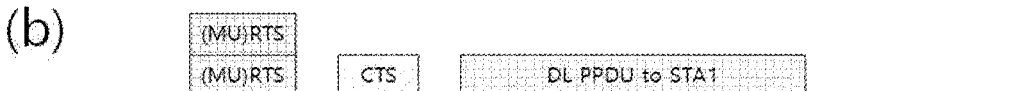 : Transmission from AP to non-AP STA
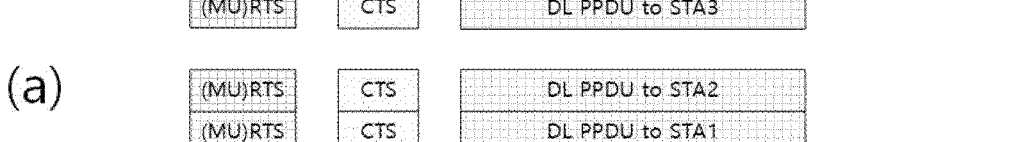 : Transmission from non-AP STA to AP

FIG.35

AP MLD's operation (a)

| (MU)RTS | CTS | DL PPDU to STA3 |
| (MU)RTS | CTS | |
| (MU)RTS | CTS | DL PPDU to STA2-1 |
| (MU)RTS | CTS | DL PPDU to STA1-1 |

Link 1

| (MU)RTS | CTS | DL PPDU to STA2-2 |
| (MU)RTS | CTS | |
| (MU)RTS | CTS | DL PPDU to STA1-2 |
| (MU)RTS | CTS | |

Link 2

STA MLD1(NSTR)'s operation (b)

| (MU)RTS | CTS | |
| (MU)RTS | CTS | |
| (MU)RTS | CTS | |
| (MU)RTS | CTS | DL PPDU to STA1-1 |

Link 1

| (MU)RTS | | |
| (MU)RTS | | |
| (MU)RTS | noCTS | DL PPDU to STA1-2 |
| (MU)RTS | noCTS | |

Link 2

STA MLD2(STR)'s operation (c)

| (MU)RTS | CTS | |
| (MU)RTS | CTS | |
| (MU)RTS | CTS | DL PPDU to STA2-1 |
| (MU)RTS | CTS | |

Link 1

| (MU)RTS | CTS | DL PPDU to STA2-1 |
| (MU)RTS | CTS | |
| (MU)RTS | CTS | |
| (MU)RTS | CTS | |

Link 2

[          ] : Transmission from AP to non-AP STA

[          ] : Transmission from non-AP STA to AP

FIG.36
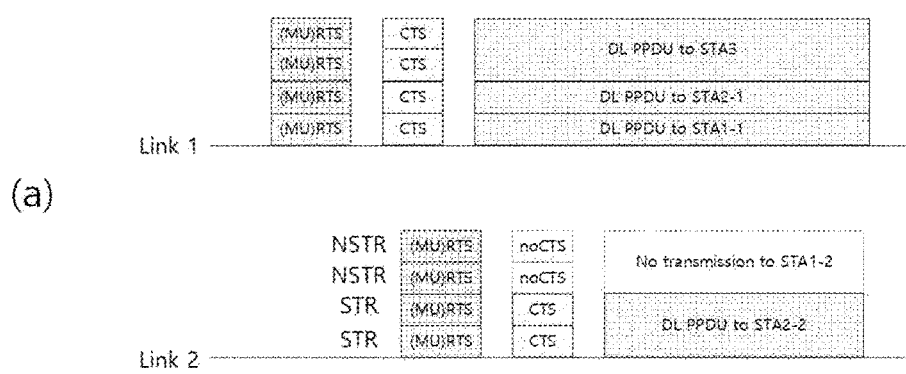
(a)
(b)
(c)
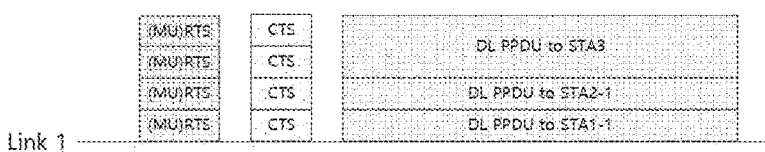
☐ : Transmission from AP to non-AP STA
☐ : Transmission from non-AP STA to AP FIG.42
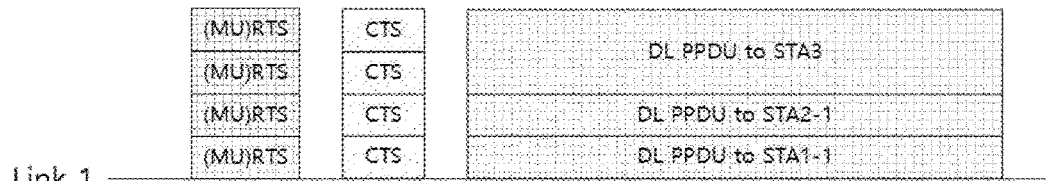
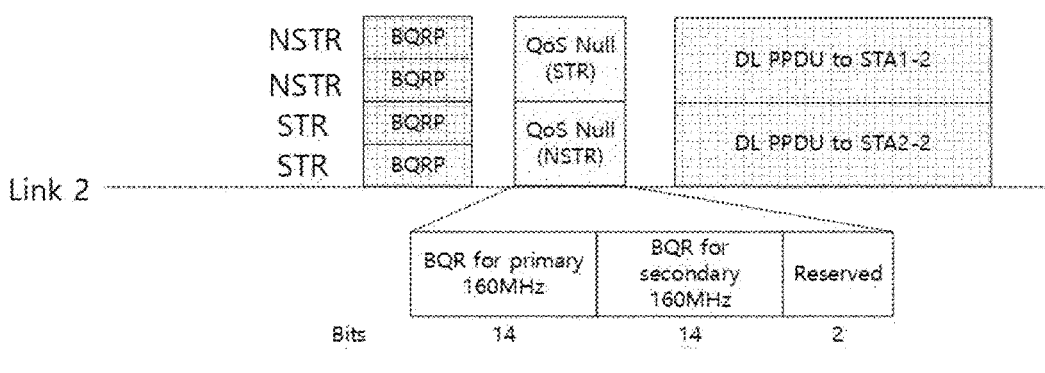

FIG.43
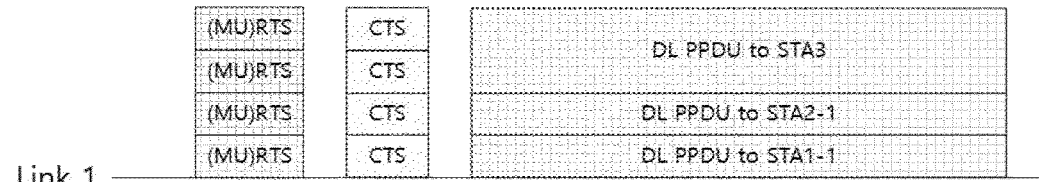
Link 1
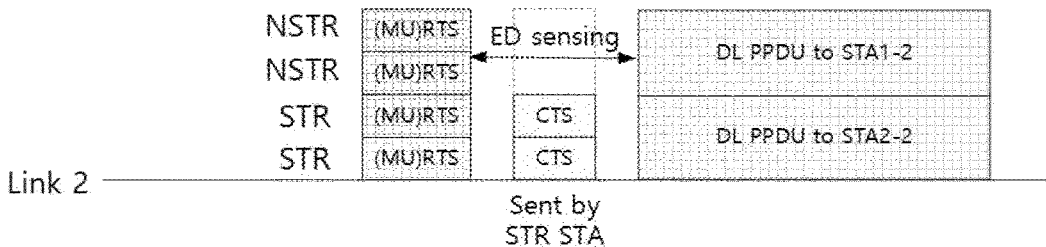
Link 2
Sent by
STR STA
☐ : Transmission from AP to non-AP STA
☐ : Transmission from non-AP STA to AP FIG.44
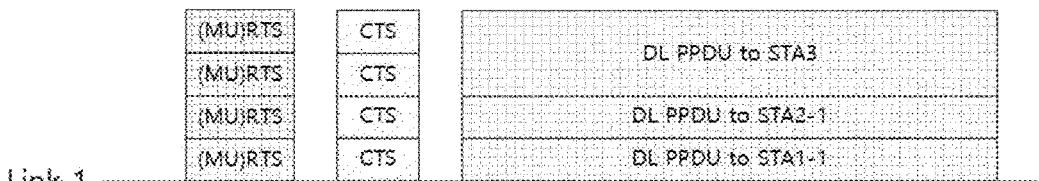
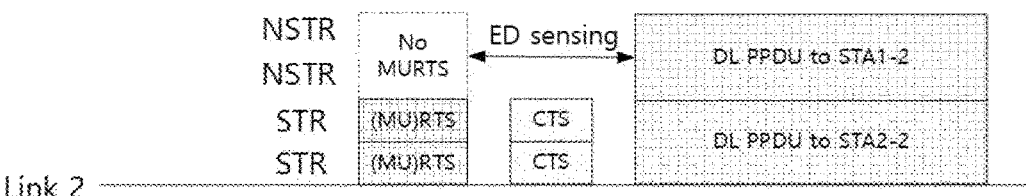

AP 1

Link 1
*Mandatory link*     STA 1

Data 5 not soliciting response

*Transmission end at or before transmission end on mandatory link*

AP 2

Link 2
*Optional link*     STA 2

Data 6 not soliciting response

: Transmission from STA MLD1 to AP MLD

: Transmission from AP MLD

METHOD AND WIRELESS COMMUNICATION TERMINAL FOR TRANSMITTING/RECEIVING FRAME IN WIRELESS COMMUNICATION SYSTEM

CROSS-REFERENCE TO RELATED APPLICATIONS

This application is a continuation of International Patent Application No. PCT/KR2021/013948 filed on Oct. 8, 2021, which claims the priority to Korean Patent Application No. 10-2020-0130622 filed in the Korean Intellectual Property Office on Oct. 8, 2020, Korean Patent Application No. 10-2020-0131504 filed in the Korean Intellectual Property Office on Oct. 12, 2020, Korean Patent Application No. 10-2020-0149759 filed in the Korean Intellectual Property Office on Nov. 10, 2020, and Korean Patent Application No. 10-2020-0169023 filed in the Korean Intellectual Property Office on Dec. 4, 2020, the entire contents of which are incorporated herein by reference.

TECHNICAL FIELD

The present disclosure relates to a wireless communication system and, more specifically, to a communication method, device, and system for transmitting or receiving a frame requiring a low latency operation.

BACKGROUND ART

In recent years, with supply expansion of mobile apparatuses, a wireless LAN technology that can provide a rapid wireless Internet service to the mobile apparatuses has been significantly spotlighted. The wireless LAN technology allows mobile apparatuses including a smart phone, a smart pad, a laptop computer, a portable multimedia player, an embedded apparatus, and the like to wirelessly access the Internet in home or a company or a specific service providing area based on a wireless communication technology in a short range.

Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an OFDM technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHz) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a wireless interface accepted by 802.11n, such as a wider wireless frequency bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHz, IEEE 802.11ad has been provided. The IEEE 802.11ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

As a wireless LAN standard after 802.11ac and 802.11ad, the IEEE 802.11ax (high efficiency WLAN, HEW) standard for providing a high-efficiency and high-performance wireless LAN communication technology in a high-density environment, in which APs and terminals are concentrated, is in the development completion stage. In an 802.11ax-based wireless LAN environment, communication with high frequency efficiency should be provided indoors/outdoors in the presence of high-density stations and access points (APs), and various technologies have been developed to implement the same.

In order to support new multimedia applications, such as high-definition video and real-time games, the development of a new wireless LAN standard has begun to increase a maximum transmission rate. In IEEE 802.11be (extremely high throughput, EHT), which is a 7th generation wireless LAN standard, development of standards is underway aiming at supporting a transmission rate of up to 30 Gbps via a wider bandwidth, an increased spatial stream, multi-AP cooperation, and the like in a 2.4/5/6 GHz band. IEEE 802.11be has proposed technologies including a 30 MHz bandwidth, a multi-link operation, a multi-access point (multi-AP) operation, and a retransmission operation (hybrid automatic repeat request HARQ), etc.

A multi-link operation may be performed in various types according to the operation scheme and implementation method thereof. However, this operation may face a problem that has not occurred in a conventional IEEE 802.11-based wireless LAN communication operation, and thus a definition for a detailed operation method of a multi-link operation is needed.

Meanwhile, this background section is written for improving understanding of the background of the disclosure, and may include contents other than a prior art already known to a person skilled in the art.

DISCLOSURE OF INVENTION

Technical Problem

The present disclosure is to enable a wireless access point to efficiently perform an operation of transmitting or receiving a frame requiring low latency time, and an aspect thereof is to provide a method, a device, and a system for a multi-link transmission operation using a wireless LAN.

In addition, an aspect of the present disclosure is to provide a method, a device, and a system for configuring an interval for restriction on transmission or reception to transmit or receive a frame requiring low latency time.

In addition, an aspect of the present disclosure is to provide a method, a device, and a system for effectively performing a frame transmission operation when a wireless access point or a station is unable to perform a simultaneous transmission or reception operation over multiple links during a multi-link operation.

The technical tasks to be achieved by the present specification is not limited to those mentioned above, and other technical tasks that are not mentioned above may be clearly understood to a person having common knowledge in the technical field to which the present disclosure belongs based on the description provided below.

Solution to Problem

A multi-link device (MLD) of a wireless communication system includes: a communication module; and a processor configured to control the communication module, wherein the processor is configured to receive a beacon frame including a request type field from an AP, the request type field including a particular field for indicating a target wake time (TWT) for a low latency operation, and receive a downlink frame or transmit an uplink frame according to a value of the particular field, wherein, when the value of the particular field is configured to be a first particular value, a broadcast TWT service period (SP) is a TWT SP for the low latency operation.

In addition, in the present disclosure, when the TWT SP for the low latency operation is configured, only a frame requiring low latency is transmittable during the TWT SP for the low latency operation.

In addition, in the present disclosure, the beacon frame further includes a quiet information element for protecting the TWT SP for the low latency operation.

In addition, in the present disclosure, an interval configured by the quiet information element and the TWT SP for the low latency operation have an identical start time.

In addition, in the present disclosure, when an interval configured by the quiet information element and a part or an entirety of the TWT SP for the low latency operation overlap with each other, a part or an entirety of an overlapping part of the interval configured by the quiet information element is disregarded.

In addition, in the present disclosure, an interval configured by the quiet information element is used for at least one STA to configure a NAV.

In addition, in the present disclosure, the NAV is configured for the interval configured by the quiet information element.

In addition, in the present disclosure, when the value of the particular field is configured to be a second particular value, the particular field indicates that transmission is restricted only in a type of a response frame for a downlink frame.

In addition, in the present disclosure, the beacon frame further includes a parameter field including a broadcast TWT information field, and the broadcast TWT information field includes information related to a TID for which frame transmission is restricted by the TWT for the low latency operation.

In addition, in the present disclosure, when the non-AP STA configures a multi-link device (MLD), the MLD is unable to transmit a frame through another link while receiving the beacon frame.

In addition, in the present disclosure, an operation of transmitting a frame is terminated before a start time of the TWT SP for the low latency operation.

Advantageous Effects of Invention

According to an embodiment of the present disclosure, a frame requiring low latency may be efficiently transmitted.

In addition, according to an embodiment of the present disclosure, an interval in which transmission of a frame requiring low latency is restricted may be configured to efficiently transmit the frame.

According to the present disclosure, when a wireless access point (AP) and an AP MLD including multiple wireless APs support an operation of transmitting or receiving a frame requiring low latency time, a particular interval enabling transmission of only a frame requiring low latency time is defined and notified of through a broadcast frame. When a wireless LAN station (STA) is to transmit or receive a frame meeting a corresponding requirement, the wireless LAN station performs a process of negotiating with an AP or an AP MLD to perform a corresponding operation. Information of the interval for low latency time is notified of through a beacon frame or a probe response frame. A method of notifying of and negotiating about the interval for low latency time is performed identically or similarly to a method of negotiating about a target wake time (TWT) operation. In order to efficiently perform a corresponding operation, an AP or an AP MLD cause an operated link to allow access of only terminals supporting the corresponding operation. When a corresponding low latency transmission operation is employed, a terminal or an AP stably performs an operation of transmitting or receiving a frame requiring low latency time during transmission of the frame, so as to increase communication efficiency.

The effects obtainable in the present invention are not limited to the above-mentioned effects, and other effects that are not mentioned may be clearly understood by those skilled in the art to which the present invention belongs, from descriptions below.

BRIEF DESCRIPTION OF DRAWINGS

FIG. 2 illustrates a wireless LAN system according to another embodiment of the present invention.

FIG. 4 illustrates a configuration of an access point according to an embodiment of the present invention.

FIG. 14 is a block diagram illustrating a link state information element including information on a transmission state in a corresponding link according to an embodiment of the present disclosure;

FIG. 27 shows an embodiment illustrating an operation of transmitting or receiving a frame between a reception MLD incapable of an STR operation in some or all links and a transmission MLD capable of an STR operation according to an embodiment of the present disclosure;

FIG. 28 shows a first embodiment of an operation of protecting frame transmission or reception through a procedure of exchanging an MU-RTS frame and a CTS frame between an AP and multiple STAs according to an embodiment of the present disclosure;

FIG. 33 shows a third embodiment of an operation of protecting frame transmission or reception through a procedure of exchanging an MU-RTS frame and a CTS frame between an AP and multiple STAs according to an embodiment of the present disclosure;

FIG. 35 shows an embodiment illustrating a process of channel reservation through a procedure of exchanging an MU-RTS frame and a CTS frame during an operation for multiple terminals according to an embodiment of the present disclosure;

FIG. 36 illustrates an operation in which a CTS frame for an MU-RTS frame is not transmitted in a particular 20 MHz channel according to an embodiment of the present disclosure;

FIG. 42 shows a third embodiment of an operation of evading a situation in which a CTS frame is not transmitted at particular 20 MHz due to an operation of a corresponding STA MLD according to an embodiment of the present disclosure;

FIG. 43 shows a first embodiment of an operation of continuing frame transmission even when a CTS frame fails to be received for an MU-RTS frame in a particular 20 MHz channel according to an embodiment of the present disclosure;

FIG. 44 shows a second embodiment of an operation of continuing frame transmission even when a CTS frame fails to be received for an MU-RTS frame in a particular 20 MHz channel according to an embodiment of the present disclosure;

BEST MODE FOR CARRYING OUT THE INVENTION

Terms used in the specification adopt general terms which are currently widely used by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it should be revealed that a term used in the specification should be analyzed based on not just a name of the term but a substantial meaning of the term and contents throughout the specification.

Throughout this specification and the claims that follow, when it is described that an element is "coupled" to another element, the element may be "directly coupled" to the other element or "electrically coupled" to the other element through a third element. Further, unless explicitly described to the contrary, the word "comprise" and variations such as "comprises" or "comprising", will be understood to imply the inclusion of stated elements but not the exclusion of any other elements. Moreover, limitations such as "or more" or "or less" based on a specific threshold may be appropriately substituted with "more than" or "less than", respectively. Hereinafter, in the present invention, a field and a subfield may be interchangeably used.

Figure 1:
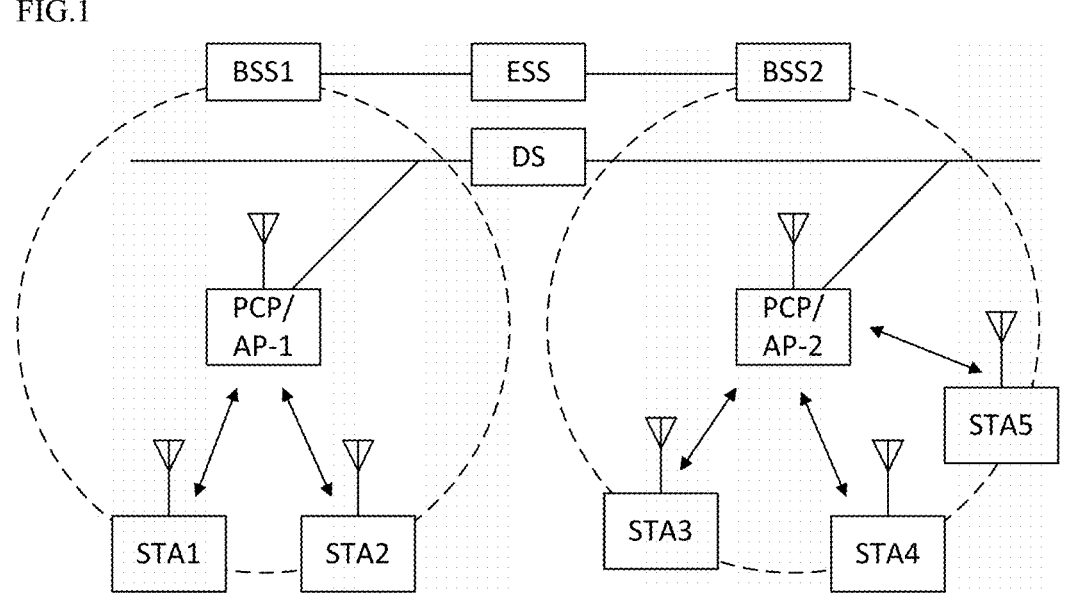
FIG. 1 illustrates a wireless LAN system according to an embodiment of the present invention.

FIG. 1 illustrates a wireless LAN system according to an embodiment of the present invention.

FIG. 1 is a diagram illustrating a wireless LAN system according to an embodiment of the present invention. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA4, and STA5, access points AP-1 and AP-2 which are stations providing a distribution service, and a distribution system (DS) connecting the multiple access points AP-1 and AP-2.

The station (STA) is a predetermined device including medium access control (MAC) following a regulation of an IEEE 802.11 standard and a physical layer interface for a wireless medium, and includes both a non-access point (non-AP) station and an access point (AP) in a broad sense. Further, in the present specification, a term 'terminal' may be used to refer to a non-AP STA, or an AP, or to both terms. A station for wireless communication includes a processor and a communication unit and according to the embodiment, may further include a user interface unit and a display unit. The processor may generate a frame to be transmitted through a wireless network or process a frame received through the wireless network and besides, perform various processing for controlling the station. In addition, the communication unit is functionally connected with the processor and transmits and receives frames through the wireless network for the station. According to the present invention, a terminal may be used as a term which includes user equipment (UE).

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense. In the present invention, an AP may also be referred to as a base wireless communication terminal. The base wireless communication terminal may be used as a term which includes an AP, a base station, an eNB (i.e. eNodeB) and a transmission point (TP) in a broad sense. In addition, the base wireless communication terminal may include various types of wireless communication terminals that allocate medium resources and perform scheduling in communication with a plurality of wireless communication terminals.

A plurality of infrastructure BSSs may be connected with each other through the distribution system (DS). In this case, a plurality of BSSs connected through the distribution system is referred to as an extended service set (ESS).

Figure 2:
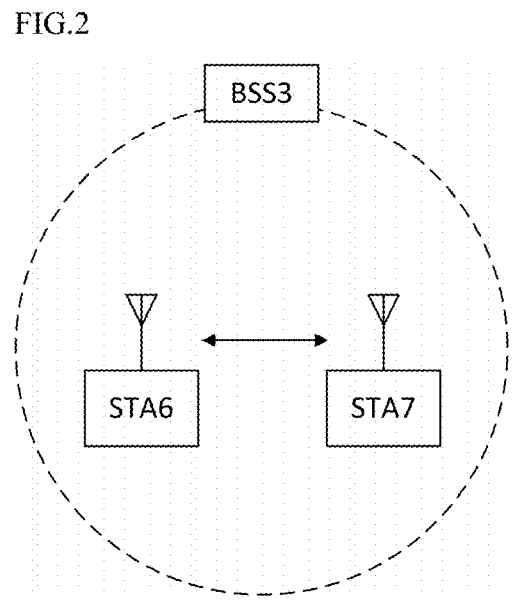

FIG. 2 illustrates an independent BSS which is a wireless LAN system according to another embodiment of the present invention. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
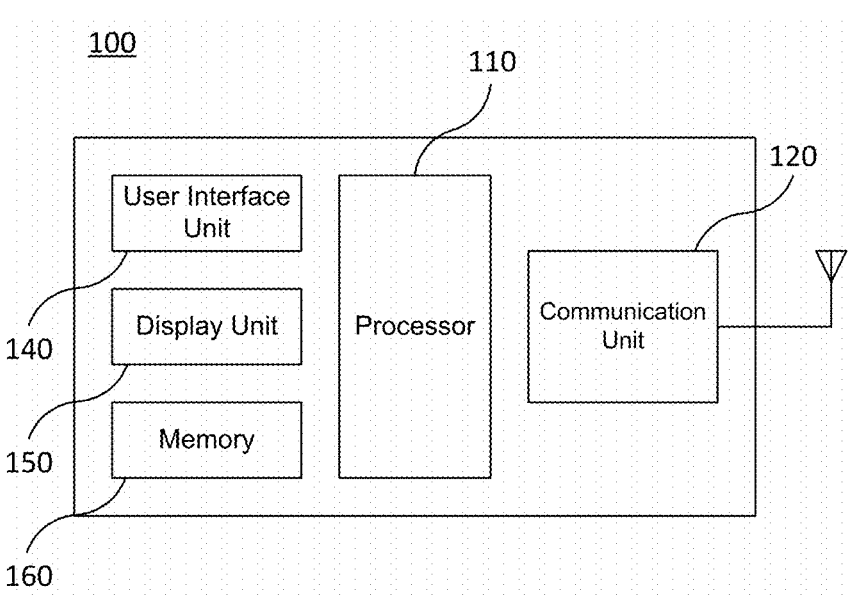
FIG. 3 illustrates a configuration of a station according to an embodiment of the present invention.

FIG. 3 is a block diagram illustrating a configuration of a station 100 according to an embodiment of the present invention. As illustrated in FIG. 3, the station 100 according to the embodiment of the present invention may include a processor 110, a communication unit 120, a user interface unit 140, a display unit 150, and a memory 160.

First, the communication unit 120 transmits and receives a wireless signal such as a wireless LAN packet, or the like and may be embedded in the station 100 or provided as an exterior. According to the embodiment, the communication unit 120 may include at least one communication module using different frequency bands. For example, the communication unit 120 may include communication modules having different frequency bands such as 2.4 GHz, 5 GHz, 6 GHz and 60 GHz. According to an embodiment, the station 100 may include a communication module using a frequency band of 7.125 GHz or more and a communication module using a frequency band of 7.125 GHz or less. The respective communication modules may perform wireless communication with the AP or an external station according to a wireless LAN standard of a frequency band supported by the corresponding communication module. The communication unit 120 may operate only one communication module at a time or simultaneously operate multiple communication modules together according to the performance and requirements of the station 100. When the station 100 includes a plurality of communication modules, each communication module may be implemented by independent elements or a plurality of modules may be integrated into one chip. In an embodiment of the present invention, the communication unit 120 may represent a radio frequency (RF) communication module for processing an RF signal.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the communication unit 120, and the like. That is, the processor 110 may be a modem or a modulator/demodulator for modulating and demodulating wireless signals transmitted to and received from the communication unit 120. The processor 110 controls various operations of wireless signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the communication unit 120 may be implemented while being integrated into a single chip or implemented as a separate chip. Further, in the embodiment of the present invention, some components of the station 100, for example, the user interface unit 140 and the display unit 150 may be optionally provided in the station 100.

Figure 4:
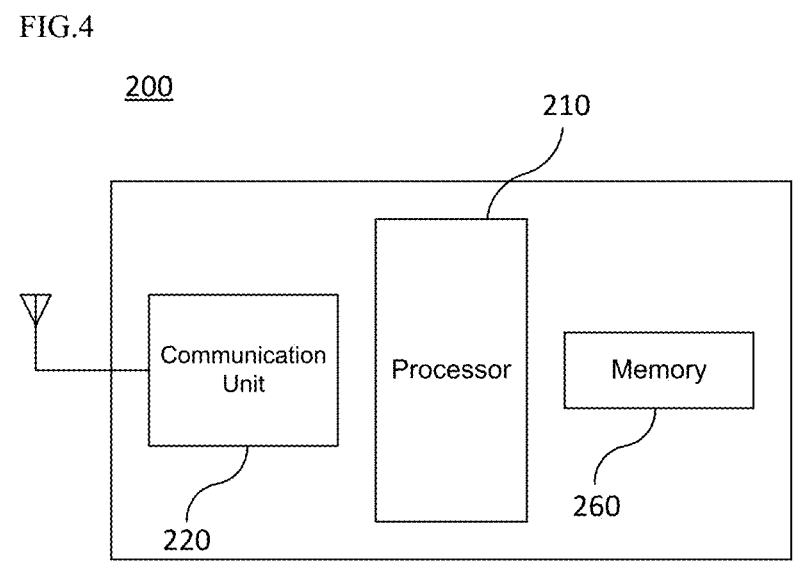

FIG. 4 is a block diagram illustrating a configuration of an AP 200 according to an embodiment of the present invention. As illustrated in FIG. 4, the AP 200 according to the embodiment of the present invention may include a processor 210, a communication unit 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present invention includes the communication unit 220 for operating the BSS in at least one frequency band. As described in the embodiment of FIG. 3, the communication unit 220 of the AP 200 may also include a plurality of communication modules using different frequency bands. That is, the AP 200 according to the embodiment of the present invention may include two or more communication modules among different frequency bands, for example, 2.4 GHz, 5 GHz, 6 GHz and 60 GHz together. Preferably, the AP 200 may include a communication module using a frequency band of 7.125 GHz or more and a communication module using a frequency band of 7.125 GHz or less. The respective communication modules may perform wireless communication with the station according to a wireless LAN standard of a frequency band supported by the corresponding communication module. The communication unit 220 may operate only one communication module at a time or simultaneously operate multiple communication modules together according to the performance and requirements of the AP 200. In an embodiment of the present invention, the communication unit 220 may represent a radio frequency (RF) communication module for processing an RF signal.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. According to an embodiment, the processor 210 may be a modem or a modulator/demodulator for modulating and demodulating wireless signals transmitted to and received from the communication unit 220. The processor 210 controls various operations such as wireless signal transmission/reception of the AP 200 according to the embodiment of the present invention. A detailed embodiment thereof will be described below.

Figure 5:
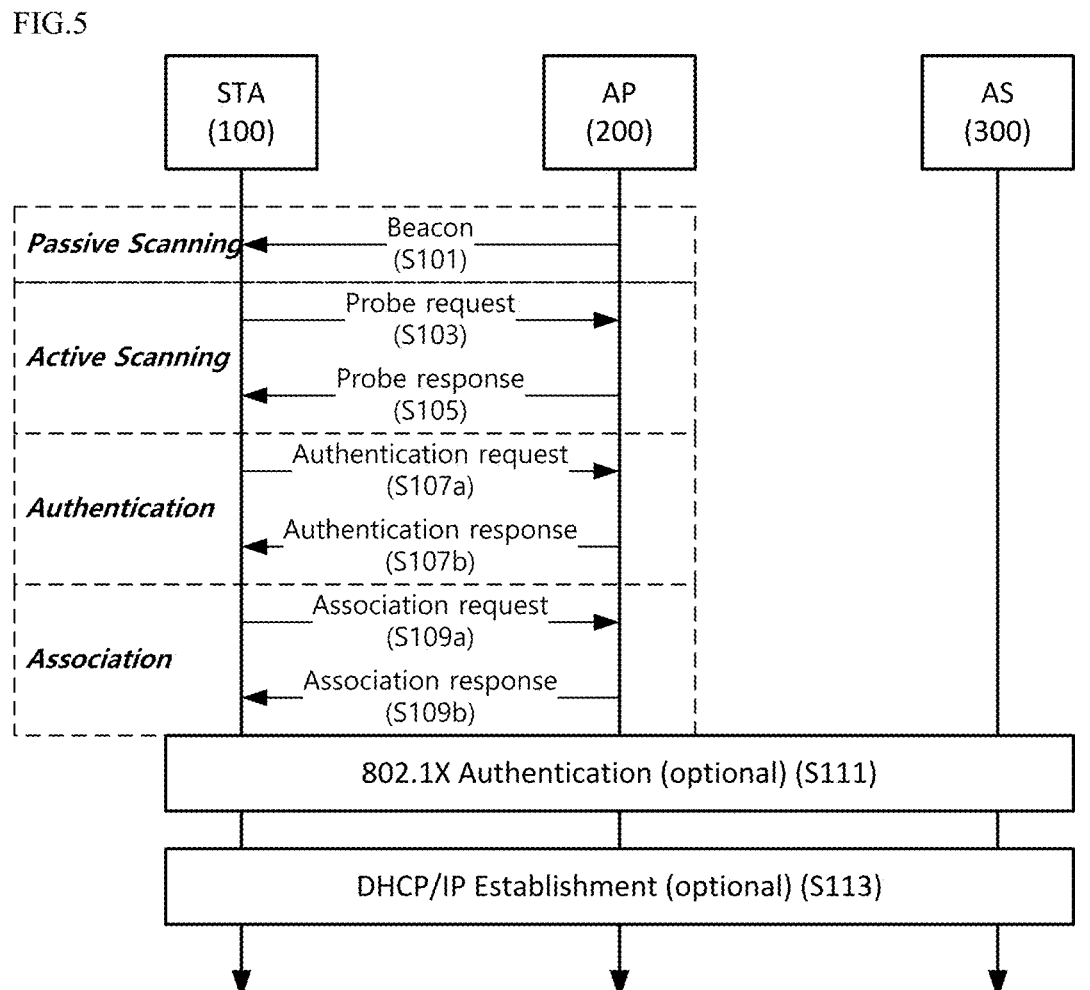
FIG. 5 schematically illustrates a process in which a STA and an AP set a link.

FIG. 5 is a diagram schematically illustrating a process in which a STA sets a link with an AP.

Referring to FIG. 5, the link between the STA 100 and the AP 200 is set through three steps of scanning, authentication, and association in a broad way. First, the scanning step is a step in which the STA 100 obtains access information of BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107a) and receiving an authentication response from the AP 200 (S107b). After the authentication step is performed, the STA 100 performs the association step by transmitting an association request (S109a) and receiving an association response from the AP 200 (S109b). In this specification, an association basically means a wireless association, but the present invention is not limited thereto, and the association may include both the wireless association and a wired association in a broad sense.

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

Figure 6:
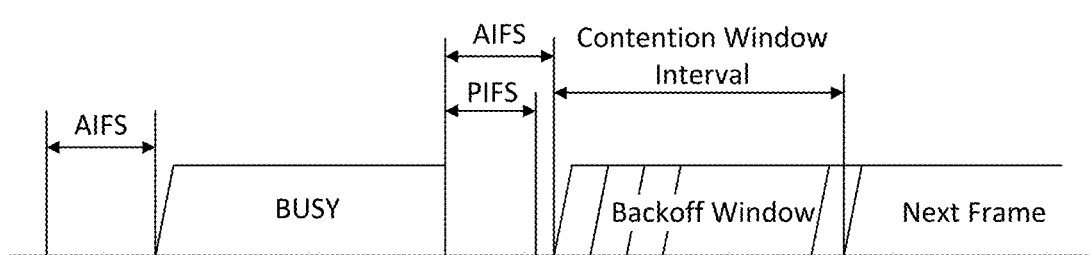
FIG. 6 illustrates a carrier sense multiple access (CSMA)/ collision avoidance (CA) method used in wireless LAN communication.

FIG. 6 is a diagram illustrating a carrier sense multiple access (CSMA)/collision avoidance (CA) method used in wireless LAN communication.

A terminal that performs a wireless LAN communication checks whether a channel is busy by performing carrier sensing before transmitting data. When a wireless signal having a predetermined strength or more is sensed, it is determined that the corresponding channel is busy and the terminal delays the access to the corresponding channel. Such a process is referred to as clear channel assessment (CCA) and a level to decide whether the corresponding signal is sensed is referred to as a CCA threshold. When a wireless signal having the CCA threshold or more, which is received by the terminal, indicates the corresponding terminal as a receiver, the terminal processes the received wireless signal. Meanwhile, when a wireless signal is not sensed in the corresponding channel or a wireless signal having a strength smaller than the CCA threshold is sensed, it is determined that the channel is idle.

When it is determined that the channel is idle, each terminal having data to be transmitted performs a backoff procedure after an inter frame space (IFS) time depending on a situation of each terminal, for instance, an arbitration IFS (AIFS), a PCF IFS (PIFS), or the like elapses. According to the embodiment, the AIFS may be used as a component which substitutes for the existing DCF IFS (DIFS). Each terminal stands by while decreasing slot time(s) as long as a random number determined by the corresponding terminal during an interval of an idle state of the channel and a terminal that completely exhausts the slot time(s) attempts to access the corresponding channel. As such, an interval in which each terminal performs the backoff procedure is referred to as a contention window interval.

When a specific terminal successfully accesses the channel, the corresponding terminal may transmit data through the channel. However, when the terminal which attempts the access collides with another terminal, the terminals which collide with each other are assigned with new random numbers, respectively to perform the backoff procedure again. According to an embodiment, a random number newly assigned to each terminal may be decided within a range (2*CW) which is twice larger than a range (a contention window, CW) of a random number which the corresponding terminal is previously assigned. Meanwhile, each terminal attempts the access by performing the backoff procedure again in a next contention window interval and in this case, each terminal performs the backoff procedure from slot time(s) which remained in the previous contention window interval. By such a method, the respective terminals that perform the wireless LAN communication may avoid a mutual collision for a specific channel.

Hereinafter, a terminal of the present disclosure is referred to as a non-AP STA, an AP STA, an AP, a STA, a receiving device or a transmitting device, but the present disclosure is not limited thereto. In addition, the AP STA of the present disclosure may be referred to as the AP.

<Examples of Various PPDU Formats>

Figure 7:
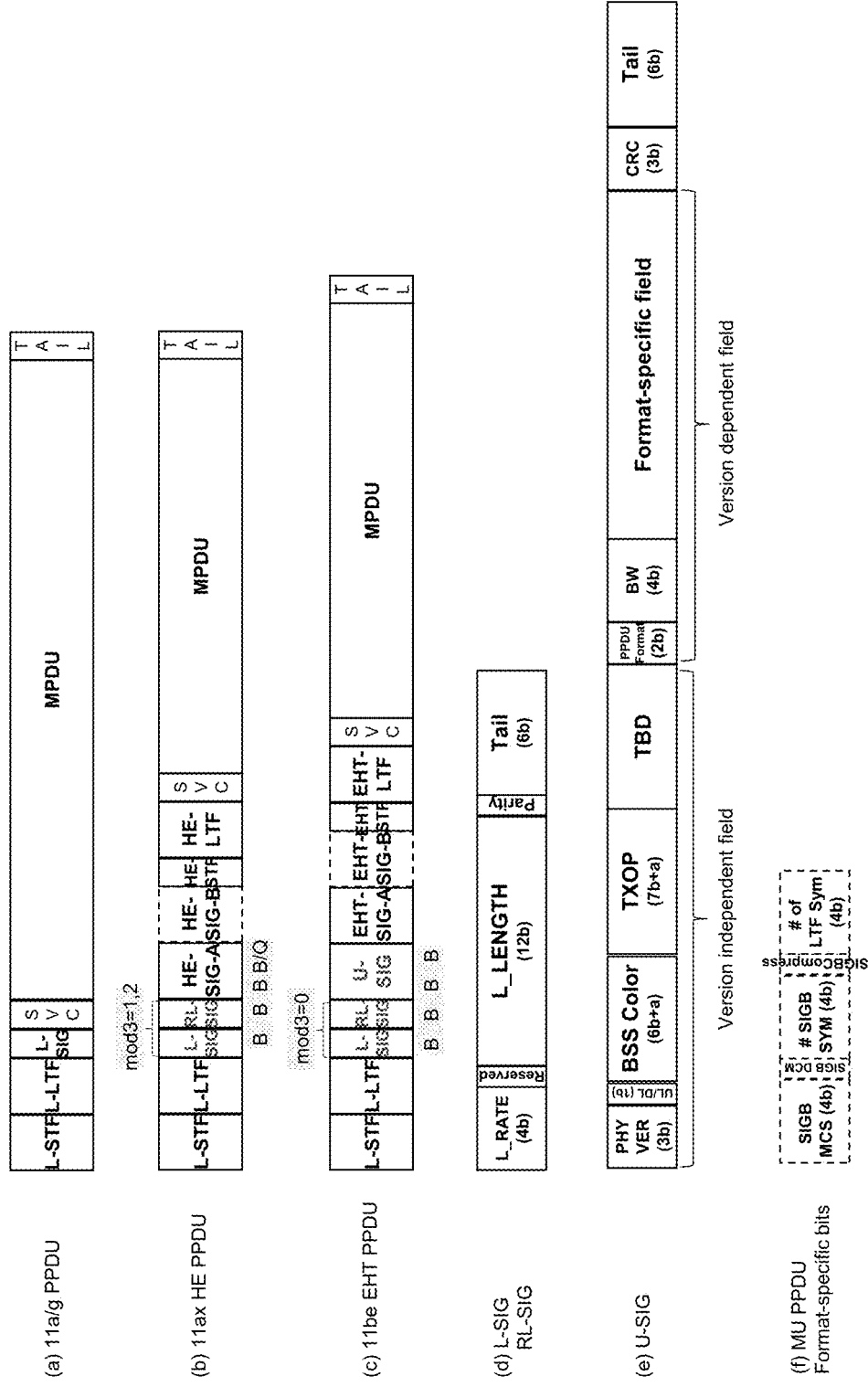
FIG. 7 illustrates an example of a format of a PLCP Protocol data unit (PPDU) for each of various standard generations.

FIG. 7 illustrates an example of a format of a PLCP Protocol data unit (PPDU) for each of various standard generations. More specifically, FIG. 7(a) illustrates an embodiment of a legacy PPDU format based on 802.11a/g, FIG. 7(b) illustrates an embodiment of an HE PPDU format based on 802.11ax, and FIG. 7(c) illustrates an embodiment of a non-legacy PPDU (i.e., EHT PPDU) format based on 802.11be. FIG. 7(d) illustrates detailed field configurations of RL-SIG and L-SIG commonly used in the PPDU formats.

Referring to FIG. 7(a), a preamble of the legacy PPDU includes a legacy short training field (L-STF), a legacy long training field (L-LTF), and a legacy signal field (L-SIG). In an embodiment of the present invention, the L-STF, the L-LTF, and the L-SIG may be referred to as a legacy preamble.

Referring to FIG. 7(b), a preamble of the HE PPDU additionally includes, in the legacy preamble, a repeated legacy short training field (RL-SIG), a high efficiency signal A field (HE-SIG-A), a high efficiency signal B field (HE-SIG-B), a high efficiency short training field (HE-STF), and a high efficiency long training field (HE-LTF). In an embodiment of the present invention, the RL-SIG, HE-SIG-A, the HE-SIG-B, the HE-STF and the HE-LTF may be referred to as an HE preamble. A specific configuration of the HE preamble may be modified according to an HE PPDU format. For example, HE-SIG-B may be used only in an HE MU PPDU format.

Referring to FIG. 7(c), a preamble of the EHT PPDU additionally includes, in the legacy preamble, a repeated legacy short training field (RL-SIG), a universal signal field (U-SIG), and an extremely high throughput signal A field (EHT-SIG-A), an extremely high throughput signal B field (EHT-SIG-B), an extremely high throughput short training field (EHT-STF), and an extremely high throughput long training field (EHT-LTF). In an embodiment of the present invention, the RL-SIG, EHT-SIG-A, the EHT-SIG-B, the EHT-STF and the EHT-LTF may be referred to as an EHT preamble. A specific configuration of a non-legacy preamble may be modified according to an EHT PPDU format. For example, EHT-SIG-A and EHT-SIG-B may be used only in a part of the EHT PPDU format.

64-FFT OFDM is applied in an L-SIG field included in the preamble of the PPDU, and the L-SIG field includes a total of 64 subcarriers. Among 64 subcarriers, 48 subcarriers excluding a guard subcarrier, a DC subcarrier, and a pilot subcarrier are used for transmission of L-SIG data. BPSK and a modulation and coding scheme (MCS) of rate=1/2 are applied in L-SIG, and therefore the L-SIG may include a total of 24 bits of information. FIG. 7(d) illustrates a 24-bit information configuration of L-SIG.

Referring to FIG. 7(d), the L-SIG includes an L_RATE field and an L_LENGTH field. The L_RATE field includes 4 bits and indicates an MCS used for data transmission. Specifically, the L_RATE field indicates one value among transmission rates of 6/9/12/18/24/36/48/54 Mbps obtained by combining a modulation scheme of BPSK/QPSK/16-QAM/64-QAM, etc. and an inefficiency of ½, ⅔, ¾, etc. A total length of a corresponding PPDU may be indicated by combining information of the L_RATE field and information of the L_LENGTH field. In a non-legacy PPDU format, the L_RATE field is configured to a minimum rate of 6 Mbps.

A unit of the L_LENGTH field is a byte and a total of 12 bits are allocated to signal up to 4095, and a length of the PPDU may be indicated in combination with the L_RATE field. A legacy terminal and a non-legacy terminal may interpret the L_LENGTH field in different ways.

Firstly, a method of interpreting the length of the PPDU by the legacy terminal and the non-legacy terminal by using the L_LENGTH field is described below. When a value of the L_RATE field is configured to indicate 6 Mbps, 3 bytes during 4 us which is one symbol duration of 64 FET (i.e., 24 bits) may be transmitted. Therefore, the 64 FET standard symbol number after an L-SIG is acquired by adding 3 bytes corresponding to a SVC field and a Tail field to the L_LENGTH field value and then dividing the same by 3 bytes which is a transmission amount of one symbol. When multiplying the acquired symbol number by 4 us which is one symbol duration and then adding 20 us which is consumed to transmit the L-STF, the L-LTF, and the L-SIG, the length of a corresponding PPDU, i.e., a receipt time (RX-TIME) is acquired, which is expressed by Equation 1 below.

$$RXTIME\ (us) = \left(\left\lceil \frac{L\_LENGTH + 3}{3} \right\rceil\right) \times 4 + 20 \qquad \text{[Equation 1]}$$

In this case, $\lceil x \rceil$ denotes the smallest natural number greater than or equal to x. Since the maximum value of the L_LENGTH field is 4095, the length of the PPDU can be set up to 5.464 ms. The non-legacy terminal transmitting the PPDU should set the L_LENGTH field as shown in Equation 2 below.

$$L\_LENGTH\ (byte) = \left(\left\lceil \frac{TXTIME - 20}{4} \right\rceil\right) \times 3 - 3 \qquad \text{[Equation 2]}$$

Herein, TXTIME is the total transmission time constituting the corresponding PPDU, and is expressed by Equation 3 below. In this case, TX represents the transmission time of X.

$$TXTIME\ (us) = T_{L-STF} + T_{L-LTF} + T_{L-SIG} + T_{RL-SIG} + T_{U-SIG} + (T_{EHT-SIG-A}) + (T_{ENT-SIG-B}) + T_{EHT-STF} + N_{EHT-LTF} \cdot T_{EHT-LTF} + T_{DATA} \qquad \text{[Equation 3]}$$

Referring to the above equations, the length of the PPDU is calculated based on a rounded up value of L_LENGTH/3. Therefore, for a random value of k, three different values of L_LENGTH={3k+1, 3k+2, 3(k+1)} indicate the same PPDU length.

Referring to FIG. 7(e), a universal SIG (U-SIG) field continues to exist in an EHT PPDU and a WLAN PPDU of a subsequent generation, and serves to classify a generation of a PPDU, which includes 11be. U-SIG is a 64 FFT-based OFDM 2 symbol and may transfer a total of 52 bits of information. In 52 bits, 43 bits excluding 9 bits for CRC/Tail are largely divided into a version independent (VI) field and a version dependent (VD) field.

A VI bit enables a current bit configuration to be maintained even later on, so that even if a PPDU of a subsequent generation is defined, current 11be terminals may obtain information on the PPDU via the VI fields of the PPDU. To this end, the VI field includes PHY version, UL/DL, BSS color, TXOP, and reserved fields. The PHY version field is 3 bits, and serves to sequentially classify 11be and subsequent generation wireless LAN standards into versions. 11be has a value of 000b. The UL/DL field identifies whether the PPDU is an uplink/downlink PPDU. BSS color indicates an identifier for each BSS defined in 11ax, and has a value of 6 bits or more. TXOP indicates transmit opportunity duration transmitted in a MAC header, wherein, by adding the TXOP to a PHY header, the PPDU may infer a length of the TXOP included therein without having to decode an MPDU, and the TXOP has a value of 7 bits or more.

The VD field is signaling information useful only for an 11be version of the PPDU, and may include a field commonly used in any PPDU format, such as PPDU format and BW, and a field defined differently for each PPDU format. The PPDU format is a classifier that classifies EHT single user (SU), EHT multiple user (MU), EHT trigger-based (TB), EHT extended range (ER) PPDU, etc. The BW field signals five basic PPDU BW options (BW, which is expressible in the form of an exponential power of 20*2, may be referred to as basic BW) of 20, 40, 80, 160 (80+80), and 320 (160+160) MHz and various remaining PPDU BWs configured via preamble puncturing. After being signaled at 320 MHz, signaling may be performed in a form in which some 80 MHz is punctured. A punctured and modified channel type may be signaled directly in the BW field, or may be signaled using the BW field with a field (e.g., a field within the EHT-SIG field) appearing after the BW field. If the BW field is configured to 3 bits, a total of 8 BW signaling may be performed, and therefore only up to 3 signaling may be performed in a puncturing mode. If the BW field is configured to 4 bits, a total of 16 BW signaling may be performed, and therefore up to 11 signaling may be performed in the puncturing mode.

A field located after the BW field varies depending on the type and format of the PPDU, an MU PPDU and an SU PPDU may be signaled in the same PPDU format, a field for classification between the MU PPDU and the SU PPDU may be located before an EHT-SIG field, and additional signaling may be performed for the same. Both the SU PPDU and the MU PPDU include the EHT-SIG field, but some fields that are not required in the SU PPDU may be compressed. Information on the field to which the compression has been applied may be omitted or may have a size smaller than a size of an original field included in the MU PPDU. For example, in a case of the SU PPDU, a common field of the EHT-SIG may be omitted or replaced, or the SU PPDU may have a different configuration in which a user specific field is replaced, reduced to one, or the like.

Alternatively, the SU PPDU may further include a compression field indicating whether compression is performed, and a part of field (e.g., RA fields, etc.) may be omitted according to a value of the compressed field.

If a part of the EHT-SIG field of the SU PPDU is compressed, information to be included in the compressed field may be signaled also in an uncompressed field (e.g., the common field, etc.). The MU PPDU corresponds to a PPDU format for concurrent reception by multiple users, and therefore the EHT-SIG field is required to be transmitted subsequently to the U-SIG field, and the amount of signaled information may vary. That is, a plurality of MU PPDUs are transmitted to a plurality of STAs, so that the respective STAs should recognize locations of RUs, at which the MU PPDUs are transmitted, the STAs to which the RUs have been allocated respectively, and whether the transmitted MU PPDUs have been transmitted to the STAs themselves. Therefore, an AP should transmit information described above, by including the same in the EHT-SIG field. To this end, information for efficient transmission of the EHT-SIG field is signaled in the U-SIG field, and this may correspond to an MCS that is a modulation method and/or the number of symbols in the EHT-SIG field. The EHT-SIG field may include information on a size and location of an RU allocated to each user.

In the case of the SU PPDU, a plurality of RUs may be allocated to an STA, and the plurality of RUs may be continuous or discontinuous. If the RUs allocated to the STA are discontinuous, the STA should recognize a punctured RU in the middle in order to efficiently receive the SU PPDU. Accordingly, the AP may transmit the SU PPDU including information (e.g., a puncturing pattern of the RUs, etc.) of punctured RUs among the RUs allocated to the STA. That is, in the case of the SU PPDU, a puncturing mode field, which includes information indicating, in a bitmap format, etc., a puncturing pattern and whether the puncturing mode is applied, may be included in the EHT-SIG field, and the puncturing mode field may signal a discontinuous channel type appearing within a bandwidth.

The signaled discontinuous channel type is limited, and indicates discontinuous channel information and BW of the SU PPDU in combination with a value of the BW field. For example, the SU PPDU is a PPDU transmitted only to a single terminal, so that the STA may recognize a bandwidth allocated to itself via the BW field included in the PPDU, and the SU PPDU may recognize a punctured resource in the allocated bandwidth via the puncturing mode field of the EHT-SIG field or the U-SIG field included in the PPDU. In this case, the terminal may receive the PPDU in resource units remaining after excluding a specific channel of the punctured resource unit. The plurality of RUs allocated to the STA may be configured by different frequency bands or tones.

Only a limited discontinuous channel type is signaled in order to reduce signaling overhead of the SU PPDU. Puncturing may be performed for each 20 MHz sub-channel, so that if puncturing is performed for BW having a large number of 20 MHz sub-channels, such as 80, 160, and 320 MHz, a discontinuous channel (if puncturing of only edge 20 MHz is considered to be discontinuous) type should be signaled in the case of 320 MHz by expressing whether each of 15 20 MHz sub-channels remaining after excluding a primary channel is used. As such, allocating bits to signal a discontinuous channel type of single user transmission may act as excessively large signaling overhead in consideration of a low transmission rate of a signaling part.

The present disclosure suggests a signaling technique of a discontinuous channel type of the SU PPDU and illustrates the discontinuous channel type determined according to the suggested technique. In addition, the present disclosure suggests a signaling technique of a puncturing type of each of a primary 160 MHz and a secondary 160 MHz in 320 MHz BW configuration of the SU PPDU.

In addition, an embodiment of the present disclosure suggests a technique which differs in the configuration of the PPDU indicating the preamble puncturing BW values according to the PPDU format signaled in the PPDU format field. If the length of the BW field is 4 bits, in case of the EHT SU PPDU or the TB PPDU, the EHT-SIG-A of 1 symbol may be additionally signaled after the U-SIG, or the EHT-SIG-A may be never signaled, so that by considering this, it is necessary to completely signal a maximum of 11 puncturing modes through only the BW field of the U-SIG. However, in case of the EHT MU PPDU, since the EHT-SIG-B is additionally signaled after the U-SIG, the maximum of 11 puncturing modes may be signaled by a method different from the SU PPDU. In case of the EHT ER PPDU, the BW field is configured as 1 bit to signal information on whether the PPDU uses 20 MHz or 10 MHz band.

FIG. 7(f) illustrates a configuration of a format-specific field of a VD field when the EHT MU PPDU is indicated in the PPDU format field of U-SIG. In the case of the MU PPDU, SIG-B, which is a signaling field for concurrent reception by multiple users, is essentially required, and SIG-B may be transmitted without separate SIG-A after U-SIG. To this end, information for decoding of SIG-B should be signaled in U-SIG. These fields include SIG-B MCS, SIG-B DCM, Number of SIG-B Symbols, SIG-B Compression, and Number of EHT-LTF Symbols.

Figure 8:
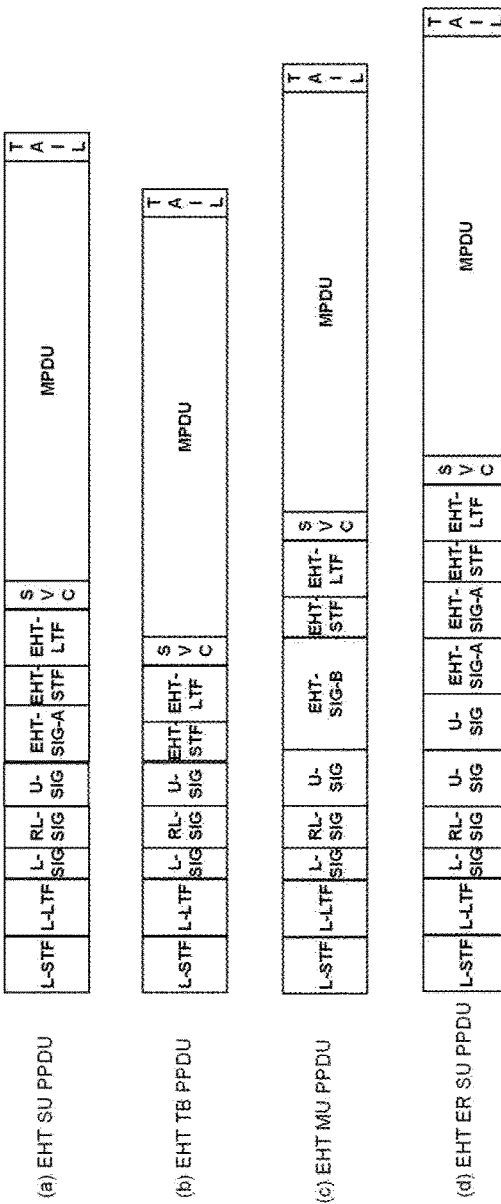
FIG. 8 illustrates an example of various extremely high throughput (EHT) physical protocol data unit (PPDU) formats and a method for indicating the same according to an embodiment of the present invention.

FIG. 8 illustrates an example of various extremely high throughput (EHT) physical protocol data unit (PPDU) formats and a method for indicating the same according to an embodiment of the present invention.

Referring to FIG. 8, a PPDU may include a preamble and a data part, and an EHT PPDU format, that is a PPDU type, may be classified according to a U-SIG field included in the preamble. Specifically, based on a PPDU format field included in the U-SIG field, whether the format of the PPDU is an EHT PPDU may be indicated.

FIG. 8(a) shows an example of an EHT SU PPDU format for a single STA. An EHT SU PPDU is a PPDU used for single user (SU) transmission between an AP and a single STA, and an EHT-SIG-A field for additional signaling may be located after the U-SIG field.

FIG. 8(b) shows an example of an EHT trigger-based PPDU format which corresponds to an EHT PPDU transmitted based on a trigger frame. An EHT Trigger-based PPDU is an EHT PPDU transmitted based on a trigger frame and is an uplink PPDU used for a response to the trigger frame. Unlike in the EHT SU PPDU, an EHT-SIG-A field is not located after a U-SIG field in the EHT PPDU.

FIG. 8(c) shows an example of an EHT MU PPDU format which corresponds to an EHT PPDU for multiple users. An EHT MU PPDU is a PPDU used to transmit the PPDU to one or more STAs. In the EHT MU PPDU format, an HE-SIG-B field may be located after a U-SIG field.

FIG. 8(d) shows an example of an EHT ER SU PPDU format used for single user transmission with an STA in an extended range. An EHT ER SU PPDU may be used for single user transmission with an STA of a wider range compared to the EHT SU PPDU described in FIG. 8(a), and a U-SIG field may be repeatedly located on a time axis.

The EHT MU PPDU described in FIG. 8(c) may be used by an AP to perform downlink transmission to a plurality of STAs. Here, the EHT MU PPDU may include scheduling information so that the plurality of STAs may concurrently receive the PPDU transmitted from the AP. The EHT MU PPDU may transfer, to the STAs, AID information of a transmitter and/or a receiver of the PPDU transmitted via a user specific field of EHT-SIG-B. Accordingly, the plurality of terminals having received the EHT MU PPDU may perform a spatial reuse operation based on the AID information of the user specific field included in a preamble of the received PPDU.

Specifically, a resource unit allocation (RA) field of the HE-SIG-B field included in the HE MU PPDU may include information on a configuration of a resource unit (e.g., a division form of the resource unit) in a specific bandwidth (e.g., 20 MHz, etc.) of a frequency axis. That is, the RA field may indicate configurations of resource units segmented in a bandwidth for transmission of the HE MU PPDU, in order for the STA to receive the PPDU. Information on the STA allocated (or designated) to each segmented resource unit may be included in the user specific field of EHT-SIG-B so as to be transmitted to the STA. That is, the user specific field may include one or more user fields corresponding to the respective segmented resource units.

For example, a user field corresponding to at least one resource unit used for data transmission among the plurality of segmented resource units may include an AID of a receiver or a transmitter, and a user field corresponding to the remaining resource unit(s) which is not used for data transmission may include a preconfigured null STA ID.

Two or more PPDUs illustrated in FIG. 8 may be indicated by a value indicating the same PPDU format. That is, two or more PPDUs may be indicated by the same PPDU format through the same value. For example, the EHT SU PPDU and the EHT MU PPDU may be indicated by the same value through the U-SIG PPDU format subfield. At this time, the EHT SU PPDU and the EHT MU PPDU may be divided by the number of the STAs receiving the PPDU. For example, the PPDU receiving one STA may be identified as the EHT SU PPDU, and when the number of the STAs is configured to receive two or more STAs, the PPDU may be identified as the EHT MU PPDU. In other words, two or more PPDU formats illustrated in FIG. 8 may be indicated through the same subfield value.

In addition, a part field among the fields illustrated in FIG. 8 or part information of the field may be omitted, and the case that the part field or the part information of the field is omitted may be defined as a compression mode or a compressed mode.

An AP and a STA may request a low latency operation for particular traffic requiring low latency time. The traffic requiring low latency time may be transferred to a MAC layer as described below.

Figure 9:
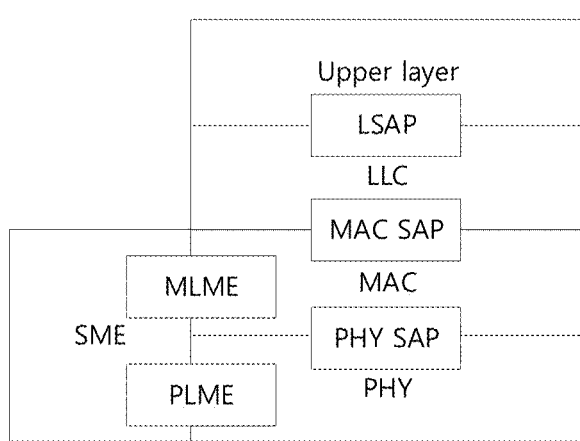
FIG. 9 is a structural diagram illustrating an internal hierarchy structure of a STA according to an embodiment of the present disclosure.

FIG. 9 is a structural diagram illustrating an internal hierarchy structure of a STA according to an embodiment of the present disclosure.

Referring to FIG. 9, a communication device included in a STA is configured by an application layer that performs various operations in the highest layer, a transport layer that ensures end-to-end transmission reliability, a network layer that finds a way to a target communication node and transfers a signal in a corresponding direction, a data link layer that performs a transmission operation in an inter-terminal communication link, and a physical layer that performs a transmission operation through an actual physical signal. The data link layer may include a logical link control (LLC) and a medium access control (MAC).

Each layer may send data and an additional parameter for data transmission to a higher or lower layer of a corresponding layer through a service access point (SAP). For example, the LLC layer may receive information on data, a source address, and a destination address information transferred from a higher layer through a link service access point (LSAP). In addition, the MAC layer may transfer received data to a higher layer through a MAC SAP, and may receive data to be transmitted and additional parameters for data transmission transferred from the higher layer.

In a case where data to be transmitted in the hierarchy structure is data requiring low latency time, the MAC layer may receive the data and a relevant parameter from the higher layer in the form of MA-UNITDATA.request. In a case where data to be transmitted is data requiring low latency time, the data including a corresponding indicator may be transferred from the higher layer to the MAC layer through the MAC SAP. For example, MA-UNITDATA.request including the fact that corresponding data is data requiring low latency time may be transferred. In a case where a corresponding indicator related to low latency time is included, corresponding MA-UNITDATA.request may include parameters as shown in Table 1 below.

TABLE 1

MA-UNITDATA.request(
    Source address,
    Destination address,
    Routing information,
    data,
    priority,
    drop eligible,
    service class,
    station vector,
    MSDU format,
    Low Latency,
    Required Latency
)

Each parameter included in DA-UNITDATA.request may be as shown in Table 2 below.

TABLE 2

| Parameters | Description |
|---|---|
| Source address | Address of MAC sublayer included in corresponding terminal |
| Destination address | Address of individual MAC sublayer of reception terminal or address of group MAC sublayer |
| Routing information | Null value in IEEE 802.11 |
| data | MSDU to be transmitted from MAC sublayer |
| priority | Priority required for data transmission |
| drop eligible | Whether it is possible to remove data in terminal when there are no sufficient resources in corresponding STA |
| service class | Service class required for data transmission |
| station vector | Parameter existing only when dot11GLKImplemented is true, and indicating group of service_access_point_identifiers |
| MSDU format | Whether corresponding MSDU is EPD type or LPD type |
| Low Latency | Whether corresponding data needs to be transmitted using low latency operation |
| Required Latency | Required latency time (this parameter may be optional if low latency parameter is 1) |

Alternatively, a separate traffic stream (TS) may be defined for data requiring low latency time. In order to manage data corresponding to a particular traffic stream (TS), information on a required quality of service (QoS) for an ID of the particular TS may be received from a station management entity (SME) through a MAC layer management entity SAP (MLME SAP). The MAC layer may receive information on the TS from the SME in the form of MLME-ADDTS.request.

In a case where an AP or a STA supports a low latency transmission operation for a frame requiring low latency time, an internal variable may be designated for a corresponding terminal. For example, one of management information base (MIB) values indicating whether a low latency operation is activated may be generated, and may be managed in the terminal. The correspond MIB value may be dot11rTWTActivated. The low latency operation is an operation for transmitting traffic (e.g., latency sensitive traffic) or frame sensitive to latency, and the traffic or frame sensitive to latency may be pre-configured traffic or frame. For example, in relation to the traffic or frame sensitive to latency, a TID (or access category (AC)) may be used to indicate corresponding traffic or frame as traffic or a frame sensitive to latency.

The AP may be an AP included in an AP multi-link device (MLD). The STA may be a STA included in a STA MLD. The AP MLD and the STA MLD may be configured as described below with reference to FIG. 10.

Figure 10:
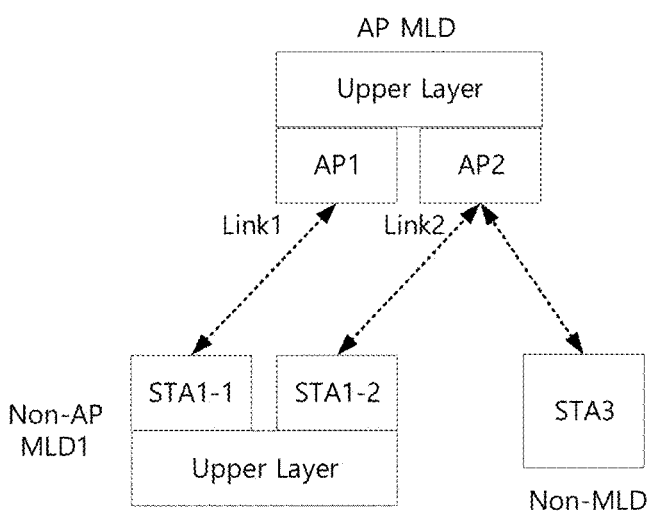
FIG. 10 is a concept diagram illustrating a structure of an AP MLD and a STA MLD performing a multi-link operation according to an embodiment of the present disclosure.

FIG. 10 is a concept diagram illustrating a structure of an AP MLD and a STA MLD performing a multi-link operation according to an embodiment of the present disclosure.

Referring to FIG. 10, an AP multi-link device (MLD) may be a device including one or more wireless access points (APs), and may be a device connected to a higher layer via one interface. That is, the AP MLD may be connected to a logical link control (LLC) layer via one interface. Several APs included in the AP MLD may share some functions of a MAC layer. Respective APs in the AP MLD may operate in different links. A STA MLD may be a device including one or more non-AP STAs, and may be a device connected to a higher layer via one interface. That is, the STA MLD may be connected to the LLC layer via one interface. Several STAs included in the STA MLD may share some functions of the MAC layer. In addition, the STA MLD may be called a non-AP MLD. The AP MLD and the STA MLD may perform a multi-link operation of performing communication by using multiple individual links. That is, in a case where an AP MLD includes several APs, the APs may configure individual links and perform a frame transmission or reception operation using multiple links with respective terminals included in a STA MLD. Each link may operate in a 2.4 GHz, 5 GHz, or 6 GHz band, and a bandwidth expansion operation may be performed in each link. For example, in a case where an AP MLD configures one link in the 2.4 GHz band and two links in the 5 GHz band, the AP MLD may transmit a frame within a bandwidth of 40 MHz in the 2.4 GHz band through a bandwidth expansion method, and may transmit a frame within a discontinuous bandwidth of up to 320 MHz in each of the links using the 5 GHz band.

In the AP MLD or the STA MLD, while one terminal in the MLD is performing a transmission operation, another terminal may be unable to perform a reception operation due to a problem of interference inside the device. As described above, an operation in which, while one AP or terminal in an MLD is performing a transmission operation, another AP or terminal in the MLD performs reception is called simultaneous transmit and receive (STR). The AP MLD may be able to perform an STR operation for all links. Alternatively, an STR operation may be impossible in some links of the AP MLD. A terminal MLD capable of an STR operation may be connected to an AP MLD, and an MLD incapable of an STR operation for some or all links may be connected thereto. In addition, a terminal (e.g., an IEEE 802.11a/b/g/n/ac/ax terminal or an IEEE 802.11be terminal that is not an MLD type) not belonging to an MLD may be additionally connected to an AP included in an AP MLD.

The AP MLD and the STA MLD may perform a negotiation process for a multi-link operation. The negotiation process for the multi-link operation may be performed during a scanning and access process described with reference to FIG. 5. An AP MLD and a STA MLD may perform a negotiation process for a multi-link use operation in a scanning and access process described with reference to FIG. 5. An AP MLD and a STA MLD may operate as below when performing the negotiation process for the multi-link operation during an access process.

Figure 11:
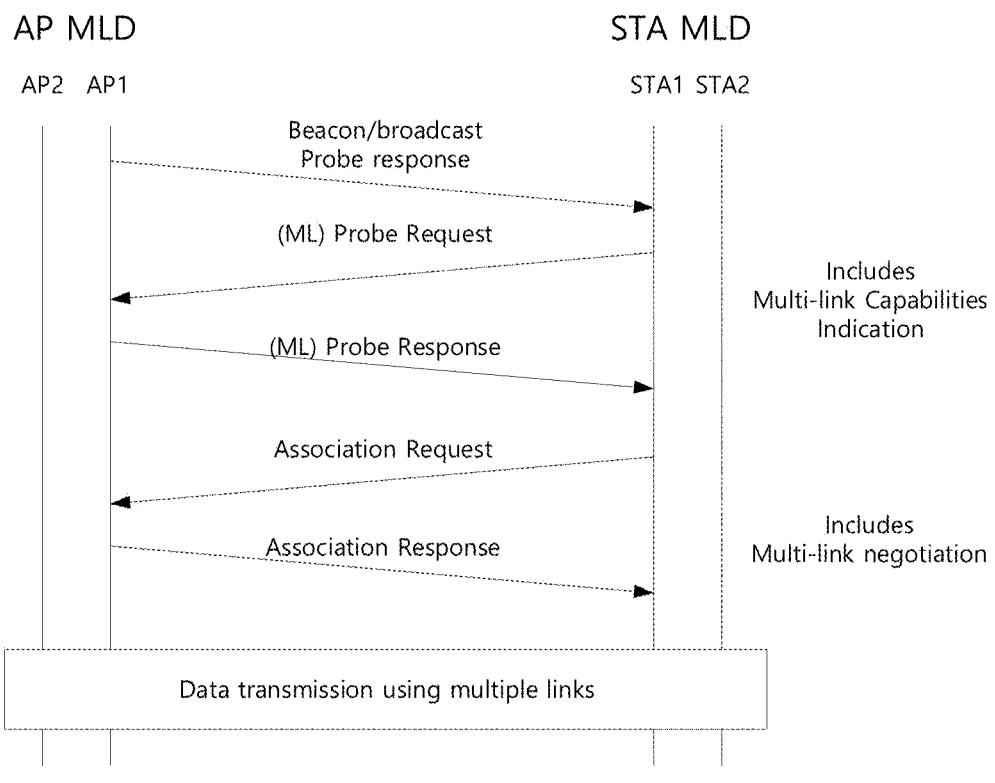
FIG. 11 is a concept diagram illustrating an access process between an AP MLD and a STA or STA MLD according to an embodiment of the present disclosure.

FIG. 11 is a concept diagram illustrating an access process between an AP MLD and a STA or STA MLD according to an embodiment of the present disclosure. A part overlapping with the access process described with reference to FIG. 5 will not be described with reference to FIG. 11.

Referring to FIG. 11, an AP MLD and a STA MLD may perform a negotiation process for a multi-link operation during a scanning and access process. For example, in the scanning process described with reference to FIG. 5, an AP included in an AP MLD may transmit a beacon frame including an indicator indicating that a multi-link operation is available, the number of available links, and information on multiple available links. Alternatively, in a case where the AP MLD transmits a probe response frame having a broadcast frame type, the AP MLD may transmit the probe response frame including an indicator indicating that a multi-link operation is available, the number of available links, and information on multiple available links. A terminal belonging to a STA MLD may transmit a probe request frame including an indicator indicating that a multi-link operation is available. If the STA MLD is to perform a negotiation process for a multi-link operation, the STA MLD may additionally request operation information on all APs belonging to the AP MLD. If a STA belonging to the STA MLD requests information of all the APs belonging to the AP MLD, a probe request frame including a corresponding request indicator may be transmitted. An AP belonging to the AP MLD may identify the corresponding request indicator in the probe request frame, and may transmit a probe response frame including all parameters used for a multi-link operation (e.g., information of the AP and information on a beacon frame transmitted from another AP belonging to the AP MLD). All the parameters may include the number of links available in a multi-link operation, and link information.

The STA MLD having identified used link information and whether the AP MLD performs a multi-link operation may perform an access process with the AP MLD. The AP MLD and the STA MLD may simultaneously perform a negotiation process for a multi-link operation. That is, a random terminal (e.g., STA1) belonging to the STA MLD may transmit, to a random AP (e.g., AP1) belonging to the AP MLD, an indicator indicating a multi-link operation of the terminal is available and a request indicator requesting to perform a multi-link operation while transmitting an access request frame. The AP having received the access request frame from the terminal may identify an indicator requesting a multi-link operation, and if the AP is able to perform a multi-link operation, the AP may transmit, to the terminal, an access response frame allowing a multi-link operation and including link information to be used in the multi-link operation and a parameter used in each link. The parameter for the multi-link operation may include one or more of the band of each used link, a bandwidth expansion direction, a target beacon transmission time (TBTT), and whether an STR operation is performed. The AP MLD and the STA MLD for which use of a multi-link operation has been identified through the exchange between the access request frame and the response frame may perform a frame transmission operation using multiple links by using several APs included in the AP MLD and several terminals included in the STA MLD after the corresponding access process.

In a case where an AP or an AP MLD supports a low latency transmission operation using a frame requiring low latency time, the AP or the AP MLD may restrict one or more links to be accessed by only a terminal capable of the operation. That is, in order to efficiently perform a channel reservation process and a transmission process for a low latency operation, only access of a terminal deciphering and understanding a corresponding operation may be allowed in a particular link. The low latency transmission operation may be a low latency transmission operation using a TWT operation. For example, when a target wake time service period (TWT SP) that is a reservation time for a low latency terminal is included in a beacon frame and is transmitted, if a STA supporting a low latency operation using a TWT function is not a STA reserved for the TWT SP time, the STA may be unable to perform a channel contention process for frame transmission. On the other hand, a STA not supporting the corresponding function may perform a channel access process for frame transmission even during the TWT SP. Due to a channel access operation of a STA not supporting a low latency function using the TWT operation, transmission of a frame reserved to be transmitted during the TWT SP may be suspended or may collide. Therefore, a required latency time of a frame requiring low latency time may fail to be satisfied. In order to prevent this situation, an AP and an AP MLD may designate a particular link to be used only by terminals performing a channel reservation process according to a low latency operation.

If an AP or an AP MLD designates a link for only terminals supporting a low latency operation, the AP or the AP MLD may reject an access request from a STA not supporting a corresponding function as described below.

The low latency operation is an operation for transmitting traffic (e.g., latency sensitive traffic) or frame sensitive to latency, and the traffic or frame sensitive to latency may be pre-configured traffic or frame. For example, in relation to the traffic or frame sensitive to latency, a TID (or access category (AC)) may be used to indicate corresponding traffic or frame as traffic or a frame sensitive to latency. Alternatively, the traffic or frame sensitive to latency may mean traffic or a frame required to be transmitted within a predetermined latency time, and may be indicated by a TID (or access category (AC)).

TWT schedules STAs to operate at different times so as to minimize contention and reduce a time during which a STA using a power management mode is required to be awake, so that a STA may manage activity in a BSS. A TWT operation may be an individual TWT individually configured by an AP or a broadcast TWT. That is, an AP may configure, for each STA, whether to perform a TWT operation or configure, for multiple STAs, whether to perform a TWT operation through a broadcast TWT, transmit the configuration to a non-AP STA. If a non-AP STA is scheduled to perform a TWT operation by an AP, the non-AP STA may perform a TWT operation for an interval of a TWT service period (SP).

A broadcast TWT operation used for a low latency operation may be called a restricted TWT operation. That is, a broadcast TWT operation may be performed as a restricted TWT operation in a case where a non-AP STA supports a restricted TWT operation by a particular parameter of a capability element (e.g., when a particular element is configured to "1"), and a corresponding beacon frame is configured by a particular field of the beacon frame as a frame for a restricted TWT operation. An SP configured for a broadcast TWT may be an SP for a restricted TWT operation.

A restricted TWT that is a TWT operation for transmission of a frame requiring low latency may be used to support improved medium access protection and resource reservation for traffic sensitive to latency.

A non-AP STA for which a TWT SP is configured by an AP STA is unable to transmit a frame other than a frame negotiated by an individual TWT to the AP STA in the TWT SP.

Hereinafter, a restricted TWT operation for a low latency operation may be called a TWT operation.

Figure 12:
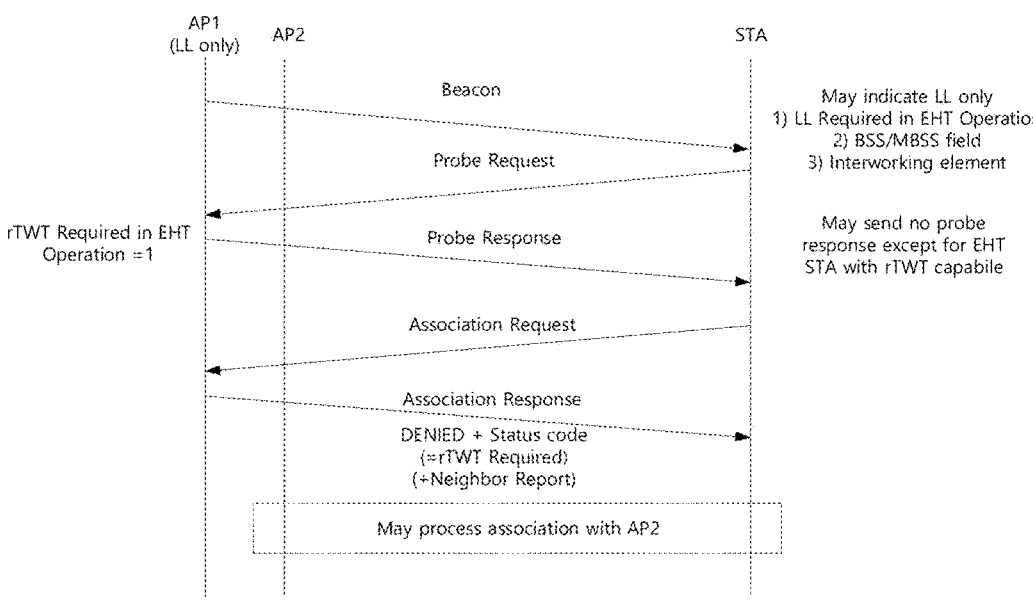
FIG. 12 shows a first embodiment illustrating an operation of restricting an access process of a terminal to perform a low latency function according to an embodiment of the present disclosure.

FIG. 12 shows a first embodiment illustrating an operation of restricting an access process of a terminal to perform a low latency function according to an embodiment of the present disclosure. A process identical to the access process described with reference to FIG. 5 and FIG. 11 will not be described with reference to FIG. 12.

Referring to FIG. 12, an AP MLD may include multiple APs, and each AP may operate a link. The AP MLD may designate one or more of the operated links as links for only terminals supporting a low latency operation. For example, a link operated by AP1 among the APs belonging to the AP MLD may be designated as a link for only terminals supporting a low latency operation. Alternatively, an AP not belonging to the AP MLD may be operated for only terminals supporting a low latency operation.

The AP or AP MLD may transmit a beacon frame or a probe response frame having a broadcast frame type, which includes an indicator indicating whether a low latency operation is supported. The low latency operation may be a low latency operation using a TWT function described below with reference to FIG. 18 and FIG. 19, and FIG. 21 to FIG. 23.

For example, in a case where a corresponding AP or AP MLD supports the low latency operation, the AP or AP MLD may mark, with 1, and transmit a field that indicates whether a low latency operation is supported, in a capability element included in a corresponding beacon frame and a corresponding broadcast probe response frame. In addition, the beacon frame and the broadcast probe response frame including an indicator indicating that a corresponding link is only for low latency terminals may be transmitted. For example, the beacon frame or the broadcast probe response frame including an EHT operation information element including an indicator (e.g., an rTWT required field) notifying that support for a low latency operation is needed may be transmitted. Alternatively, an IBSS STA subfield and an ESS subfield of a capability information field in the beacon frame or the broadcast probe response frame may both be configured to have a value of 1, so that a conventional STA not supporting a low latency operation fails to recognize a BSS type of the corresponding AP. As another example, the beacon frame or the broadcast probe response frame may further include an interworking information element, and an access network type subfield in an access network options field of the interworking information element may indicate that the corresponding link is a link for a low latency operation. A STA MLD or an STA not supporting a low latency operation among STAs not belonging to a STA MLD may identify the indicator indicating the link being a link for only low latency terminals, in the corresponding beacon frame or the corresponding broadcast probe response frame, and the STA or the STA MLD having identified the indicator may not perform an active scanning process and an access process with the corresponding AP or AP MLD.

A STA MLD or a STA not belonging to a STA MLD may attempt to perform a scanning and access process with the AP or AP MLD as described above with reference to FIG. 5. For example, the STA MLD or STA may transmit a probe request frame to the AP or AP MLD. The STA or STA MLD may include information on a function supported by the STA or STA MLD in the corresponding probe request frame. For example, in a case where the corresponding STA or STA MLD supports a low latency operation, the STA or STA MLD may configure, to be 1, and transmit an indicator field indicating support of the corresponding function in a capability element included in the corresponding probe request frame. On the other hand, if the corresponding STA or STA MLD does not support the corresponding function, the STA or STA MLD may configure, to be 0, and transmit a field indicating whether a low latency operation is supported, in a capability element included in the probe request frame.

The AP or AP MLD may receive the probe request frame from the STA or STA MLD, and may identify whether the STA or STA MLD supports a low latency operation. If the STA or STA MLD is identified as not supporting a low latency operation, the AP or AP MLD may not transmit a probe response frame that is a response for the probe request frame. Alternatively, the AP or AP MLD may indicate that the AP is an AP supporting only low latency terminals when the AP or AP MLD transmits a probe response frame that is a response for the probe request frame. An indicator indicating that the AP is an AP supporting only low latency terminals may be an indicator indicating that a corresponding link is a link for only low latency terminals described above. If the STA or STA MLD does not support a low latency operation, the STA or STA MLD may identify, in the probe response frame, an indicator indicating that the corresponding link is a link for only low latency terminals, and may not perform an access process with the AP or AP MLD.

If the STA supports the low latency operation or is unable to decipher an indicator in the beacon frame and the probe response frame, the STA may transmit an access request frame to the AP, based on a result of scanning as described with reference to FIG. 5. The AP having received the access request may transmit an access response frame as a response for the access request frame. In a case where the STA having transmitted the access request frame supports the low latency operation, the access response frame may include an indicator accepting the access request. On the other hand, in a case where the STA having transmitted the access request frame does not support the low latency operation, the access response frame may include an indicator rejecting the access request. The AP may indicate, in a state code field of the access response frame rejecting the access request, the access request having been rejected due to the STA not supporting a low latency operation. For example, the AP may configure the state code field to have a field value (e.g., 133) indicating LOW_LATENCY_SUPPORT_NEEDED, and then transmit the access response frame. When the AP included in the AP MLD rejects the corresponding access request as a response for the access request frame, the AP may further include another link information to propose access to another link. Information on a normal link that is not the link only for a low latency terminal may be transmitted in the form of a neighbor report information element. The neighbor report information element may include at least one of a BSSID, a channel and an operation class, and timing information.

The STA having received the access response frame including a rejection indicator from the AP may identify the contents of the received access response frame, and may identify that the access request has been rejected. The STA may identify the value of the state code field in the access response frame, thereby identifying that the corresponding link needs support of a low latency operation, and may identify whether the access response frame includes a neighbor report information element. If the response frame includes the neighbor report information element, the STA may identify the corresponding contents to identify proposed BSS information. The STA may identify another link information included in the neighbor report information element, and move to a channel indicated by the information to perform, with an AP of a corresponding link, an access process described with reference FIG. 5 or FIG. 11.

If the low latency operation is based on a TWT operation of a wireless LAN operation, the AP or AP MLD configuring the link only for a low latency terminal may exceptionally allow access of a terminal supporting a TWT function for a low power operation. If access of a conventional wireless LAN terminal supporting the TWT function is allowed, the AP or AP MLD may accept or reject an access request of an STA as described below.

Figure 13:
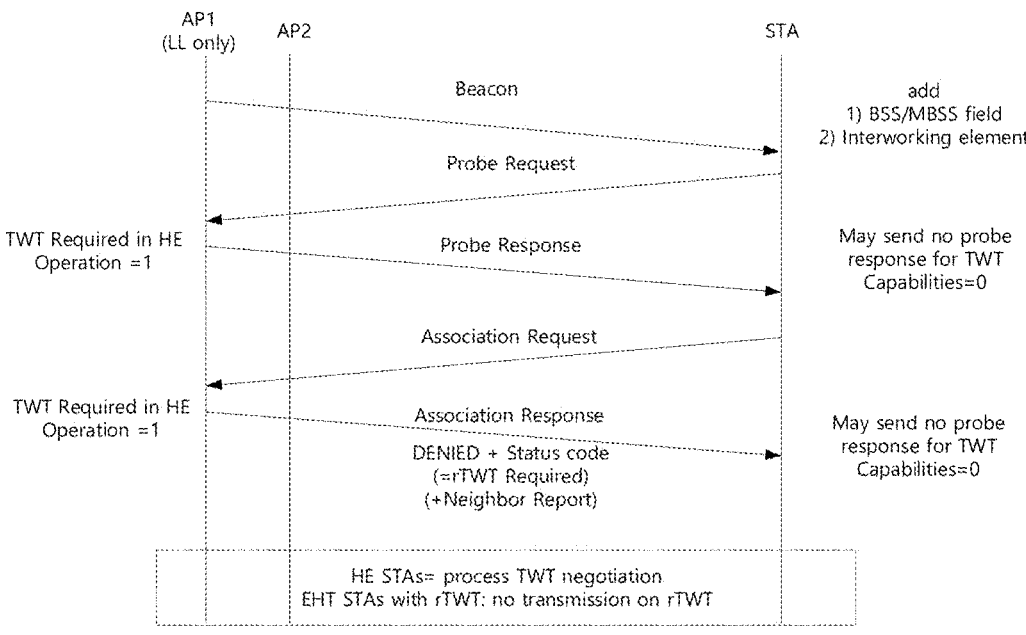
FIG. 13 shows a second embodiment illustrating an operation of restricting an access process of a terminal to perform a low latency function according to an embodiment of the present disclosure.

FIG. 13 shows a second embodiment illustrating an operation of restricting an access process of a terminal to perform a low latency function according to an embodiment of the present disclosure. A part as described in the access process of FIG. 5, FIG. 11, and FIG. 12 will not be described with reference to FIG. 13.

Referring to FIG. 13, an AP MLD may include multiple APs, and each AP may operate a link. The AP MLD may designate one or more of the operated links as links for only terminals supporting a latency operation using a TWT function. For example, a link operated by AP1 among the APs belonging to the AP MLD may be designated as a link for only terminals supporting a low latency operation using a TWT function. Alternatively, an AP not belonging to the AP MLD may be operated for only terminals supporting a low latency operation using a TWT function.

The AP or AP MLD may transmit a beacon frame or a probe response frame having a broadcast frame type, which includes an indicator indicating that a low latency operation using a TWT function is supported. For example, the AP or AP MLD may configure, to be 1, and transmit an indicator that indicates whether a low latency operation using a TWT function is supported, in a capability element included in the beacon frame or the broadcast probe response frame. In addition, the beacon frame or the broadcast probe response frame including an indicator indicating that the corresponding link is only for terminals supporting a TWT operation may be transmitted. For example, the beacon frame or the broadcast probe response frame including an EHT operation information element including an indicator (e.g., a TWT operation required field) notifying that support of a TWT operation is needed may be transmitted. Alternatively, as described with reference to FIG. 12, support of a TWT function may be required through an access network type subfield in an access network options field of the interworking information element or a capability information field. A STA MLD or an STA not supporting a TWT operation among STAs not belonging to a STA MLD may identify the indicator indicating the link being a link for only terminals supporting a TWT function, in the corresponding beacon frame or the corresponding broadcast probe response frame, and the STA or the STA MLD having identified the indicator may not perform an active scanning process and an access process with the corresponding AP or AP MLD. The AP or AP MLD may configure, to be 1, a TWT required field in a HE operation information element of the beacon frame or the broadcast probe response frame, thereby indicating that a negotiation process for a TWT operation is required for a STA MLD or an STA supporting a TWT function but not supporting a low latency operation using the TWT function.

A STA MLD or a STA not belonging to a STA MLD may attempt to perform a scanning and access process with the AP or AP MLD as described above with reference to FIG. 5. For example, the STA MLD or STA may transmit a probe request frame to the AP or AP MLD. The STA or STA MLD may include information on a function supported by the STA or STA MLD in the corresponding probe request frame. For example, in a case where the corresponding STA or STA MLD supports TWT, the STA or STA MLD may configure, to be 1, and transmit an indicator field (e.g., a TWT Requester Support field) indicating support of the corresponding function in a HE capability element included in the corresponding probe request frame. In addition, if the STA or STA MLD supports a low latency operation using a TWT function, the STA or STA MLD may additionally further include an indicator supporting the corresponding function in the probe request frame, and transmit same. For example, the STA or STA MLD may configure, to be 1, and transmit an indicator field indicating support of the corresponding function in an EHT capability element included in the probe request frame. On the other hand, if the corresponding STA or STA MLD does not support the corresponding function, the STA or STA MLD may configure, to be 0, and transmit a field indicating whether a TWT function is supported and a field indicating whether a low latency operation using the TWT function is supported, in a HE capability element and an EHT capability element included in the probe request frame.

The AP or AP MLD may receive the probe request frame from the STA or STA MLD, and may identify whether the STA or STA MLD supports a TWT function and a low latency operation using the TWT function. If the STA or STA MLD is identified as not supporting a TWT function, the AP or AP MLD may not transmit a probe response frame that is a response for the probe request frame. Alternatively, the AP or AP MLD may indicate that the AP requires support of a TWT function when the AP or AP MLD transmits a probe response frame that is a response for the probe request frame. An indicator indicating that support of the TWT function is required may be the indicator notifying that support of a TWT operation is needed, as described above. If the STA or STA MLD does not support a TWT function, the STA or STA MLD may identify, in the probe response frame, an indicator requiring a TWT function, and may not perform an access process with the AP or AP MLD. The AP or AP MLD may configure, to be 1, a TWT required field in a HE operation information element of the probe response frame, thereby indicating that a negotiation process for a TWT operation is required for a STA MLD or an STA supporting a TWT function but not supporting a low latency operation using the TWT function.

If the STA or STA MLD supports a TWT function or is unable to decipher an indicator in the beacon frame and the probe response frame, the STA may transmit an access request frame to the AP, based on a result of scanning as described with reference to FIG. 5. The AP having received the access request may transmit an access response frame as a response for the access request frame. In a case where the STA having transmitted the access request frame supports the TWT operation, the access response frame may include an indicator accepting the access request. A TWT required field in a HE operation information element of the access response frame may be configured to be 1, thereby indicating that a negotiation process for a TWT operation is required for a STA MLD or an STA supporting a TWT function but not supporting a low latency operation using the TWT function. On the other hand, in a case where the STA having transmitted the access request frame does not support the TWT operation, the access response frame may include an indicator rejecting the access request. The AP may indicate, in a state code field of the access response frame rejecting the access request, the access request having been rejected due to the STA not supporting a TWT function. For example, the AP may configure the state code field to have a field value (e.g., 134) indicating TWT_REQUESTER-_SUPPORT_NEEDED, and then transmit the probe response frame. When the AP included in the AP MLD rejects the corresponding access request as a response for the access request frame, the AP may further include another link information to propose access to another link, as shown in FIG. 12. Information on a normal link that is not the link only for a low latency terminal may be transmitted in the form of a neighbor report information element. The neighbor report information element may include at least one of a BSSID, a channel and an operation class, and timing information.

The STA having received the access response frame including a rejection indicator from the AP may identify the contents of the received access response frame, and may identify that the access request has been rejected. The STA may identify the value of the state code field in the access response frame, thereby identifying that the corresponding link needs support of a TWT operation, and may identify whether the access response frame includes a neighbor report information element. If the response frame includes the neighbor report information element, the STA may identify the corresponding contents and perform an access process with an AP indicated by the information element as shown in FIG. 12.

The AP or AP MLD may configure, to be 1, a TWT required field in a HE operation element transmitted thereby. A STA MLD or a STA supporting a TWT function but not supporting a low latency operation using the TWT function among STAs not belonging to a STA MLD may recognize that a negotiation process for a TWT operation is required after an access process with the corresponding AP or AP MLD. Accordingly, the STA or STA MLD may perform a negotiation process for a TWT operation with the AP during or after an access process performed with the AP or AP MLD. A frame transmission operation may not be performed during a time except for a negotiated TWT SP after negotiation about the TWT operation. If the STA or STA MLD supports both a TWT operation and a low latency operation using a TWT function, the STA or STA MLD may not perform a separate negotiation process for a TWT operation after the access operation. The STA or STA MLD may identify a TWT SP for a low latency operation transmitted by an AP in a beacon frame or a broadcast probe response frame, and may terminate a frame transmission process before a start time point of the TWT SP. That is, if there is no negotiation with an AP in advance, a STA or STA MLD supporting a low latency operation may not perform frame transmission for a TWT SP time for a low latency operation. In other words, a frame transmission operation may be terminated before a start time of a TWT SP for a low latency operation.

An AP MLD or an AP not belonging to an AP MLD may measure information on a frame transmission latency time for a link operated thereby. The measurement of the transmission latency time may be continuously updated and stored in the AP according to a period of a predetermined time (e.g., 100 ms). In a case of an AP MLD supporting a low latency transmission operation, the AP MLD may provide statistics information related to a transmission latency time of a frame transmitted in each link operated thereby. That is, each AP belonging to an AP MLD may provide statistics information related to a transmission latency time of a frame transmitted by a corresponding AP and another AP belonging to the same AP MLD. The statistics information may be transmitted after being included in a beacon frame, a probe response frame, and an access response frame transmitted by the AP MLD. If there is a frame requiring a low latency time, a STA having identified the statistics information may perform an access process with an AP belonging to the AP MLD through operations in FIG. 5, and FIG. 12 and FIG. 13, based on the corresponding information. If there is a frame requiring a low latency time, a STA MLD having identified the statistics information may perform an access process and a negotiation process for a multi-link operation with the AP MLD through operations in FIG. 5 and FIG. 11 to FIG. 13, based on the corresponding information. In addition, the STA MLD may determine which link through which the STA MLD is to transmit a frame requiring a low latency time, based on the corresponding information.

The statistics information may be transmitted in a form of a measurement report information element. An information element related to the transmission latency time may be STA statistics indicated by a measurement type field of a measurement report information element being configured to be 7, and a corresponding BSS thereof may include an average channel access time (delay) for each access category (AC). Alternatively, the information element may include retransmission count information depending on each user priority (UP) value. Alternatively, the measurement report information element may include an average transmission time and a transmission success probability for each AC.

FIG. 14 is a block diagram illustrating a link state information element including information on a transmission state in a corresponding link according to an embodiment of the present disclosure.

Referring to FIG. 14, a measurement report information element including information on a transmission state in a link may include an element ID field, a length field, a field indicating the type of measured information, a field indicating a measurement duration, a field indicating a measurement information group, and a field indicating measured data information. The element ID field, the length field, and the field indicating the type of measured information may be configured to be identical or similar to STA statistics. The measurement group information field may be configured to be 17 to indicate that the information is information on a transmission latency time transmitted by a corresponding AP. The measurement information may include at least one of the average transmission time for all frames transmitted in a corresponding link, the average transmission time for all frames transmitted in a corresponding link, the AC-specific average transmission time of frames transmitted in a corresponding link, the variance of the AC-specific average transmission time of frames transmitted in a corresponding link, a top 95% value of AC-specific transmission times of frames transmitted in a corresponding link, a transmission failure probability of all frames transmitted in a corresponding link, and the AC-specific transmission failure probability of frames transmitted in a corresponding link. The transmission time may be calculated as a time from a time point at which a frame to be transmitted by a corresponding AP is generated, to a time point of receiving an ACK frame according to the completion of transmission of the frame. Alternatively, the transmission time may be calculated as a time from a time point at which a frame to be transmitted by a corresponding AP is generated, to a transmission end time point at which transmission or retransmission is performed before reception of an ACK frame according to the completion of transmission of the frame. The transmission failure probability may be calculated as "(the number of times that transmission fails due to excess of a frame retransmission limit count)/(the number of times that an ACK for frame transmission is received+the number of times that transmission fails due to excess of a frame retransmission limit count)" during a corresponding measurement duration.

A STA or STA MLD that is to transmit a frame requiring a low latency time may indicate information on a required latency time for the corresponding frame to an AP or AP MLD. The frame having the low latency time may be specified as a particular traffic stream (TS). If the frame having the low latency time is data allocated to a particular TS, the STA or STA MLD may perform a negotiation process with an AP or AP MLD to add a TS for the data. For example, a process in which the STA transmits, to the AP, a TS add request frame for adding a TS for traffic requiring a low latency time, and the AP transmits a TS add response frame as a response for the TS add request frame may be performed. Through a corresponding TS add negotiation operation, the STA may transmit, to the AP, one or more of information on a latency time required by data of a TS to be added, a data size, and a required transmission speed of the corresponding data.

A STA or STA MLD that is to transmit a frame requiring a low latency time may perform a negotiation process with an AP or AP MLD to perform a low latency operation. The negotiation process for the low latency operation may be performed identically or similarly to a negotiation process for a TWT operation. That is, when a STA transmits a request frame to an AP to perform a low latency operation, the corresponding request frame may be a TWT request frame. A response frame for a low latency operation from an AP to a STA may be a TWT response frame.

The request frame for the low latency operation including information on a required latency time for a frame to be transmitted may be transmitted. The low latency operation request frame including a required latency time and frame generation information will be described with reference to FIG. 15.

Figure 15:
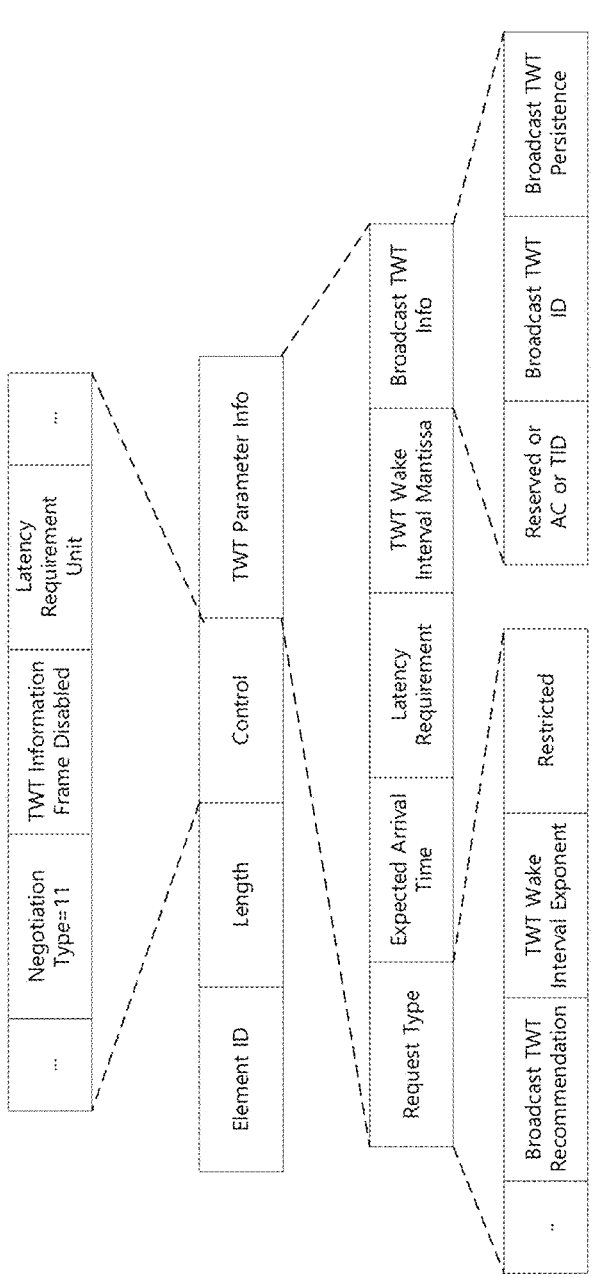
FIG. 15 shows a first embodiment illustrating a structure of a low latency operation request frame requesting a low latency operation using a target wake time (TWT) function according to an embodiment of the present disclosure.

FIG. 15 shows a first embodiment illustrating a structure of a low latency operation request frame requesting a low latency operation using a target wake time (TWT) function according to an embodiment of the present disclosure.

Referring to FIG. 15, the frame requesting the low latency operation may be configured in a type of a TWT request frame. Therefore, the corresponding request frame may include a TWT information element. The TWT information element included in the low latency operation request frame may include an element ID field, a length field, a control field, and a parameter field related to a low latency operation using a TWT operation. An NDP paging indicator field that is a field related to a channel measurement operation, a field indicating whether a TWT responder switches to a PS mode, a field indicating a TWT negotiation type, a field indicating whether TWT schedule adjustment is possible, and a field indicating a unit of a required latency time may be included. The remaining fields in the control field except for the field indicating a unit of a required latency time may be configured by the same method as a configuration method performed for negotiation for a broadcast TWT operation. For example, in the TWT request frame for the low latency operation, the NDP paging indicator field may be configured to be 0 and the field indicating whether a TWT responder switches to a PS mode may be configured to be 0, so that corresponding functions are not used. The field indicating the TWT negotiation type may be configured to be 3, so that a corresponding TWT operation is a request frame for negotiation being a broadcast TWT type that is a type of periodically transmitting a TWT SP for low latency terminals in a beacon frame. The unit field related to a required latency time indicates a unit of a maximum latency time averagely required by a frame requesting a corresponding low latency operation, and if the field is 0, the unit may be 256 μs, and if the field is 1, the unit may be 32 μs.

The parameter field related to a low latency operation using a TWT operation may include one or more of a request type field, a field indicating a time point at which low latency traffic is predicted to occur, a required latency time field, a valid number field related to a period of a low latency time based on a requested TWT operation, and a broadcast TWT information field.

The request type field may include a field indicating whether the frame is a TWT request frame, a TWT configuration indication field, a trigger field, an operation type field, a field of an operation type during a broadcast TWT time (or broadcast TWT SP), an index field related to a period of a required low latency time, and a field indicating that a corresponding TWT operation corresponds to a TWT for a low latency operation. For example, the request type field may include a particular field indicating that a TWT operation by a corresponding frame is a restricted TWT operation. According to the value of the particular field, a frame which is able to transmitted during a TWT SP according to a TWT operation may be limited to a particular frame for a downlink frame, or a broadcast SP may be configured as a restricted TWT SP. That is, if the value of the particular field (e.g., a broadcast TWT recommendation field) is "1", a frame which is able to transmitted during a TWT SP according to a TWT operation may be limited to a particular frame for a downlink frame, and if the value of the particular field is "4", a broadcast TWT SP may be configured as a restricted TWT SP.

The remaining fields in the request type field except for the field of an operation type during a broadcast TWT time, the index field TWT field related to a period of a required low latency time, and the field indicating that a corresponding TWT operation corresponds to a TWT for a low latency operation may be configured in the same type as a TWT information element included in a conventional broadcast TWT request frame.

The field of an operation type during a broadcast TWT time is used to restrict frame transmission for a corresponding TWT SP time. For example, when transmission is restricted only in a type of a response frame (e.g., an ACK or BlockAck frame for a downlink data frame, or an uplink frame transmitted as a response for a trigger frame) for a downlink frame for a corresponding TWT SP, the corresponding field may be configured to be 1.

In addition, if an AC transmitted within a TWT SP duration for a corresponding low latency terminal is requested to be restricted, the corresponding field may be configured to be 4. When an additional protection operation (e.g., a quiet time setup frame, an RTS frame, or an MU-RTS frame) for protecting a corresponding SP is to be requested at a TWT SP start point for a corresponding low latency terminal, the corresponding field may be configured to be 5. When it is required that STA-to-STA communication is possible for a corresponding TWT SP, the corresponding field may be configured to be 6. The index field related to the period of the required low latency time may indicate an SP period for a required TWT-based low latency operation together with the valid number field related to a period of a low latency time described above. For example, the SP period for the required TWT-based low latency operation may be represented by "(the value of a valid number field for a period of a low latency time)×2^(the value of an index field for a period of a low latency time)". If the field indicating that a corresponding TWT operation corresponds to a TWT for a low latency operation is configured to be 1, this may indicate that a corresponding TWT information element is for a low latency operation.

That is, in a case where a TWT SP is scheduled, a non-AP STA may, during the TWT SP, transmit or receive only limited frames (e.g., frames requiring low latency or sensitive to latency) and be unable to transmit or receive other frames, or preferentially transmit or receive only limited frames (e.g., the limited frames may have a high priority).

The field indicating a time point at which low latency traffic is predicted to occur may indicate a time point at which a frame requiring a corresponding low latency time is predicted to occur. The required latency time field is a maximum latency time required in a corresponding field, and may indicate a required latency time of uplink and downlink for a corresponding type of frame together with the unit field related to a required latency time described above. The broadcast TWT information field may be configured by the same method as a field configuration method for a conventional broadcast TWT operation. Alternatively, if a corresponding TWT operation request frame requests a TWT SP permitted only for a particular AC and ACs having a higher priority than that of the particular AC (e.g., the field of an operation type during the TWT time is configured to be 4), the broadcast TWT information field may include an AC or TID to be restricted instead of a broadcast TWT ID field.

That is, the broadcast TWT information field may include information related to a TID for which frame transmission is restricted by a TWT for a low latency operation.

Specifically, the broadcast TWT information field may include a field including information related to a TID. The field including information related to a TID may include a control field, a DL bitmap (or restricted TWT DL TID bitmap) field, and a UL bitmap (or restricted TWT UL TID bitmap) field.

The controller field may include a DL bitmap validity field (or DL TID bitmap validity field), a UL bitmap validity field (or UL TID bitmap validity field), and a reserved field.

The DL bitmap validity field is a field indicating the validity of a DL bitmap field. If the field is configured to be "0", this indicates that a downlink frame for all TIDs is traffic sensitive to latency, and if the field is configured to be "1", this indicates that downlink traffic having a TID corresponding to the value of "1" in a DL bitmap is traffic sensitive to latency and downlink traffic having a TID corresponding to the value of "0" is traffic that is not sensitive to latency.

The UL bitmap validity field is a field indicating the validity of a UL bitmap field. If the field is configured to be "0", this indicates that an uplink frame for all TIDs is traffic sensitive to latency, and if the field is configured to be "1", this indicates that uplink traffic having a TID corresponding to the value of "1" in a UL bitmap is traffic sensitive to latency and uplink traffic having a TID corresponding to the value of "0" is traffic that is not sensitive to latency. Information on a low latency time period based on the TWT operation may be configured to be an occurrence period of a frame requiring a low latency time to be transmitted in a corresponding low latency operation.

If a TS negotiation for traffic requiring a low latency time is ended before a negotiation process for a low latency operation using a TWT function as described above, the negotiation process for the low latency operation may not include a required latency time. In this case, a corresponding low latency operation request frame may be configured as shown in FIG. 16 described below.

Figure 16:
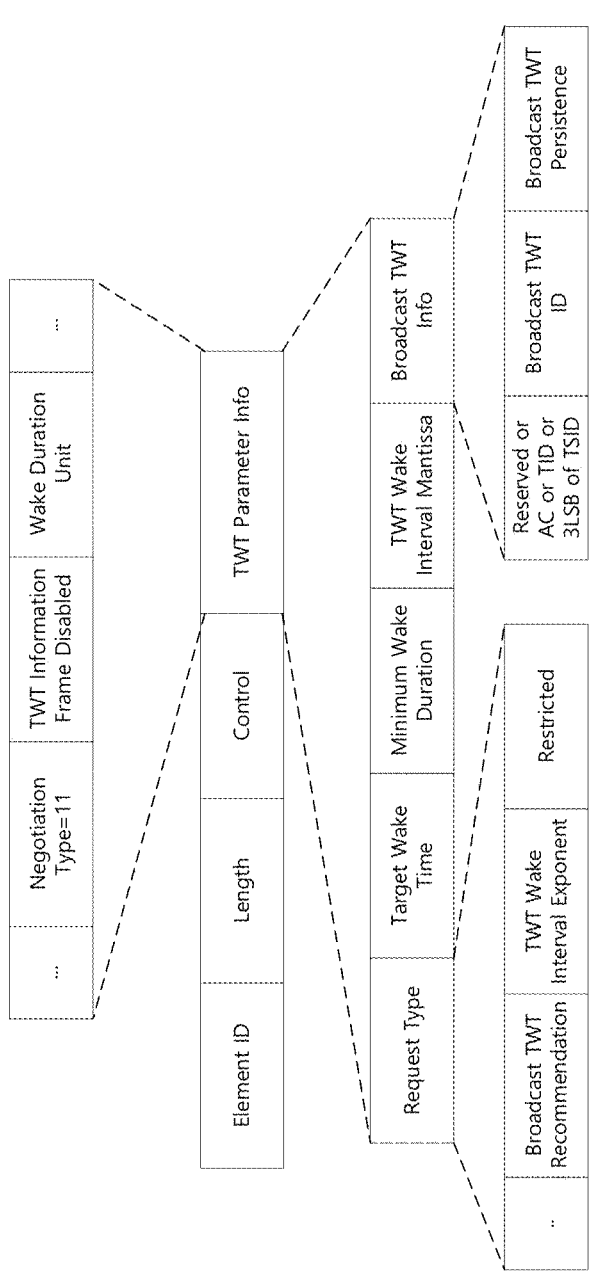
FIG. 16 shows a second embodiment illustrating a structure of a low latency operation request frame requesting a low latency operation using a TWT function according to an embodiment of the present disclosure.

FIG. 16 shows a second embodiment illustrating a structure of a low latency operation request frame requesting a low latency operation using a TWT function according to an embodiment of the present disclosure. The same part as described with reference to FIG. 15 will not be described with reference to FIG. 16.

Referring to FIG. 16, a latency operation request frame that requests a low latency operation by using a TWT function may be configured to be similar to a TWT operation request frame for negotiation about a broadcast TWT operation. Therefore, the frame may include a TWT information element, and the TWT information element may include an element ID field, a length field, a control field, and a TWT parameter information field. The element ID field, the length field, and the control field may be configured to be the same as configured in a request frame for negotiation about a broadcast TWT.

The TWT parameter information field may include a request type field, a TWT field, a minimum time for which a STA maintains to be awake during a TWT time, a valid number of the interval between TWT SPs, and broadcast TWT information. The remaining fields in the request field except for a field of an operation type during a TWT time, and a field indicating that a corresponding TWT operation corresponds to a TWT for a low latency operation may be configured in the same method as a conventional broadcast TWT configuration method. The field of an operation type during a TWT time, and the field indicating that a corresponding TWT operation corresponds to a TWT for a low latency operation may be configured as shown in FIG. 15. If exchange of a corresponding TWT operation request frame is transmitted after a negotiation process for adding a TS, allocation of a TWT SP limited to a particular traffic stream ID (TSID) may be requested. In this case, the field of an operation type during a TWT time may be configured to be 7. An indication field indicating that a corresponding TWT request frame is a TWT request frame for a low latency operation as described with reference to FIG. 15 may be added to the request field. The broadcast TWT information field may be configured to be the same as a low latency operation request frame using a TWT described with reference to FIG. 15. Alternatively, if a corresponding TWT operation request frame requests provision of a TWT SP limited to a particular AC (e.g., the field of an operation type during the TWT time is configured to be 7), the broadcast TWT information field may include the lowest three bits of a TSID to be restricted instead of a broadcast TWT ID field.

An AP or AP MLD may identify the contents of the low latency operation request frame using the TWT function as illustrated in FIG. 15 or FIG. 16. According to information such as a required latency time and a traffic occurrence period identified in the request frame, one of broadcast TWTs for a low latency operation allocated by an AP may be allocated. Alternatively, a new broadcast TWT for only corresponding traffic may be generated and a TWT SP for a low latency operation may be allocated. If a broadcast TWT is allocated for a low latency operation request using a correspond TWT operation in the above method, a low latency operation response frame may be transmitted as a response for a low latency operation request frame using a TWT operation. Alternatively, if it is unable to accept the low latency operation request, a low latency operation response frame rejecting the corresponding request may be transmitted. In this case, a corresponding low latency operation response frame may be configured as below.

Figure 17:
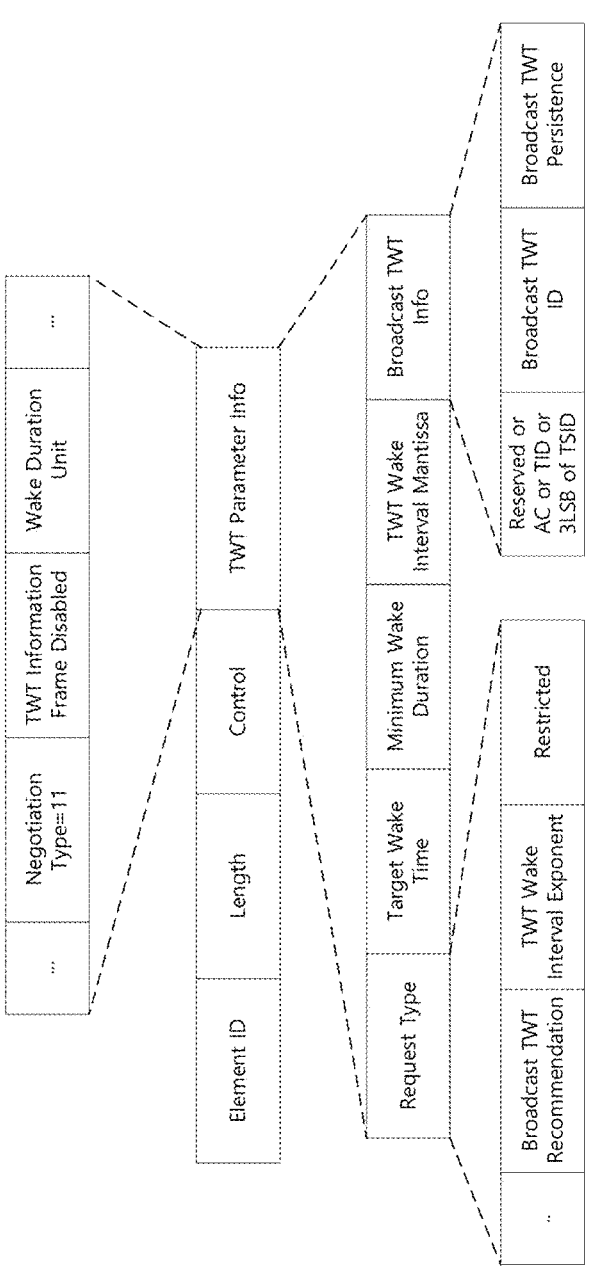
FIG. 17 is a block diagram illustrating a low latency operation response frame that is a response for a request frame requesting a low latency operation using a TWT function according to an embodiment of the present disclosure.

FIG. 17 is a block diagram illustrating a low latency operation response frame that is a response for a request frame requesting a low latency operation using a TWT function according to an embodiment of the present disclosure. A description for a part having the same configuration as that of a request frame requesting a low latency operation using a TWT function in FIG. 15 and FIG. 16 will be omitted.

Referring to FIG. 17, the latency operation response frame using the TWT may be configured to be similar to a response frame for a broadcast TWT operation. That is, a TWT information element included in a response frame for a broadcast TWT operation may be included. The TWT information element may include an element ID field, a length field, a control field, and a TWT parameter information field. The element ID field, the length field, and the control field may be configured to be the same as configured in a response frame for negotiation about a broadcast TWT.

The TWT parameter information field may include a request type field, a TWT field, a minimum time for which a STA maintains to be awake during a TWT time, a valid number of the interval between TWT SPs, and broadcast TWT information. The remaining fields in the request type field except for a field of an operation type during a TWT time, and a field indicating that a corresponding TWT operation corresponds to a TWT for a low latency operation may be configured in the same method as a conventional broadcast TWT configuration method. The field indicating that a corresponding TWT operation corresponds to a TWT for a low latency operation may be configured to be the same as shown in FIG. 15 and FIG. 16. The field of an operation type during a broadcast TWT time is used to restrict frame transmission for a corresponding TWT SP time as shown in FIG. 15 and FIG. 16. For example, when transmission is restricted only in a type of a response frame (e.g., an ACK or BlockAck frame for a downlink data frame, or an uplink frame transmitted as a response for a trigger frame) for a downlink frame for a negotiated TWT SP presented in a corresponding response frame, the corresponding field may be configured to be 1. In addition, if an AC transmitted within a TWT SP duration for a corresponding low latency terminal is configured to be restricted, the corresponding field may be configured to be 4. When an additional protection operation (e.g., a quiet time setup frame, an RTS frame, or an MU-RTS frame) for protecting a corresponding SP is to be performed at a TWT SP start point for a corresponding low latency terminal, the corresponding field may be configured to be 5. When STA-to-STA communication is allowed during a corresponding TWT SP, the corresponding field may be configured to be 6. If a negotiation for a corresponding TWT operation is transmitted after a negotiation process for adding a TS, allocation of a TWT SP limited to a particular traffic stream ID (TSID) may be requested. In this case, the field of an operation type during a TWT time may be configured to be 7. An indication field indicating that a corresponding TWT request frame is a TWT request frame for a low latency operation as described with reference to FIG. 15 and FIG. 16 may be added to the request field. The broadcast TWT information field may be configured to be the same as a response frame for a conventional broadcast TWT negotiation. If a TWT SP duration for a corresponding low latency operation is to be restricted to allow only transmission of a frame having a priority higher than or equal to that of a particular AC (e.g., the field of the operation type during the TWT time is configured to be 4), an AC to be restricted may be further included in a broadcast TWT information field of the response frame. If a particular TSID of a frame that is able to be transmitted during a corresponding TWT SP is to be restricted (e.g., the field of the operation type during the TWT time is configured to be 7), a TSID to be restricted may be further included in a broadcast TWT information field of the response frame.

A negotiation process and an operation process for a low latency operation using a TWT operation with the low latency operation request frame and the low latency operation response frame may be performed as follows.

Figure 18:
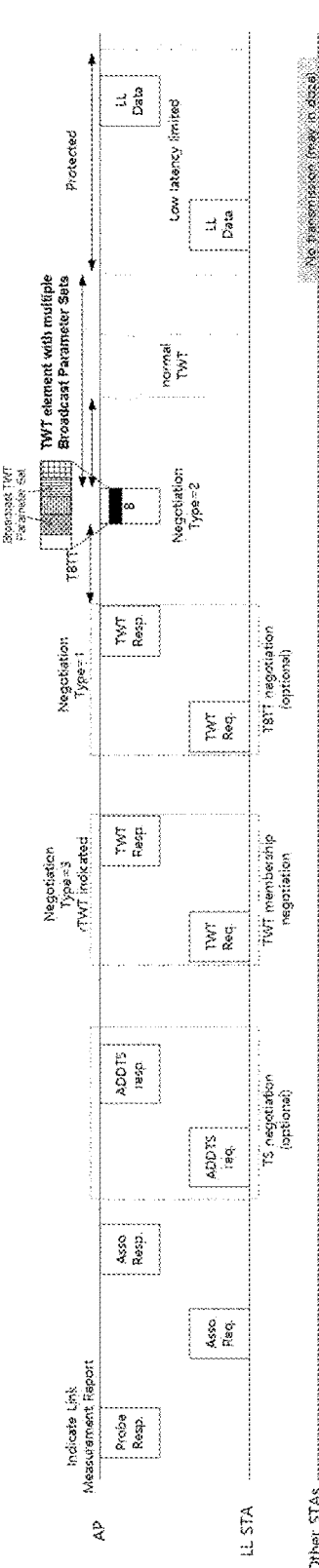
FIG. 18 shows a first embodiment illustrating a process in which an AP or an AP MLD and a STA perform a low latency operation using a TWT function according to an embodiment of the present disclosure.

FIG. 18 shows a first embodiment illustrating a process in which an AP or an AP MLD and a STA perform a low latency operation using a TWT function according to an embodiment of the present disclosure.

Referring to FIG. 18, a process of performing the low latency operation for the TWT operation may include identifying, by an STA and an AP, a function of a low latency operation, transmitting, by the STA, a low latency operation request frame and transmitting, by the AP, a corresponding low latency operation response frame to negotiate about a low latency operation using a correspond TWT operation, and allocating, by the AP, a TWT SP for a low latency operation to a broadcast probe response frame and a beacon frame so that the low latency operation is performed. Before the negotiating about a low latency operation using a corresponding TWT operation, performing a negotiation to add a TS to the STA and the AP may be additionally included. In addition, after the negotiating about a low latency operation using a correspond TWT operation, performing a negotiation to exchange a timing of a beacon frame by which a TWT SP negotiated in the STA is allocated may be additionally included.

The identifying of the function of the low latency operation may be performed during a scanning and access process performed between an AP or AP MLD and a STA or STA MLD. The scanning and access process may be performed through a process described with reference to FIG. 5 and FIG. 11 to FIG. 13. Here, the AP and STA may transmit a capability element including an indicator that indicates whether a low latency operation using a TWT function is supported. In addition, the AP or AP MLD may transmit a beacon frame and a probe response frame including statistics information related to a transmission time of a frame transmitted in a corresponding link for all links operated thereby. The statistics information may be a measurement report information element. Alternatively, the statistics information may be a measurement report information element as illustrated in FIG. 14. A STA or STA MLD may identify statistics information transmitted by an AP or AP MLD, and perform an access process with the AP or AP MLD, based on the information.

The process of performing a negotiation to perform a low latency operation using a TWT operation after the scanning and access process may be started through a process of transmitting, by the STA, a low latency operation request frame using a TWT operation to the AP. The low latency operation request frame using the TWT operation may be configured as shown in FIG. 15 and FIG. 16. The request frame may be an action frame. An AP supporting a low latency operation may receive a low latency operation request frame using the TWT operation from a STA, and may identify that the STA requests TWT SP allocation for a frame requiring low latency time, based on received contents. If the AP is capable of allocating a TWT SP corresponding to the request frame, the AP may transmit a low latency operation response frame using a TWT as a response for the request frame. The TWT operation response frame may be configured as shown in FIG. 17.

If the STA and AP has performed a negotiation process for adding a TS, the AP may transmit a low latency operation response frame using a TWT operation, which has not been requested, to support the TS. In this case, after the negotiation for adding the TS, the STA may not transmit a separate request frame, and transmit a frame requiring low latency time during a corresponding TWT SP. In a case where the STA is not to perform a low latency operation according to a parameter included in a low latency operation response frame that has not been requested, the STA may release the corresponding low latency operation through a TWT release frame, and transmit a low latency operation request frame using a new TWT operation to request the AP to perform a low latency operation based on the TWT operation.

If a low latency operation negotiation process using the TWT operation is ended, the AP may assign a broadcast TWT ID for a TWT SP to be allocated to the corresponding STA. The broadcast TWT ID may be received through a low latency operation response frame described with reference to FIG. 17. Multiple STAs may receive the same TWT ID assigned thereto. A low latency operation method using the TWT operation may proceed similar to a broadcast TWT operation method. That is, a TWT element including a broadcast TWT SP for all broadcast TWT IDs configured in a corresponding AP in a beacon frame and a broadcast probe response frame may be transmitted. Some broadcast TWT IDs may be TWT SPs for a low latency operation. The STA with which a low latency operation negotiation is completed through a corresponding TWT operation may identify a broadcast TWT ID assigned through the low latency operation response frame, and may identify a TWT parameter including the assigned broadcast TWT ID in a TWT element included in a beacon frame. The STA may transmit or receive a frame requiring low latency time at a time point indicated by the TWT parameter. If a TWT SP represented in a TWT element is identified as a TWT SP for a low latency operation, the STA to which a corresponding broadcast TWT ID has been assigned may not perform a frame transmission operation for the TWT SP.

The TWT element may be included in a control frame or a management frame, such as a beacon frame and a probe response frame and then be transmitted.

In order to additionally protect transmission of a frame for the low latency operation, the AP may additionally transmit an information element for protecting a corresponding time in a beacon frame. For example, when a TWT SP for a low latency operation is transmitted in a beacon frame, one or more quiet information elements configured to include the same time for some of corresponding multiple TWT SPs or all TWT SPs for a low latency operation may be additionally transmitted. A STA to which a TWT SP has not been allocated at the same time point as a corresponding time among STAs having received the corresponding quiet information element may configure a NAV for a time included in the quiet information element, and not perform frame transmission. If a TWT SP time indicated by a TWT parameter including an allocated broadcast TWT ID coincides with a time of a received quiet information element, the corresponding STA may disregard the quiet information element and perform a frame transmission operation for a corresponding time. Through the corresponding process, a STA to which a TWT SP is allocated for a low latency operation may transmit a frame requiring low latency time without interference from another terminal for the corresponding time.

That is, a beacon frame may further include a quiet information element for protecting a TWT SP. At least one non-AP STAs for which a TWT operation is not configured may configure a NAV, based on a quiet information element. In other words, at least one non-AP STAs may configure a NAV for a time indicated by a quiet information element, and not transmit a frame. For example, at least one STA for which a TWT operation is not configured may configure a NAV having the same value as a time indicated by a quiet information element (or quiet element). Alternatively, a legacy STA (e.g., VHT non-AP STA) may configure a NAV having the same value as a time indicated by a quiet information element (or quiet element).

The quiet information element may be included in a control frame and/or a management frame (e.g., a probe response frame) as well as a beacon frame, and then be transmitted.

In a case where TWT SPs and a quiet information element are configured together and an interval configured by the quiet information element and a part or the entirety of a TWT SP for a latency operation overlap with each other, non-AP STAs may disregard a part or the entirety of an overlapping part of the interval configured by the quiet information element. That is, a non-AP STA may operate under the assumption of absence of a quiet interval that is an interval configured by a quiet information element, overlapping with a restricted TWT SP for low latency.

An interval configured by a quiet information element and a TWT SP for a low latency operation may have the same start time. That is, if an interval configured by a quiet information element overlaps with a TWT SP for a low latency operation, the interval configured by the quiet information element and the TWT SP for the low latency operation may have the same start time.

After the process of negotiating for a low latency operation using the TWT function, a process of negotiating a transmission time point of a beacon frame including a broadcast TWT ID negotiated between a STA and an AP may be additionally performed. The corresponding process may be performed through exchange between a broadcast TWT request frame and a broadcast TWT response frame. A TWT field may be configured to include a time point at which a corresponding beacon frame is transmitted. Fields indicating a period between TWT SPs may be configured to include a period of a beacon frame including a corresponding broadcast TWT ID.

The negotiation process for a low latency operation using the TWT function may be performed in an access process between a corresponding STA and AP. Therefore, a STA and AP to perform a low latency operation may not have a separate negotiation process after access. A negotiation and operation process using a TWT operation may be performed as follows.

Figure 19:
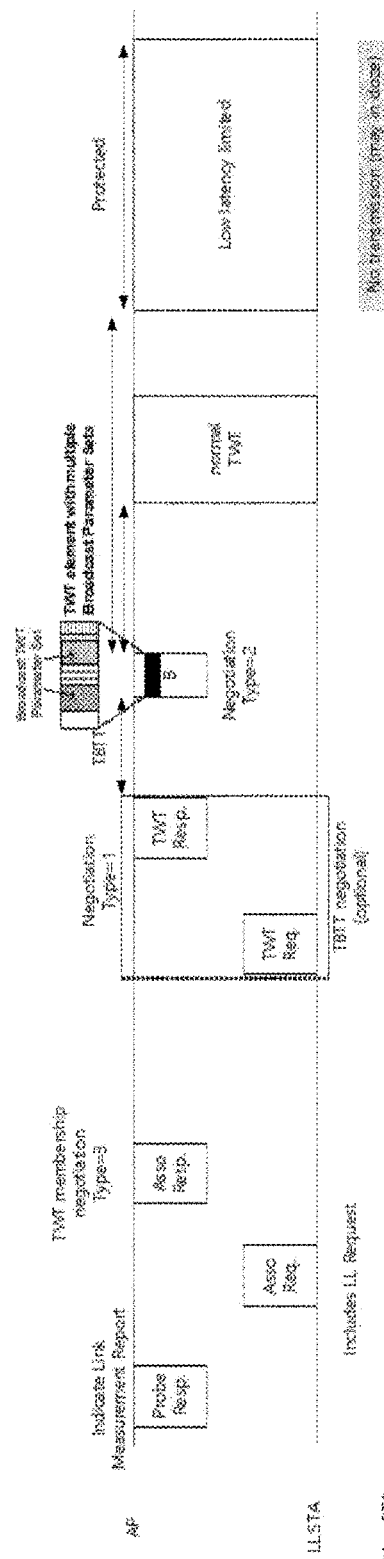
FIG. 19 shows a second embodiment illustrating a process in which an AP or an AP MLD and a STA perform a low latency operation using a TWT function according to an embodiment of the present disclosure.

FIG. 19 shows a second embodiment illustrating a process in which an AP or an AP MLD and a STA perform a low latency operation using a TWT function according to an embodiment of the present disclosure. A description overlapping with that of FIG. 18 may be omitted.

Referring to FIG. 19, a process of performing the low latency operation for the TWT operation may include identifying, by an STA and an AP, a function of a low latency operation, transmitting, by the STA, a low latency operation request frame and transmitting, by the AP, a corresponding low latency operation response frame to negotiate about a low latency operation using a correspond TWT operation, and allocating, by the AP, a TWT SP for a low latency operation to a broadcast probe response frame and a beacon frame so that the low latency operation is performed. Before the negotiating about a low latency operation using a corresponding TWT operation, performing a negotiation to add a TS to the STA and the AP may be additionally included. In addition, after the negotiating about a low latency operation using a correspond TWT operation, performing a negotiation to exchange a timing of a beacon frame by which a TWT SP negotiated in the STA is allocated may be additionally included.

The identifying of the function of the low latency operation may be performed during a scanning and access process performed between an AP or AP MLD and a STA or STA MLD. The scanning and access process may be performed through a process described with reference to FIG. 5 and FIG. 11 to FIG. 13. The AP may include an indicator that indicates whether a low latency operation using a TWT function is supported, in a capability element included in a beacon frame, a broadcast probe response frame, and a probe response frame, and transmit same. The STA may receive the beacon frame, the broadcast probe response frame, and the probe response frame, and identify that the AP supports a low latency operation using a TWT operation. In addition, the AP or AP MLD may transmit a beacon frame and a probe response frame including statistics information related to a transmission time of a frame transmitted in a corresponding link for all links operated thereby. The statistics information may be a measurement report information element. Alternatively, the statistics information may be a measurement report information element as illustrated in FIG. 14. The STA may transmit a capability element of a probe request frame and an access request frame, including an indicator that indicates whether a low latency operation using a TWT function is supported. The AP may identify, through a probe request frame and an access request frame received from the STA, that the STA performs a low latency operation function using a TWT operation.

The STA having identified, through a beacon frame, a broadcast probe response frame, and a probe response frame received from the AP, that the AP supports a corresponding function may include, in an access request frame, a low latency operation request indicator using a TWT function, which requests use of the corresponding function, when a frame requiring low latency time occurs. The low latency operation request indicator using the TWT function may be a TWT information element described with reference to FIG. 16 and FIG. 17. The AP may receive an access request frame from the STA, and identify a low latency operation request indicator using a TWT function included in the frame. The AP may identify that the STA requests TWT SP allocation for a frame requiring low latency time, based on the contents of the identified request indicator. If the AP is capable of allocating a TWT SP response corresponding to the request frame, the AP may transmit an access response frame including a low latency operation response indicator using a TWT as a response for the request frame. The low latency response indicator using the TWT operation may be a TWT information element described with reference to FIG. 17.

Alternatively, if the STA is identified, through a probe request frame and an access request frame transmitted by the STA, as supporting a low latency operation using a TWT function, the AP may transmit a low latency operation response indicator using a TWT operation, which has not been requested, in an access response frame. In this case, the STA may not transmit a separate request frame, and transmit a frame requiring low latency time during a corresponding TWT SP. In a case where the STA is not to perform a low latency operation according to a parameter included in a low latency operation response frame that has not been requested, the STA may release the corresponding low latency operation through a TWT release frame, and transmit a low latency operation request frame using a new TWT operation to request the AP to perform a low latency operation.

If a low latency operation negotiation process using the TWT operation is ended, the AP may assign a broadcast TWT ID for a TWT SP to be allocated to the corresponding STA. The STA may receive a broadcast TWT ID through a low latency operation response frame described with reference to FIG. 17. Multiple STAs may receive the same TWT ID assigned thereto. Thereafter, a low latency operation method using a TWT operation may proceed as described with reference to FIG. 18. That is, a TWT AP for a corresponding low latency operation may be included in a beacon frame, and a negotiated low latency operation may be performed during the TWT SP. In addition, in order to additionally protect transmission of a frame for the low latency operation, the AP may additionally transmit an information element for protecting a corresponding time in a beacon frame. After the process of negotiating for a low latency operation using the TWT function, a process of negotiating a transmission time point of a beacon frame including a broadcast TWT ID negotiated between a STA and an AP may be additionally performed.

When a terminal incapable of an STR operation is connected to a corresponding link during a low latency operation using the TWT operation, the following problem may occur.

Figure 20:
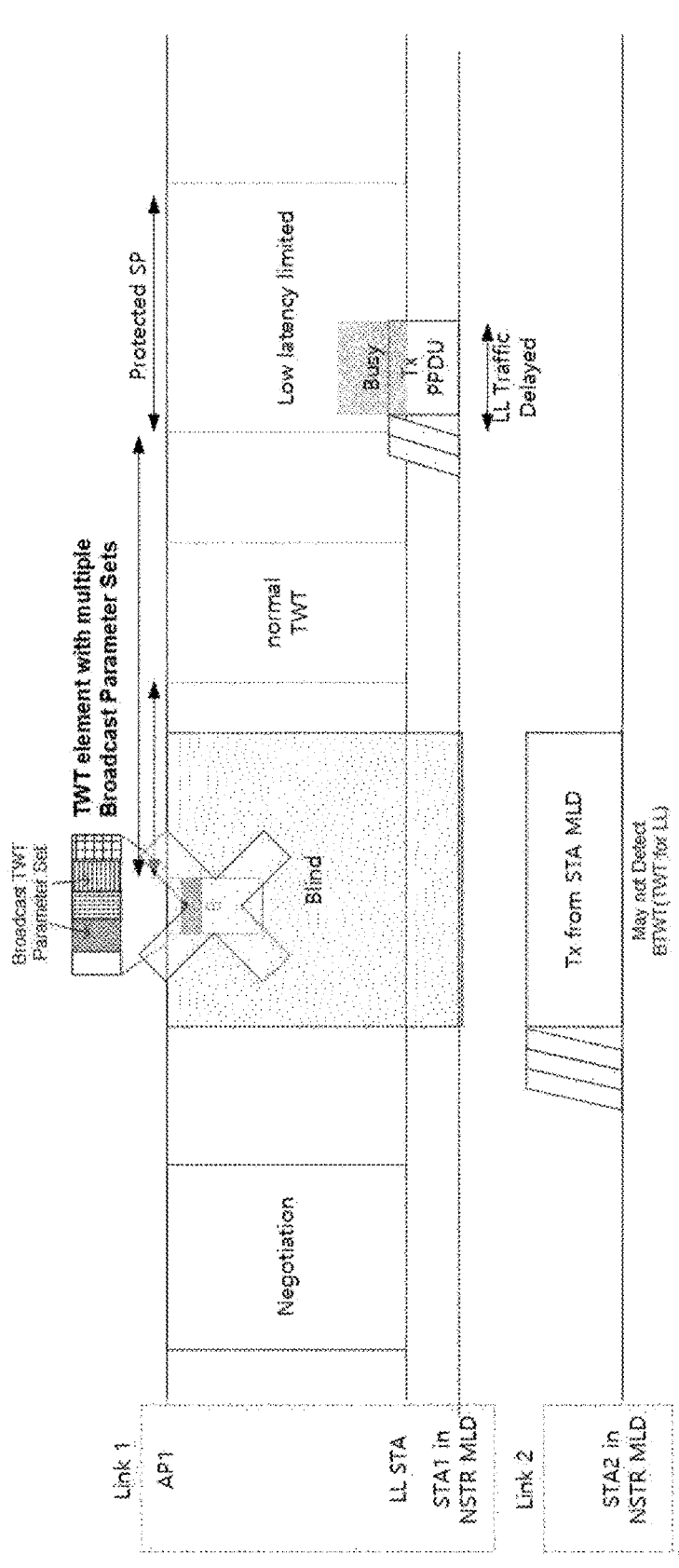
FIG. 20 illustrates an operation in which a TWT time for a low latency operation fails to be protected according to an embodiment of the present disclosure.

FIG. 20 illustrates an operation in which, in a case where a STA MLD performing a low latency operation with an AP MLD is incapable of a STR operation, the STA MLD fails to receive a beacon frame and thus misses a TWT information element, wherein a TWT time for a low latency operation fails to be protected.

Referring to FIG. 20, an AP MLD may include two or more APs. The respective APs may operate different links. For example, the AP MLD may include AP1 and AP2, AP1 may operate in link1, and AP2 may operate in link2. A STA MLD may include STA1 and STA2. The STA MLD may use link1 and link2 to perform a multi-link operation with the AP MLD. The STA MLD may be incapable of an STR operation in link1 and link2. That is, while STA1 of the STA MLD is performing a frame transmission operation in link1, STA2 may fail to perform a channel sensing operation and a frame reception operation in link2 due to the effect of interference caused by the transmission. Alternatively, while STA2 of the STA MLD is performing a frame transmission operation in link2, STA1 may not be able to perform a channel sensing operation and a frame reception operation in link1 due to the effect of interference caused by the transmission.

The characteristic of the STA MLD incapable of an STR operation may cause interference with a low latency transmission operation using the TWT operation. For example, if a low latency transmission operation using a TWT terminal is performed in link1, a corresponding TWT SP may be indicated by a beacon frame. In a case where the STAMLD performs a frame transmission operation by using link2, the STA MLD may fail to receive a beacon frame transmitted in link1, and fail to recognize a TWT SP for a low latency operation included in the beacon frame. STA1 of the STA MLD having failed to recognize the TWT SP for the low latency terminal may perform a channel access operation for frame transmission during the TWT SP, and may fail to protect transmission of a frame requiring low latency time during the TWT SP.

In order to solve the problem, the AP MLD may perform operations of updating TWT-related parameters for a low latency operation at the same time point as described below.

Figure 21:
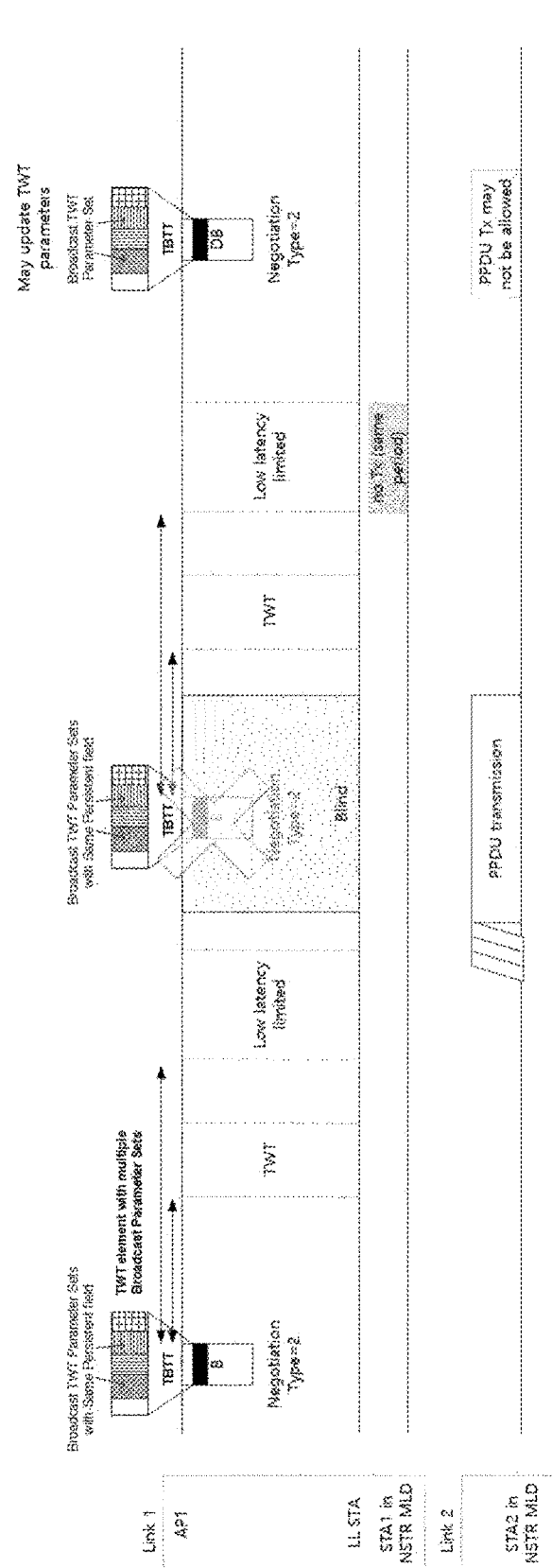
FIG. 21 illustrates an operation in which an AP MLD performs parameter changes at the same time point when performing a low latency operation by using a TWT operation according to an embodiment of the present disclosure.

FIG. 21 illustrates an operation in which an AP MLD performs parameter changes at the same time point when performing a low latency operation by using a TWT operation according to an embodiment of the present disclosure.

Referring to FIG. 21, parameter change time points may be identically configured for all TWT SPs for a low latency terminals, allocated by an AP MLD. For example, a TWT SP-related parameter for a low latency terminal may be allowed to be changeable only in a beacon frame including a delivery traffic indication map (DTIM). That is, broadcast TWT maintenance fields of all TWT parameter information fields for a low latency terminal included in a TWT information element for allocating a TWT SP for a low latency terminal transmitted in a beacon frame may be configured to have the same value. Beacon frames other than a beacon frame (e.g., a DTIM beacon frame) transmitted at a corresponding particular time point may allow periodic generation of a TWT SP for a low latency terminal after passage of the same time from a TBTT time point. A STA MLD incapable of a STR operation may not perform a frame transmission operation through a different link at a transmission time point of a beacon frame (e.g., a DTIM beacon frame) transmitted at a corresponding particular time point. Through a corresponding process, even if a STA MLD incapable of a STR operation has failed a particular beacon frame, the STA MLD may identify a TWT SP for a low latency terminal, based on the contents of a TWT information element included in a previously transmitted beacon frame.

That is, in a case where a non-AP STA configures a multi-link device (MLD), the MLD may be unable to transmit a frame through a different link while receiving the beacon frame. In other words, if a STA included in a non-AP MLD has successfully obtained a TXOP in one link of an NSTR link pair before a TBTT of the other link of the NSTR link pair, the STA is required to terminate the TXOP before the TBTT of the other link when the STA is to receive a beacon frame in the other link.

Alternatively, in order to solve the problem, an additional protection frame for protecting a corresponding TWT SP may be transmitted at the start time point of a corresponding TWT SP. An operation of transmitting a corresponding protection frame may be performed as follows.

Figure 22:
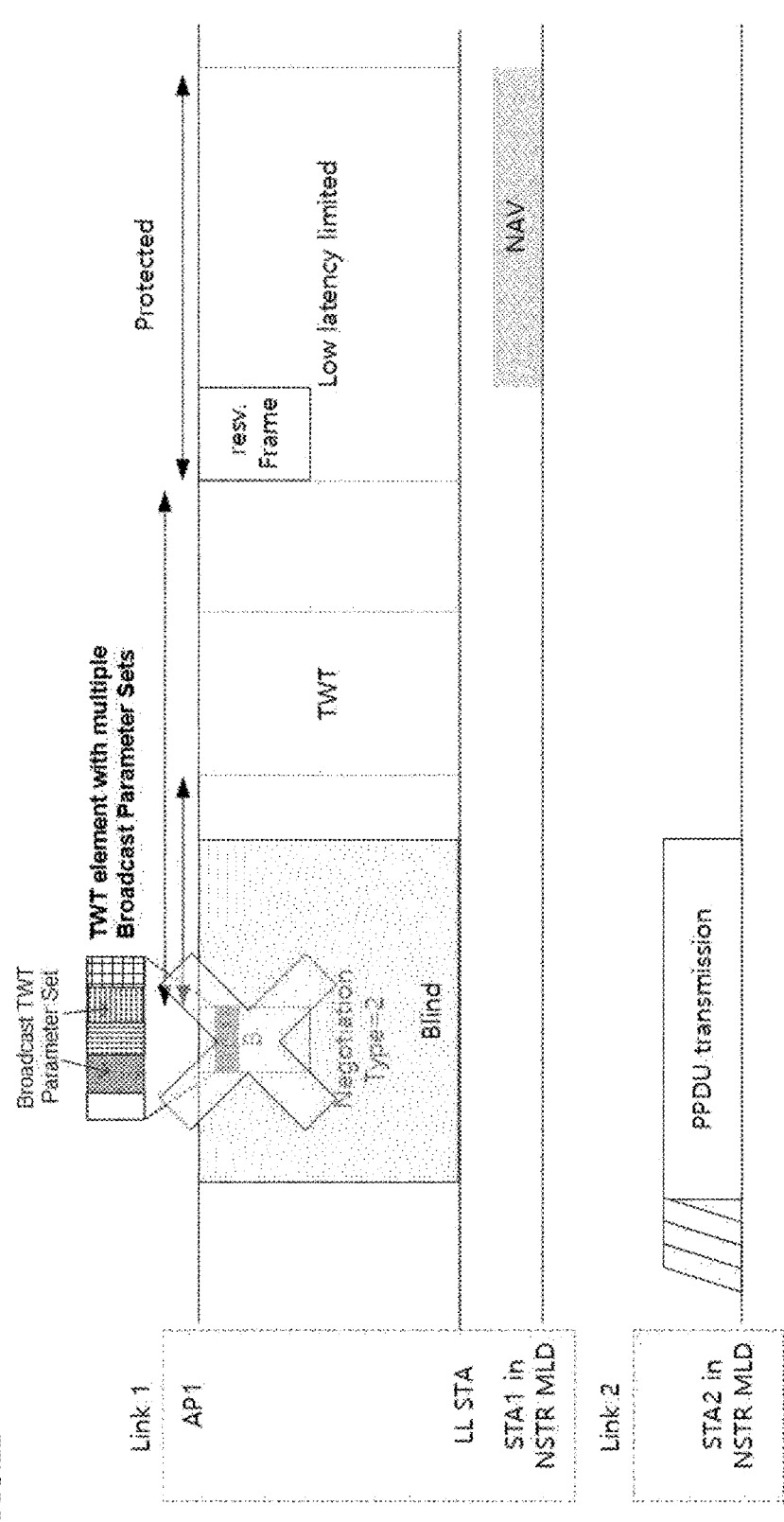
FIG. 22 shows an embodiment illustrating an operation in which an AP MLD additionally transmits a protection frame for protecting a corresponding duration at a start time point of a TWT time for a low latency operation in order to protect the TWT time according to an embodiment of the present disclosure.

FIG. 22 shows an embodiment illustrating an operation in which an AP MLD additionally transmits a protection frame for protecting a corresponding duration at a start time point of a TWT time for a low latency operation in order to protect the TWT time.

Referring to FIG. 22, in order to prevent a terminal not allocated to the TWT SP for the low latency terminal, from performing frame transmission during the corresponding time, an AP may transmit a reservation frame at a start time point of the TWT SP. The reservation frame may be an unpromised quiet time configuration frame. A duration field value of the quiet time configuration frame may be designated to be a corresponding TWT SP time to prevent non-negotiated STAs from performing a channel contention process during the TWT SP for the low latency terminal. On the other hand, STAs negotiated with an AP to perform frame transmission during the corresponding TWT SP may perform transmission of a frame requiring low latency time during the corresponding duration.

Alternatively, a channel reservation process between an AP and corresponding STAs may be performed first during the TWT SP. For example, an AP may transmit a MU-RTS frame at the start point of the TWT SP, and allocated STAs may perform an operation of transmitting a CTS frame. The MU-RTS frame may include AIDs of the STAs allocated to the TWT SP. A NAV value configured by MU-RTS may be designated to indicate up to the end time point of the TWT SP. The STAs allocated to the TWT SP may receive the MU-RTS frame, and identify that a channel reservation process is to be performed, from the MU-RTS frame. Accordingly, the multiple STAs may simultaneously transmit a CTS frame in response to the MU-RTS frame. The end time point of the NAV configured in the transmitted CTS frame may be configured to be the end time point of the TWT SP. After the procedure of exchange between the MU-RTS and the CTS frame, the STAs allocated to the TWT SP may perform frame transmission through a channel contention process. On the other hand, STAs not allocated to the TWT SP may not perform a frame transmission operation because a NAV is configured for the TWT SP.

In a case where a STA MLD incapable of an STR operation performs a low latency operation using the TWT function, when frame transmission is performed in a different link during a TWT SP for a low latency operation, the STA MLD may not be able to transmit a frame requiring low latency time during the TWT SP. That is, if the STA MLD performs a frame transmission operation during the TWT SP time in a different link in which a STR operation is impossible, the STA MLD may not be able to perform an operation of transmitting a frame requiring low latency time due to the effect of interference caused by the transmission. In order to solve this problem, in a case where a STA MLD performing a low latency operation using TWT is incapable of an STR operation as described below, frame transmission in a different link may be restricted as below.

Figure 23:
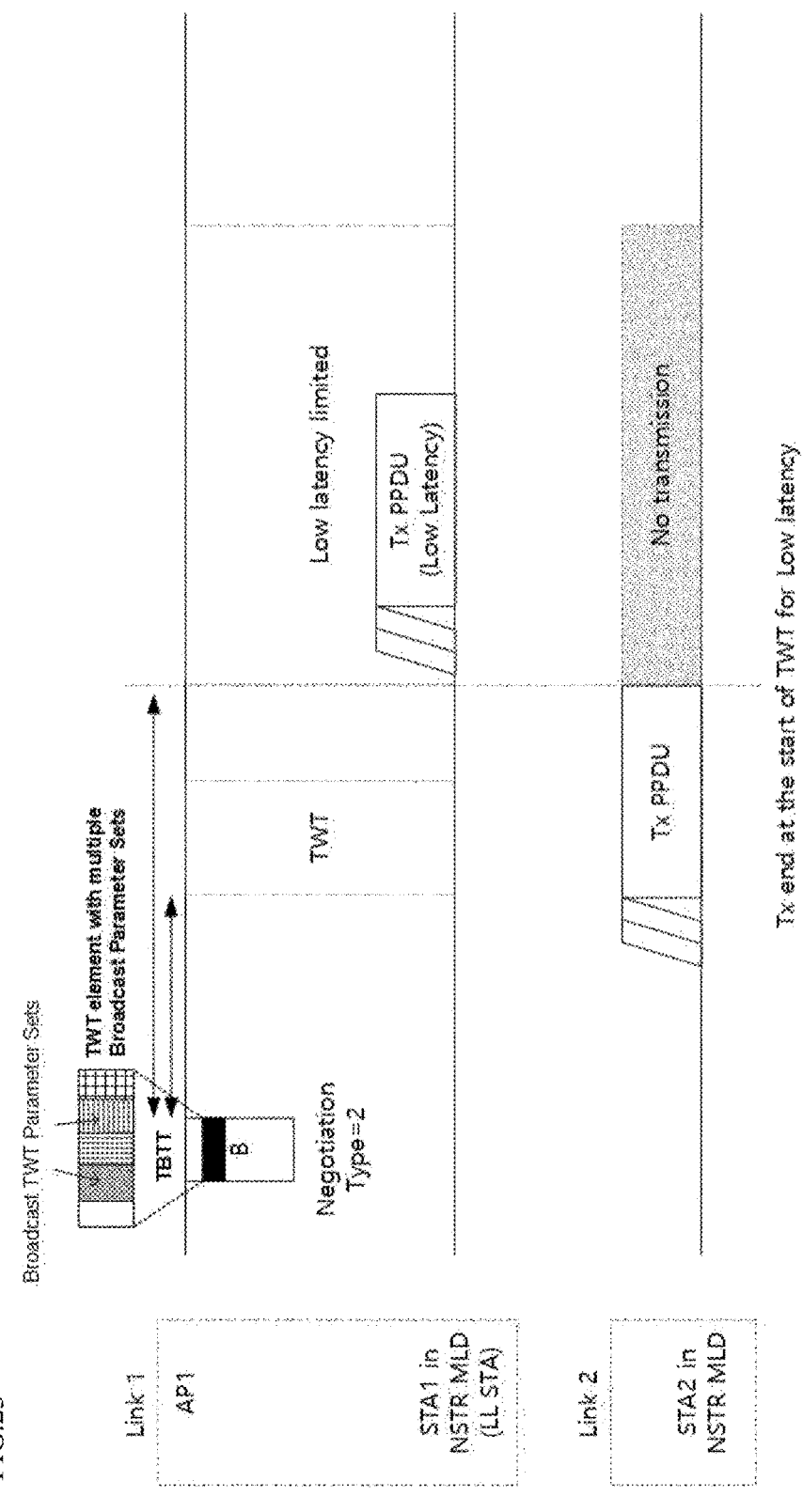
FIG. 23 shows an embodiment illustrating a process in which an AP MLD and a STA incapable of an STR operation perform a low latency operation using a TWT function according to an embodiment of the present disclosure.

FIG. 23 shows an embodiment illustrating a process in which an AP MLD and a STA incapable of an STR operation perform a low latency operation using a TWT function. Contents overlapping with those of FIG. 18 and FIG. 19, and FIG. 22 may be omitted.

Referring to FIG. 23, even a STA MLD incapable of an STR operation may perform a low latency operation using a TWT function with an AP MLD by using some links. For example, the STA MLD may use link1 and link2 to perform a multi-link operation with the AP MLD. The STA MLD may be incapable of an STR operation in link1 and link2. That is, while STA1 of the STA MLD is performing a frame transmission operation in link1, STA2 may fail to perform a channel sensing operation and a frame reception operation in link2 due to the effect of interference caused by the transmission. Alternatively, while STA2 of the STA MLD is performing a frame transmission operation in link2, STA1 may not be able to perform a channel sensing operation and a frame reception operation in link1 due to the effect of interference caused by the transmission. A TWT operation for a low latency operation may be negotiated about with the STA MLD in link1 of the AP MLD. The access process and the negotiation process for an MLD operation may be performed in the method of FIG. 11 to FIG. 13. In a case where the STA MLD is to perform a low latency operation using a TWT operation for some links, a negotiation process for performing a low latency operation using a TWT operation may proceed with the AP MLD in the method of FIG. 18 or FIG. 19. For example, STA1 belonging to the STA MLD may negotiate with AP1 of the AP MLD to perform a low latency operation using a TWT operation in link1.

According to the contents of the negotiation, AP1 belonging to the AP MLD may allocate a broadcast TWT ID to STA1, and may transmit a beacon frame including a TWT parameter indicated by the broadcast TWT ID. The TWT parameter may include a start time point of a TWT SP. STA1 of the STA MLD incapable of an STR operation may receive the beacon frame, and identify a TWT SP for a low latency operation corresponding to an allocated broadcast TWT ID included in the received beacon frame. Alternatively, the STA MLD may infer a TWT SP for a low latency operation corresponding to an allocated broadcast TWT ID from a TBTT of a corresponding beacon frame, based on a TWT SP included in a previously transmitted beacon frame as described with reference to FIG. 21.

STA1 of the STA MLD having recognized the TWT SP for the low latency operation may perform an operation of transmitting a frame requiring low latency time after the start time point of the TWT SP. In order to prevent delay of transmission of the frame requiring low latency time, STA1 operating in link1 and STA2 incapable of an STR operation may terminate a frame transmission operation which has been performed before the start time point of a corresponding TWT SP. STA2 may not perform frame transmission during a TWT SP time for a low latency operation recognized by the STA MLD.

Figure 24:
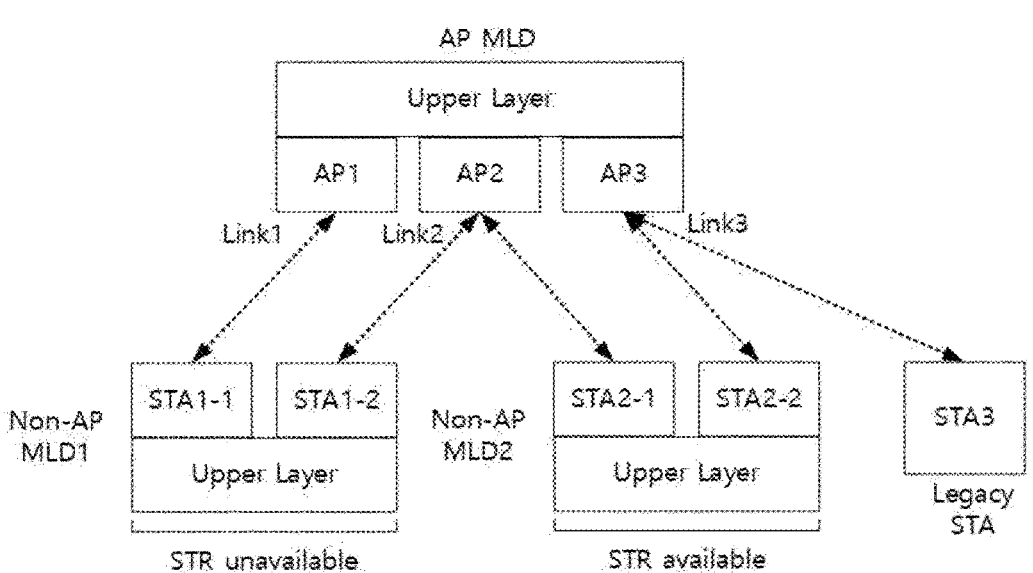
FIG. 24 is a concept diagram illustrating a structure of an AP MLD and a STA MLD performing a multi-link operation according to an embodiment of the present disclosure.

FIG. 24 is a concept diagram illustrating a structure of an AP MLD and a STA MLD performing a multi-link operation according to an embodiment of the present disclosure.

Referring to FIG. 24, an AP multi-link device (MLD) may be a device including one or more wireless access points (APs), and may be a device connected to a higher layer via one interface. That is, the AP MLD may be connected to a logical link control (LLC) layer via one interface. Several APs included in the AP MLD may share some functions of a MAC layer. Respective APs in the AP MLD may operate in different links. A STA MLD may be a device including one or more non-AP STAs, and may be a device connected to a higher layer via one interface. That is, the STA MLD may be connected to the LLC layer via one interface. Several STAs included in the STA MLD may share some functions of the MAC layer. In addition, the STA MLD may be called a non-AP MLD. The AP MLD and the STA MLD may perform a multi-link operation of performing communication by using multiple individual links. That is, in a case where an AP MLD includes several APs, the APs may configure individual links and perform a frame transmission or reception operation using multiple links with respective terminals included in a STA MLD. Each link may operate in a 2.4 GHz, 5 GHz, or 6 GHz band, and a bandwidth expansion operation may be performed in each link. For example, in a case where an AP MLD configures one link in the 2.4 GHz band and two links in the 5 GHz band, the AP MLD may transmit a frame within a bandwidth of 40 MHz in the 2.4 GHz band through a bandwidth expansion method, and may transmit a frame within a discontinuous bandwidth of up to 320 MHz in each of the links using the 5 GHz band.

In some or all of APs belonging to the STA MLD or the AP MLD, while one AP or terminal in the MLD is performing a transmission operation, another AP or terminal in the same device may be unable to perform a reception operation due to a problem of interference inside the device. As described above, an operation in which, while one AP or terminal in an MLD is performing a transmission operation, another AP or terminal in the MLD performs reception is called simultaneous transmit and receive (STR). The AP MLD may be able to perform an STR operation for all links. Alternatively, an STR operation may be impossible in some links of the AP MLD. If an STA operation is impossible in the soma links, while one AP among the APs operating the multiple links is performing a transmission operation, other APs may be unable to perform a reception operation. A STA MLD capable of an STR operation may be connected to an AP MLD, and an STA MLD incapable of an STR operation for some or all links may be connected thereto. If the STA MLD incapable of an STR operation for the some or all links is connected, with respect to links in which an STR operation is impossible, while one terminal using a corresponding link is performing transmission, the STA MLD may be unable to perform a reception operation on another link. In addition, a terminal (e.g., an IEEE 802.11a/b/g/n/ac/ax terminal) not belonging to an MLD may be additionally connected to an AP included in an AP MLD.

Figure 25:
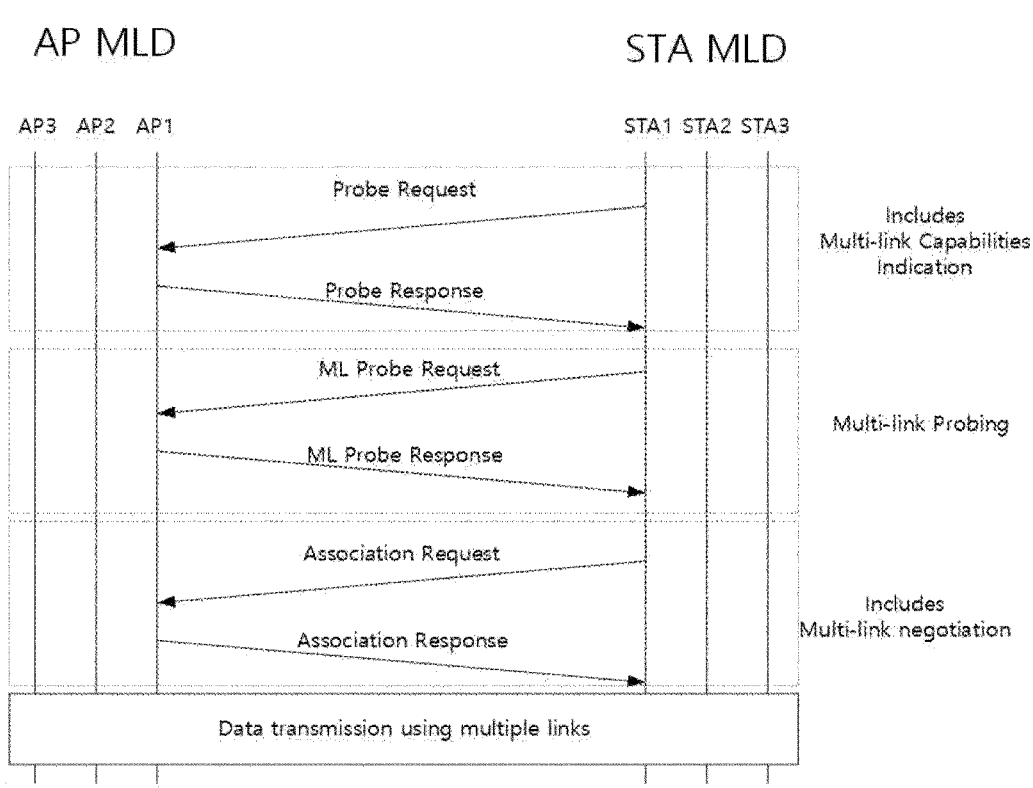
FIG. 25 is a timing diagram illustrating an access process and a negotiation process for a multi-link operation between an AP MLD and a STA MLD according to an embodiment of the present disclosure.

FIG. 25 is a timing diagram illustrating an access process and a negotiation process for a multi-link operation between an AP MLD and a STA MLD according to an embodiment of the present disclosure.

Referring to FIG. 25, an AP MLD and a STA MLD may perform a negotiation process for a multi-link use operation in a scanning and access process described with reference to FIG. 5. For example, in the scanning process described with reference to FIG. 5, an AP included in an AP MLD may transmit a beacon frame including an indicator indicating that a multi-link operation is available, the number of available links, and information on multiple available links and APs operating the links. Information on an AP not transmitting a corresponding beacon frame among the APs belonging to the AP MLD may be only partially transmitted. The information on the AP not transmitting the beacon frame may be transmitted in a form of a reduced neighbor report (RNR) information element. The RNR information element may include one or more of a link ID of a link operated by a corresponding AP, a channel and an operation class, and a counter informing of an update situation of a parameter used in a corresponding AP, in information on the AP included in the corresponding information element.

A terminal belonging to an STA MLD may receive the beacon frame, and identify that the AP transmitting the beacon frame is an AP belonging to the AP MLD. In addition, the terminal may identify partial information (e.g., link ID, used channel information, and a parameter update counter for a corresponding AP) on the other APs belonging to the AP MLD. Alternatively, a terminal belonging to the STA MLD may transmit a probe request frame including an indicator indicating that a multi-link operation is available, in a scanning process illustrated in FIG. 5, and an AP belonging to the AP MLD may include an indicator indicating that a multi-link operation is available, in a probe response frame. The AP may additionally include, in the probe response frame, the number of available links in a multi-link operation, link information, and information on an AP operating a corresponding links, and then transmit same.

The AP is an AP belonging to the AP MLD, and the STA MLD having identified partial information on other APs belonging to the AP MLD may transmit a multi-link probe request frame requesting entire information on the other APs from the AP MLD, to the AP to perform a multi-link operation. The multi-link probe request frame may indicate necessary information on an AP, which the STA MLD is to receive from the AP MLD. The necessary information may include one or more of an HT capability element, an HT operation element, a VHT capability element, a VHT operation element, a HE capability element, an HT operation element, an EHT capability element, an EHT operation element, a beacon transmission time point (target beacon transmission time (TBTT)), EDCA parameter configuration information, information on a channel in which a corresponding AP operates, and information on a bandwidth supported by a corresponding AP. The STA MLD may request information on one or more particular APs in the multi-link probe request frame. Alternatively, the STA MLD may request information on all the APs operated by the AP MLD.

The AP MLD may receive a multi-link probe request frame from the STA MLD, and identify that the STA MLD requests a part or the entirety of an information element related to an operation of a corresponding AP with respect to some or all APs belonging to the AP MLD. The AP MLD having identified the request information may transmit a multi-link probe response frame including information requested by the STA MLD to the STA MLD. The AP MLD may transmit only information not overlapping with information used in the AP transmitting the multi-link probe response frame. The multi-link probe response frame includes more information than that of the probe response frame of FIG. 5, and thus a channel may be occupied more time when the multi-link probe response frame is transmitted. Therefore, in order to prevent excessive channel occupation caused by transmission of too many multi-link probe response frames, if a multi-link probe response frame has already been transmitted to a particular STA MLD, a response for a multi-link probe request frame received from the same STA MLD may not be transmitted. The AP MLD may transmit a multi-link probe response frame including information on all APs belonging to the AP MLD in a broadcast frame type. The multi-link probe response frame transmitted in the broadcast frame type may be transmitted according to a particular period or longer. If the AP MLD has transmitted a multi-link probe response frame in a broadcast frame type within a particular time before receiving a multi-link probe request frame from the STA MLD, the AP MLD may not transmit a multi-link probe response frame. The particular time may be after a time point at which a STA belonging to the STA MLD transmits a probe request frame in FIG. 5.

The STA MLD having received a multi-link probe response frame from the AP MLD may identify an operation parameter of each AP belonging to the AP MLD, and may perform an access process and a negotiation process for a multi-link operation with the AP MLD. The negotiation process for the multi-link operation may be performed during an access process between an AP belonging to the AP MLD and a terminal belonging to the STA MLD. That is, a random terminal (e.g., STA1) belonging to the STA MLD may transmit, to a random AP (e.g., AP1) belonging to the AP MLD, an indicator indicating a multi-link operation of the terminal is available and a request indicator requesting to perform a multi-link operation while transmitting an access request frame. The STA MLD may transmit an access request frame including information on a link to be used in the AP MLD, and capability information (e.g., information indicating whether STR with another link is possible, an available maximum bandwidth for transmission, or the number of available maximum spatial streams) of a terminal related to the corresponding link. The AP having received the access request frame from the terminal may identify an indicator requesting a multi-link operation, and if the AP is able to perform a multi-link operation, the AP may transmit, to the terminal, an access response frame allowing a multi-link operation and including link information to be used in the multi-link operation and a parameter used in each link. The parameter for the multi-link operation may include one or more of a link ID of each user link, a MAC address, a band, a bandwidth expansion direction, a target beacon transmission time (TBTT), and whether an STR operation is performed. The AP MLD and the STA MLD for which use of a multi-link operation has been identified through the exchange between the access request frame and the response frame may perform a frame transmission operation using multiple links by using several APs included in the AP MLD and several terminals included in the STA MLD after the corresponding access process.

Figure 26:
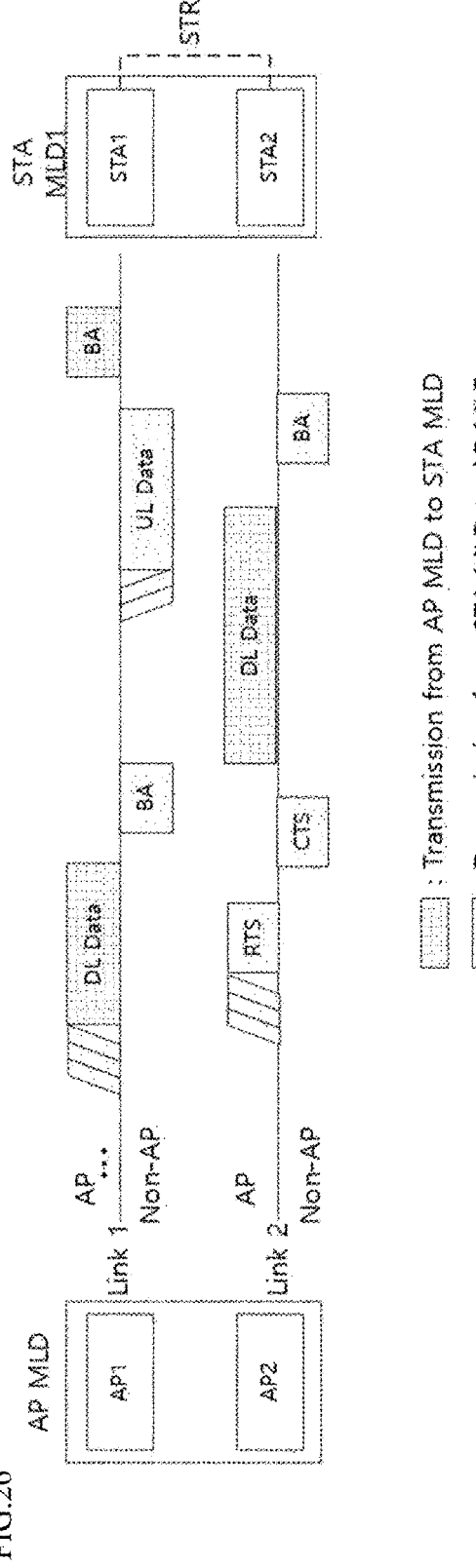
FIG. 26 is a timing diagram illustrating a transmission method using multiple links according to an embodiment of the present disclosure.

FIG. 26 is a timing diagram illustrating a transmission method using multiple links according to an embodiment of the present disclosure.

Referring to FIG. 26, an AP MLD and a STA MLD having completed a negotiation for the multi-link operation may perform a frame transmission or reception operation using multiple links through a link-specific independent transmission method. In a case where a multi-link operation is performed in the link-specific independent transmission method, each AP or terminal belonging to an AP MLD or a STA MLD independently performs a channel contention process for frame transmission in a corresponding link, thereby performing frame transmission in the corresponding link. A transmission start time point and a transmission end time point of a frame transmitted in each link may not be the same. In a case where the independent transmission method is performed, a transmission opportunity (TXOP) obtained through a channel contention process in each link may be independently obtained in the corresponding link.

In a case where the independent transmission method is performed, channel access in each link is independently performed according to a channel occupation state, whereby more efficient performance in each link is possible. If the interval between operating bands of respective APs operated by the AP MLD is not wide enough, and thus the AP MLD or STA MLD is incapable of an STR operation, the AP MLD or STA MLD may be unable to perform a multi-link operation in the independent transmission method.

If a reception MLD is incapable of an STR operation in some or all of links, a frame transmission or reception process using a link in which an STR operation is impossible may be performed as follows.

FIGS. 27A to 27C show an embodiment illustrating an operation of transmitting or receiving a frame between a reception MLD incapable of an STR operation in some or all links and a transmission MLD capable of an STR operation according to an embodiment of the present disclosure.

Referring to FIG. 27A, if a MLD is incapable of a STR operation, while frame transmission is being performed in one link, the MLD may be unable to perform a frame reception operation in another link. For example, AP1 and AP2 belong to an AP MLD, AP1 may operate link1, and AP2 may operate link2. STA1 and STA2 belong to a STA MLD, and STA1 and STA2 may be connected to AP1 and AP2, respectively through a negotiation process for a multi-link operation. The STA MLD may be incapable of an STR operation in link1 and link2. That is, while STA1 is performing a frame transmission operation in link1, STA2 may be unable to perform a frame reception operation in link2. On the contrary, while STA2 is performing a frame transmission operation in link2, STA1 may be unable to perform a frame reception operation in link1. The situation in which an STR operation is impossible may be caused by interference inside the device incurred during a frame transmission operation in one link. Accordingly, if a STA MLD is incapable of an STR operation in some links, while a frame transmission operation is being performed in one link among the links, a channel sensing operation may be unable to be performed in another link. For example, while a frame is being transmitted to STA1 in link1, STA2 may be unable to perform a channel sensing operation for frame transmission in link2. Therefore, while STA1 is performing frame transmission in link1, STA2 may be unable to start a frame transmission operation in link2 after a channel contention process. That is, in a case where one MLD among a transmission MLD and a reception MLD is incapable of an STR operation in a corresponding link, a multi-link communication operation through an independent transmission method in FIG. 26 may be impossible.

If an AP MLD or STA MLD is incapable of an STR operation in the multiple links (e.g., the band interval between links is not enough to perform a multi-link operation), the AP MLD or STA MLD may perform a multi-link operation in a type of a simultaneous transmission operation as shown in part (b) in FIG. 27. The simultaneous transmission operation may be performed through a process in which transmission start times or transmission end times of a frame transmitted in respective links match each other. The transmission start time or the transmission end time of the frame may be called a transmission start time or a transmission end time of a PPDU including the frame. That is, if the lengths of frames transmitted in respective links by APs or terminals are different, the frames may be transmitted after addition of a padding or a padding bit, so as to cause corresponding transmission end time points to match each other. In addition, matching between TXOP times for frame transmission in respective links may be made. The multi-link operation in the simultaneous transmission type may include negotiating for simultaneous transmission in multiple links, and performing simultaneous transmission using the multiple links. The negotiating for simultaneous transmission may include sending, an MLD (e.g., AP MLD or STA MLD) having data to transmit, a request frame for obtaining a TXOP for simultaneous transmission in one or more links at the same time point, and transmitting, by an MLD receiving data, a response frame after passage of a short interframe space (SIFS) from a time point at which reception of the request frame is complete. The response frame may be simultaneously transmitted in the one or more links in which the request frame is received. The request frame may be a control frame. For example, the request frame may be an RTS or multi-user (MU)-RTS frame, and the response frame may be a CTS frame. When a channel of one link is occupied during channel contention for a simultaneous transmission operation, a channel access process for a simultaneous transmission operation may be performed, or a frame transmission operation using only links of which a channel is empty may be performed.

The channel access process for the simultaneous transmission operation may be performed in several methods. For example, a backoff process may be performed in multiple links in which simultaneous transmission is performed, carrier sensing may be performed in all the links until a backoff value in all the link becomes 0, and when a result of carrier sensing indicates that channels in all the links are empty, a simultaneous transmission method may be performed using the multiple links. Alternatively, a backoff operation may be performed in one link, and then when a channel in another link is empty for a particular time (e.g., AIFS, DIFS, or PIFS) before a backoff end time point, a simultaneous transmission method using multiple links may be performed using the link in which the channel is empty.

In a case where a transmission MLD is incapable of an STR operation in a corresponding link, if a channel state of one or some links is busy during a channel access process for frame transmission as shown in FIG. 25, one of the following methods may be used:

1) Perform carrier sensing for channels in both links for a particular time (e.g., PIFS, AIFS, or AIFS+backoff time) after a corresponding occupation duration is ended, to identify that the channels in both links are empty, and then perform simultaneous transmission in the method of part (b) of FIG. 27.

2) Perform a transmission operation only in a link of which the channel is empty When the operation of method 2) is performed, a backoff operation for frame transmission may not be performed until a transmission end point of a link in which transmission is performed, even after termination of an occupation time of a link of which the channel state has been occupation.

In a case where a transmission MLD is capable of an STR operation in a corresponding link and a reception MLD is incapable of an STR operation in a corresponding link, if a channel state of one or some links is busy during a channel access process for frame transmission as shown in part (b) of FIG. 27, one of the following methods may be used:

1) Perform carrier sensing for channels in both links for a particular time (e.g., PIFS, AIFS, or AIFS+backoff time) after a corresponding occupation duration is ended, to identify that the channels in both links are empty, and then perform simultaneous transmission in the method of part (b) of FIG. 27.

2) Perform a transmission operation only in a link of which the channel is empty When the operation of method 2) is performed, a channel access process may be independently performed in a corresponding link to execute frame transmission after termination of an occupation time of a link of which the channel state has been occupation.

In a case where the transmission MLD is incapable of an STR operation and the reception MLD is incapable of an STR operation in a corresponding link, transmission start time points and transmission end time points of a frame transmitted in multiple links from the transmission MLD may not be the same. That is, when, after frame transmission is started in one link as shown in part (c) of FIG. 27, a channel contention process for frame transmission is completed in another link, a frame transmission operation may be independently performed. For example, an AP MLD may be capable of an STR operation in link1 and link2, and a STA MLD may be incapable of an STR operation in link1 and link2. In a case where the channel state of link2 is busy during a channel access process for frame transmission in part (b) of FIG. 27, AP1 of the AP MLD may preferentially perform a frame transmission operation in link1. The AP MLD is capable of an STR operation, and thus even while AP1 is transmitting a frame in link1, AP2 may perform a channel contention process for frame transmission in link2. After completion of the channel contention process and the channel access operation, AP2 may perform a frame transmission operation by using link2. The STA MLS is not performing frame transmission in link1, and thus STA2 may receive a frame transmitted by AP2 in link2. In a case where one or more of frames transmitted by the transmission MLD require an instant response (e.g., BlockAck frame) from the reception MLD, transmission of a corresponding response frame may be performed while a reception operation is being performed in another link. In this case, due to transmission of the response frame, a frame reception operation in the other link may fail to be smoothly performed. In order to prevent this situation, in a case where one or more of frames transmitted by the transmission MLD require transmission of a response frame, the transmission end time points of PPDUs including frames transmitted in the multiple links may match each other.

When a frame transmission or reception operation is performed between an AP and a STA, a channel reservation process may be performed to protect the frame transmission or reception operation. The channel reservation process may be performed through the process in which a transmission STA that is to transmit a frame transmits a request-to-send (RTS) frame to a reception STA, and the reception STA transmits clear-to-send (CTS). The reception STA performs a channel sensing operation for a SIFS time after receiving the RTS frame, and may transmit CTS only when a corresponding channel is idle.

When an AP is to reserve a channel for multi-terminal (multi-user) transmission with multiple STAs, a process of exchange between a multi-user (MU)-RTS frame and a CTS frame may be performed. The procedure of exchanging a MU-RTS frame and a CTS frame between the AP and the multiple STAs may be performed as follows.

FIGS. 28A to 28D show a first embodiment of an operation of protecting frame transmission or reception through a procedure of exchanging an MU-RTS frame and a CTS frame between an AP and multiple STAs according to an embodiment of the present disclosure.

Referring to FIGS. 28A to 28D, when an AP is to transmit a frame to multiple STAs, the AP may perform a procedure of exchange between a MU-RTS frame and a CTS frame before transmission of a corresponding frame in order to protect a frame transmission operation. The MU-RTS frame may be transmitted using one channel among a primary 20 MHz channel, a primary 40 MHz channel, a primary 80 MHz channel, a primary 160 MHz or 80+80 MHz channel, a primary 240 MHz or primary 160+80 MHz channel, and a primary 320 MHz or 160+160 MHz channel. The MU-RTS may indicate an ID (e.g., association ID) of an STA that is to transmit CTS, and a channel (e.g., a primary 20 MHz channel, a primary 40 MHz channel, a primary 80 MHz channel, a primary 160 MHz or 80+80 MHz channel, a primary 240 MHz or primary 160+80 MHz channel, and a primary 320 MHz or 160+160 MHz channel) in which each STA is to transmit a CTS frame. The MU-RTS frame may be transmitted in the type of a trigger frame. Alternatively, the MU-RTS frame may be configured as described later with reference to FIG. 14 or FIG. 17. The MU-RTS frame may be a frame that requests multiple STAs to simultaneously transmit CTS frames. The multiple STAs may include an HE STA defined in IEEE 802.11ax, and may include an EHT STA defined in IEEE 802.11be.

Multiple STAs having received a MU-RTS frame from an AP may identify information included in the MU-RTS frame. The multiple STAs may identify information of the received MU-RTS frame, and identify an AID value included in one or more user information fields included in the MU-RTS frame. If the AID value matches an AID value assigned by a corresponding STA, the STA may identify that the MU-RTS frame requests the correspond STA to transmit a CTS frame. The STA for which an AID is included in the MU-RTS frame may perform a channel sensing operation for a SIFS time in a channel indicated by the MU-RTS frame after receiving the MU-RTS frame. The channel may be one of a primary 20 MHz channel, a primary 40 MHz channel, a primary 80 MHz channel, a primary 160 MHz/80+80 MHz channel, a primary 240 MHz/160+80 MHz channel, and a primary 320 MHz/160+160 MHz channel. In a case where a STA having received a MU-RTS frame is an HE STA, the bandwidth of a channel transmitting a CTS frame may be a maximum 160 MHZ or 80+80 MHz. In a case where the STA having received the MU-RTS frame is an EHT STA, a maximum bandwidth of a channel transmitting a CTS frame may be a 320 MHZ or 160+160 MHz. The channel sensing operation may include physical sensing, virtual sensing, and a network allocation vector (NAV) identification process.

In a case where a channel indicated during a SIFS time after an STA receives the MU-RTS frame is in a channel idle state, multiple STAs indicated in the MU-RTS frame may simultaneously transmit CTS frames after passage of SIFS after the transmission end time point of a PPDU including the MU-RTS frame. The CTS frame may be transmitted in the indicated channel in a non-HT PPDU type or a non-HT duplicated PPDU type indicating repetition of every 20 MHz band. The CTS frames transmitted by the multiple STAs may be identically configured. Therefore, in view of an AP, the AP may receive the CTS frame in a corresponding 20 MHz channel with respect to an MU-RTS frame transmitted as shown in FIG. 28A. The reception powers of the CTS frames received in respective 20 MHz channels may be different from each other. If the AP receives a CTS frame as a response for MU-RTS, the AP may perform a MU-OFDMA or MU-MIMO operation with multiple STAs, based on the bandwidth of the received CTS frame.

As described above, the transmission bandwidths of the CTS frames transmitted by STAs having received the MU-RTS frame may be different from each other. For example, referring to part (b) of FIG. 13, in a case where a channel indicated to transmit a CTS frame in a MU-RTS frame is a primary 20 MHz channel, STA1 may transmit a CTS frame after performing a channel sensing operation only in the primary 20 MHz channel. The CTS frame may be transmitted in a non-HT PPDU type. STA1 may receive a downlink frame within the corresponding 20 MHz channel after transmitting the CTS frame.

Referring to FIG. 28C, in a case where a channel indicated to transmit a CTS frame in a MU-RTS frame is a primary 40 MHz channel, an STA (e.g., STA2) indicated by a user information field of the MU-RTS frame may transmit a CTS frame after performing a channel sensing operation only in the primary 40 MHz channel. The CTS frame may be transmitted in a non-HT duplicated PPDU type. STA2 may receive a downlink frame within the corresponding 40 MHz channel after transmitting the CTS frame.

Referring to FIG. 28D, in a case where a channel indicated to transmit a CTS frame in a MU-RTS frame is a primary 80 MHz channel, an STA (e.g., STA3) indicated by a user information field of the MU-RTS frame may transmit a CTS frame after performing a channel sensing operation only in the primary 80 MHz channel. The CTS frame may be transmitted in a non-HT duplicated PPDU type. STA3 may receive a downlink frame within the corresponding 80 MHz channel after transmitting the CTS frame.

A MU-RTS frame used in the procedure of exchange between the MU-RTS frame and a CTS frame may be configured as below.

Figure 29:
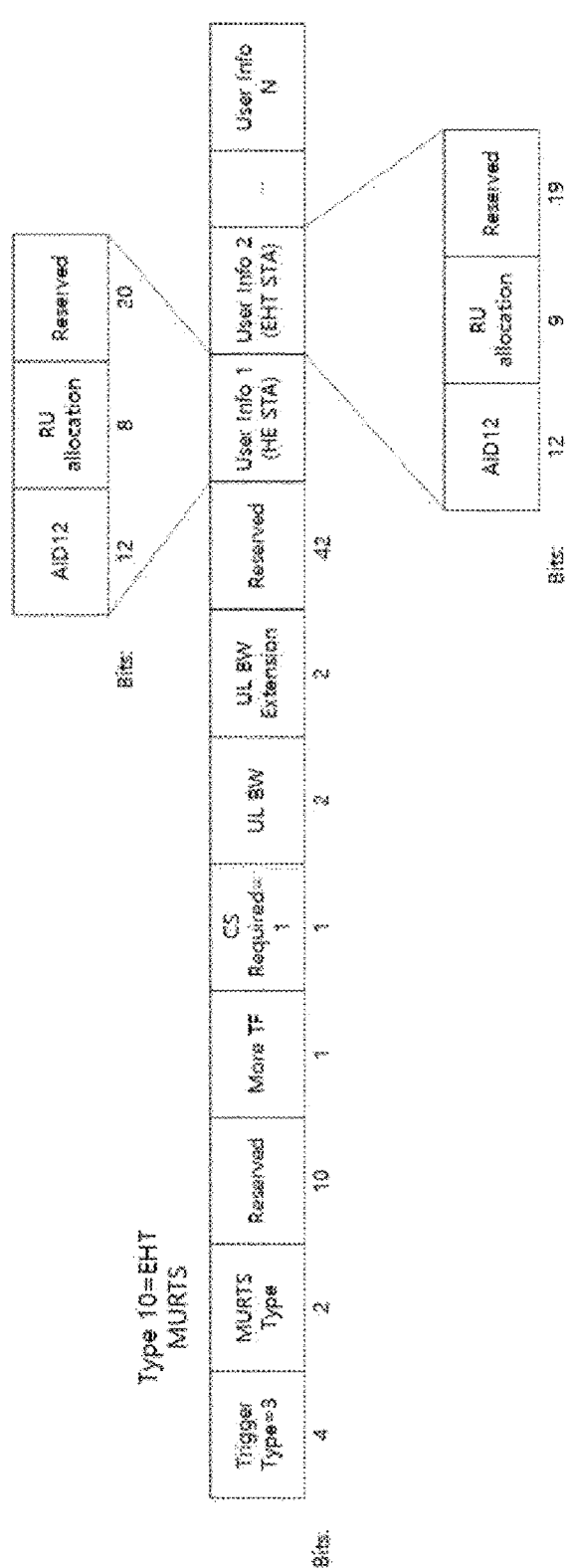
FIG. 29 shows a first embodiment illustrating a structure of an MU-RTS frame according to an embodiment of the present disclosure.

FIG. 29 shows a first embodiment illustrating a structure of an MU-RTS frame according to an embodiment of the present disclosure.

Referring to FIG. 29, a MU-RTS frame may be configured in a type of a trigger frame, and may be configured by a common field and one or more user information fields. The common field may be configured by a trigger type field, an indication field relating to whether a trigger frame is additionally transmitted after the frame, a field indicating whether a carrier sensing operation of a reception terminal is required, a field of a bandwidth of an uplink frame, a field related to bandwidth expansion of an uplink frame, and a reservation field. The common field may additionally include a MURTS type field. Alternatively, the MURTS type field may be included in the user information field. The trigger type field may be configured to be 3 to indicate that a corresponding trigger frame is a MU-RTS frame. In addition, if the trigger frame is a MU-RTS frame, the MURTS type field may be included in the trigger frame. The MURTS type field may be configured to be 00 if the MU-RTS frame is transmitted in a 160 MHz bandwidth or narrower and thus does not configure a separate user information field for an EHT STA. If the MU-RTS frame is transmitted with a bandwidth exceeding 160 MHz, the MURTS type field may be configured to be 10. The field indicating whether a carrier sensing operation is required may be configured to be 1 to indicate the STA having received the MU-RTS frame to perform a carrier sensing operation. The field of a bandwidth of an uplink frame and the field related to bandwidth expansion may indicate the bandwidth of a CTS frame that the AP transmitting the MU-RTS frame is to receive. That is, as shown in part (a) of FIG. 13, the fields may indicate the bandwidth of a CTS frame that an AP is required to finally receive when multiple STAs transmits CTS frames. The bandwidth field may be indicated as shown in Table 3 below.

TABLE 3

| Bandwidth field value | Description |
| --- | --- |
| 0 | 20 MHz |
| 1 | 40 MHz |
| 2 | 80 MHz |
| 3 | 160 MHz or 80 + 80 MHz or greater |

The bandwidth expansion field is represented only when the MURTS type field is not 00, and when the bandwidth field value is 2 or smaller, the bandwidth expansion field is configured to be 0. If the bandwidth field value is 3, the bandwidth expansion field may be configured as shown in Table 4 below.

TABLE 4

| Bandwidth expansion field value | Description |
| --- | --- |
| 0 | 160 MHz or 80 + 80 MHz or smaller |
| 1 | 320 MHz or 160 + 160 MHz |

In a case where a STA receiving the corresponding MU-RTS frame is an HE STA, the HE STA may fail to decipher the values of the MURTS type field and the bandwidth expansion field in the common field of the MU-RTS frame. Therefore, when an AP transmits a MU-RTS frame, a bandwidth used by an HE STA to transmit a CTS frame may be indicated by maximum 160 MHz or 80+80 MHz regardless of the bandwidth expansion field value. In a case where a STA receiving the MU-RTS frame is an EHT STA, the values of the bandwidth field and the bandwidth expansion field of the MU-RTS frame may all be identified, to check a bandwidth used to transmit a CTS frame.

The user information field may be differently configured according to the MURST type field value in the common field and whether a terminal receiving the MU-RTS frame is an HE STA or an EHT STA. If the MURST type field value is 00, the user information field may be configured by an AID field of 12 bits and a resource unit (RU) allocation field of 8 bits. If the MURST type field is 10 and the user information field performs indication to a HE STA, the user information field may be configured by an AID field of 12 bits and a resource unit (RU) allocation field of 8 bits. If the MURST type field is 10 and the user information field performs indication to an EHT STA, the user information field may be configured by an AID field of 12 bits and a resource unit (RU) allocation field of 9 bits. Alternatively, the user information field may vary based on whether the terminal receiving same is an HE STA or an EHT STA, regardless of the MURTS type field value. For example, if the user information field corresponds to an HE STA, the user information field may include an AID field of 12 bits and an RU allocation field of 8 bits. In addition, if the user information field corresponds to an EHT STA, the user information field may include an AID field of 12 bits and an RU allocation field of 9 bits.

In a case where the resource unit (RU) is configured by 8 bits, when a B0 value of the RU allocation field is 1, this may indicate that transmission of a CTS frame using a 160 MHz or 80+80 MHz bandwidth is required. If the B0 value that is a least significant bit (LSB) of the RU allocation field is 0, this may indicate that the STA indicated by the user field is requested to transmit a CTS frame at 20 MHz, 40 MHz, or 80 MHz.

The transmission bandwidth of the CTS frame and a specific position of the transmission band may be indicated by B7-B1 of the RU allocation field, which are seven highest bits of the RU allocation field. The B7-B1 value of the RU allocation field may be configured as shown in Table 5 below.

TABLE 5

| B7-B1 value of RU allocation field | Description |
| --- | --- |
| 61 | 20 MHz primary channel, and when the position of the primary channel is the lowest 20 MHz channel of a primary 40 MHz or a primary 80 MHz |

TABLE 5-continued

| B7-B1 value of RU allocation field | Description |
|---|---|
| 62 | 20 MHz primary channel, and when the position of the primary channel is the second lowest 20 MHz channel of a primary 40 MHz or a primary 80 MHz |
| 63 | 20 MHz primary channel, and when the position of the primary channel is the third lowest 20 MHz channel of a primary 80 MHz |
| 64 | 20 MHz primary channel, and when the position of the primary channel is the fourth lowest 20 MHz channel of a primary 80 MHz |
| 65 | 40 MHz primary channel, and when the position of the primary channel is the lowest 40 MHz channel of a primary 80 MHz |
| 66 | 40 MHz primary channel, and when the position of the primary channel is the second lowest 40 MHz channel of a primary 80 MHz |
| 67 | 80 MHz primary channel |
| 68 | 160 MHz or 80 + 80 MHz primary channel |

If the RU allocation field is configured by 9 bits, B1-B0 of the RU allocation field, which are the two least significant bits, may indicate a segment position of a 80 MHz band in which a primary channel transmitting a corresponding CTS frame is positioned, when a channel with a 320 MHz bandwidth is divided into four 80 MHz channel segments.

The transmission bandwidth of the CTS frame and the position thereof in a 80 MHz segment may be indicated by B8-B2 of the RU allocation field. The B8-B2 value of the RU allocation field may be configured as shown in Table 6 below.

TABLE 6

| B8-B2 value of RU allocation field | Description |
|---|---|
| 60 | 20 MHz primary channel, and when the position of the primary channel is the lowest 20 MHz channel of a primary 40 MHz or a primary 80 MHz |
| 61 | 20 MHz primary channel, and when the position of the primary channel is the second lowest 20 MHz channel of a primary 40 MHz or a primary 80 MHz |
| 62 | 20 MHz primary channel, and when the position of the primary channel is the third lowest 20 MHz channel of a primary 80 MHz |
| 63 | 20 MHz primary channel, and when the position of the primary channel is the fourth lowest 20 MHz channel of a primary 80 MHz |
| 64 | 40 MHz primary channel, and when the position of the primary channel is the lowest 40 MHz channel of a primary 80 MHz |
| 65 | 40 MHz primary channel, and when the position of the primary channel is the second lowest 40 MHz channel of a primary 80 MHz |
| 66 | 80 MHz primary channel |
| 67 | 160 MHz or 80 + 80 MHz primary channel |
| 68 | 320 MHz or 160 + 160 MHz primary channel |

If the B8-B2 value indicates a 320 MHz or 160+160 MHz primary channel, the B1-B0 value of the RU allocation field may be indicated by 11.

If the length of a RU allocation field in a user information field transmitted to an EHT STA is to be maintained at 8 bits, the MU-RTS frame may be configured as follows.

Figure 30:
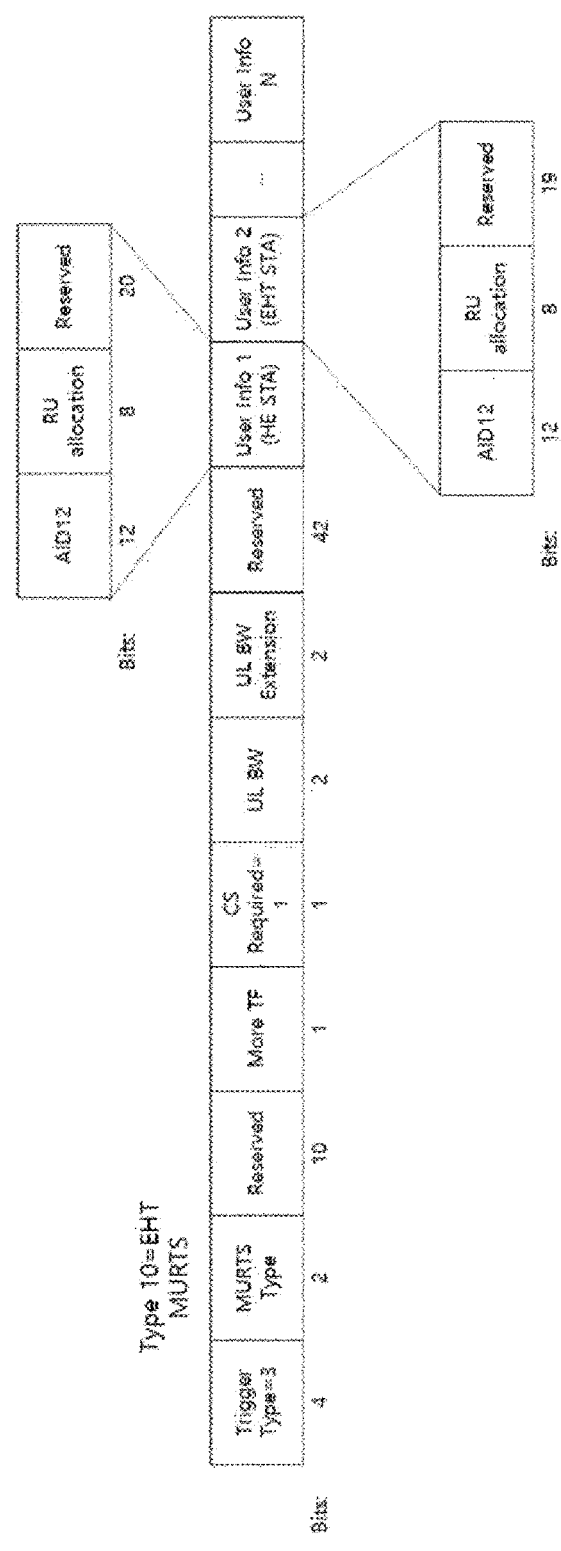
FIG. 30 shows a second embodiment illustrating a structure of an MU-RTS frame according to an embodiment of the present disclosure.
Figure 31:
FIG. 31 shows a second embodiment of an operation of protecting frame transmission or reception through a procedure of exchanging an MU-RTS frame and a CTS frame between an AP and multiple STAs according to an embodiment of the present disclosure.

FIG. 30 shows a second embodiment illustrating a structure of an MU-RTS frame according to an embodiment of the present disclosure. A part identical or similar to that of the structure of a MU-RTS frame illustrated in FIGS. 28A to 28D may not be described.

Referring to FIG. 30, a MU-RTS frame may be configured in a type of a trigger frame, and may be configured by a common field and one or more user information fields. The common field may be configured by a trigger type field, an indication field relating to whether a trigger frame is additionally transmitted after the frame, a field indicating whether a carrier sensing operation of a reception terminal is required, a field of a bandwidth of an uplink frame, a field related to bandwidth expansion of an uplink frame, and a reservation field. The common field may additionally include a MURTS type field. The configuration of the remaining fields except for the MURTS type field may be configured to be identical to that of the MU-RTS frame of FIGS. 28A to 28D. The MURTS type field may be configured to be 00 if the MU-RTS frame is transmitted in a 160 MHz bandwidth or narrower and thus does not configure a separate user information field for an EHT STA. If the MU-RTS frame is transmitted with a bandwidth exceeding 160 MHz, the MURTS type field may be configured to be 10.

The user information field may be configured by an AID field of 12 bits, a resource unit (RU) allocation field of 8 bits, and a reservation field. If the AID field of the user information field indicates an HE STA, or the bandwidth field and the bandwidth expansion field in the common field indicate a bandwidth of 160 MHz or smaller and the MURTS type field is 00, the RU allocation field of 8 bits may be configured to be the same as the RU allocation field of 8 bits illustrated in FIG. 13. That is, B0 of the RU allocation field indicates whether transmission is performed with a 160 MHz or 80+80 MHz bandwidth, and B7-B1 of the RU allocation field may be configured as shown in Table 3.

If the MU-RTS frame is transmitted with a bandwidth exceeding 160 MHz and the MURTS type field is 10, a RU allocation field in a user information field indicating an EHT STA may be configured as below. B1-B0 of the RU allocation field, which are the two least significant bits, may indicate a segment position of a 80 MHz band in which a primary channel transmitting a corresponding CTS frame is positioned, when a channel with a 320 MHz bandwidth is divided into four 80 MHz channel segments.

The transmission bandwidth of the CTS frame and the position thereof in a 80 MHz segment may be indicated by B7-B2 of the RU allocation field. The B7-B2 value of the RU allocation field may be configured as shown in Table 7 below.

TABLE 7

| B7-B2 value of RU allocation field | Description |
|---|---|
| 0 | 20 MHz primary channel, and when the position of the primary channel is the lowest 20 MHz channel of a primary 40 MHz or a primary 80 MHz |
| 1 | 20 MHz primary channel, and when the position of the primary channel is the second lowest 20 MHz channel of a primary 40 MHz or a primary 80 MHz |
| 2 | 20 MHz primary channel, and when the position of the primary channel is the third lowest 20 MHz channel of a primary 80 MHz |
| 3 | 20 MHz primary channel, and when the position of the primary channel is the fourth lowest 20 MHz channel of a primary 80 MHz |
| 4 | 40 MHz primary channel, and when the position of the primary channel is the lowest 40 MHz channel of a primary 80 MHz |
| 5 | 40 MHz primary channel, and when the position of the primary channel is the second lowest 40 MHz channel of a primary 80 MHz |
| 6 | 80 MHz primary channel |
| 7 | 160 MHz or 80 + 80 MHz primary channel |
| 8 | 320 MHz or 160 + 160 MHz primary channel |

If the B7-B2 value indicates a 320 MHz or 160+160 MHz primary channel, the B1-B0 value of the RU allocation field may be indicated by 11.

The procedure of exchange between the MU-RTS frame and the CTS frame may be performed using a primary 20 MHz channel, a primary 40 MHz channel, a primary 80 MHz channel, a primary 160 MHz/80+80 MHz channel, a primary 240 MHz/160+80 MHz channel, and a primary 320 MHz/160+160 MHz channel. Alternatively, when a particular 20 MHz channel except the primary 20 MHz channel is occupied, the 20 MHz channel may be emptied out, and only the remaining channels may be used. An operation of exchange between a MU-RTS frame and a CTS frame using an operation (a preamble puncturing operation) of emptying some 20 MHz channels described above and transmitting a frame may be performed as follows.

FIGS. 31A to 33D show a second embodiment of an operation of protecting frame transmission or reception through a procedure of exchanging an MU-RTS frame and a CTS frame between an AP and multiple STAs according to an embodiment of the present disclosure. A description identical or similar to an operation illustrated in FIGS. 28A to 28D may be omitted.

Referring to FIGS. 31A to 33D, an AP may simultaneously perform a frame transmission or reception procedure with multiple STAs. The process of simultaneously transmitting or receiving a frame with the multiple STAs may be performed through a MU-OFDMA or MU-MIMO operation. The AP may perform a procedure of exchange between a MU-RTS frame and a CTS frame before transmission of a corresponding frame in order to protect a corresponding frame transmission or reception procedure. The MU-RTS frame may be transmitted using one channel among a primary 20 MHz channel, a primary 40 MHz channel, a primary 80 MHz channel, a primary 160 MHz or 80+80 MHz channel, a primary 240 MHz or primary 160+80 MHz channel, and a primary 320 MHz or 160+160 MHz channel. If one or more 20 MHz channels among 20 MHz channels other than the primary 20 MHz is occupied or is not to be used, the one or more 20 MHz channels may be emptied and only the remaining channels may be used to transmit a MU-RTS frame. That is, when a primary 80 MHz channel, a primary 160 MHz or 80+80 MHz channel, a primary 240 MHz or primary 160+80 MHz channel, and a primary 320 MHz or 160+160 MHz channel are used to transmit a MU-RTS frame, the MU-RTS frame may not be transmitted in a particular 20 MHz channel. For example, when a primary 80 MHz channel is used to transmit a MU-RTS frame, if a 20 MHz channel in a secondary 40 MHz channel is occupied, the corresponding channel may be emptied and only the remaining channels may be used to transmit a MU-RTS frame.

The MU-RTS may indicate an ID (e.g., association ID) of an STA that is to transmit CTS, and a channel (e.g., a primary 20 MHz channel, a primary 40 MHz channel, a primary 80 MHz channel, a primary 160 MHz or 80+80 MHz channel, a primary 240 MHz or primary 160+80 MHz channel, and a primary 320 MHz or 160+160 MHz channel) in which each STA is to transmit a CTS frame. A 20 MHz channel (punctured channel) in which MU-RTS is not transmitted and is emptied may be additionally indicated. The MU-RTS frame may be configured as described later with reference to FIG. 17. The MU-RTS frame may be a frame that requests multiple STAs to simultaneously transmit CTS frames. The multiple STAs may include an HE STA defined in IEEE 802.11ax, and may include an EHT STA defined in IEEE 802.11be.

Referring to FIG. 31A, an AP may transmit MU-RTS frames to multiple STAs, and receive CTS frames that are simultaneously transmitted from the STAs after passage of a SIFS time from a transmission end time point of PPDUs including the MU-RTS frames. Transmission of the CTS frame may be repeated every 20 MHz channel. The CTS frame may be a non-HT duplicated PPDU type. The CTS frames transmitted by the multiple STAs may be identically configured. In view of the AP, the AP may receive a CTS frame in each 20 MHz channel. The reception power of the CTS frame received in each 20 MHz channel may be different. If the AP receives a CTS frame as a response for MU-RTS, the AP may perform a MU-OFDMA or MU-MIMO operation with multiple STAs, based on the bandwidth of the received CTS frame.

As described above, the transmission bandwidths of the CTS frames transmitted by STAs having received the MU-RTS frame may be different from each other. For example, referring to part (b) of FIG. 16, in a case where a channel indicated to transmit a CTS frame in a MU-RTS frame is a primary 20 MHz channel, STA1 may perform a channel sensing operation only in the primary 20 MHz channel. The channel sensing operation may be performed for a SIFS time. If the primary 20 MHz channel is idle, a CTS frame may be transmitted. The CTS frame may be transmitted in a non-HT PPDU type. STA1 may receive a downlink frame within the corresponding 20 MHz channel after transmitting the CTS frame. The STA transmitting the CTS frame may be a HE STA or an EHT STA.

Referring to FIG. 31C, in a case where a channel indicated to transmit a CTS frame in a MU-RTS frame is a primary 40 MHz channel, an STA (e.g., STA2) indicated by a user information field of the MU-RTS frame may perform a channel sensing operation only in the primary 40 MHz channel. The channel sensing operation may be performed for a SIFS time. If the primary 40 MHz channel is idle, a CTS frame may be transmitted. The CTS frame may be transmitted in a non-HT duplicated PPDU type. STA2 may receive a downlink frame within the corresponding 40 MHz channel after transmitting the CTS frame. The STA transmitting the CTS frame may be a HE STA or an EHT STA.

Referring to FIG. 31D, in a case where a channel indicated to transmit a CTS frame in a MU-RTS frame is a primary 80 MHz channel wherein a particular 20 MHz channel is emptied, an STA (e.g., STA3) indicated by a user information field of the MU-RTS frame may perform a channel sensing operation only in a remaining channel of the primary 80 MHz channel except for the 20 MHz channel indicated to be emptied. If a result of channel sensing indicates that the channel is idle, a CTS frame may be transmitted. The CTS frame may be transmitted in a non-HT duplicated PPDU type. STA3 may receive a downlink frame within the channel in which the MU-RTS frame and the CTS frame have been changed, after transmitting the CTS frame. The STA transmitting the CTS frame may be an EHT STA.

A MU-RTS frame used in the procedure of exchange between the MU-RTS frame and a CTS frame may be configured by adding a field indicating a punctured channel, to a conventional MU-RTS frame. Alternatively, a correspond MU-RTS frame may be configured as below.

Figure 32:
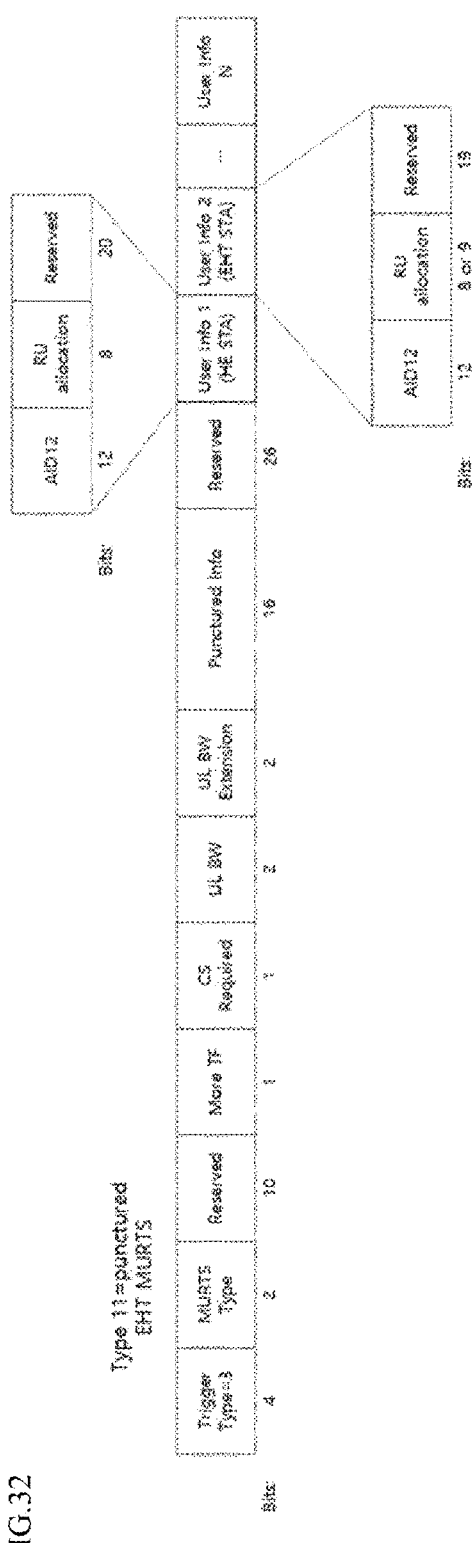
FIG. 32 shows a third embodiment illustrating a structure of an MU-RTS frame according to an embodiment of the present disclosure.

FIG. 32 shows a third embodiment illustrating a structure of an MU-RTS frame according to an embodiment of the present disclosure. A part configured to be identical to that of a MU-RTS frame illustrated in FIG. 29 may not be described.

Referring to FIG. 32, a MU-RTS frame may be configured in a type of a trigger frame, and may be configured by a common field and one or more user information fields. The common field may be configured by a trigger type field, an indication field relating to whether a trigger frame is additionally transmitted after the frame, a field indicating whether a carrier sensing operation of a reception terminal is required, a field of a bandwidth of an uplink frame, a field related to bandwidth expansion of an uplink frame, and a reservation field. The common field may additionally include a MURTS type field. In addition, the common field may further include a punctured channel field. The remaining fields except for the MURTS type field and the punctured channel field may be configured to be the same as shown in FIG. 14. A field indicating the MURTS type field may indicate that the MU-RTS frame is transmitted with some 20 MHz channels that are emptied. For example, the MURTS type field may be configured to be 11. The punctured channel field may be included when the MURTS type field is configured to be 11. The punctured channel field may be configured by 16 bits. Each bit of the 16 bits may indicate one 20 MHz channel. Therefore, if a corresponding bit position is configured to be 0, this may indicate that a MU-RTS frame is transmitted in a 20 MHz channel corresponding to the position of the bit. For example, the second least significant bit (e.g., B1) of the 16 bits is configured to be 1 and the remaining bits are configured to be 0, this may indicate that only a 20 MHz channel of the second lowest band is a punctured channel, and a frame is transmitted in another channel. A primary 20 MHz channel may be unable to be configured as 1.

The user information field may be configured to be similar as described with reference to FIG. 29 or FIG. 30. For example, if a corresponding MU-RTS frame is transmitted with a 160 MHz band or smaller and a MURTS type field in a common field is 11, B0 of an RU allocation field in a user information field may indicate whether a bandwidth is a 160 MHz or 80+80 MHz bandwidth, and B7-B1 may be indicated as shown in Table 3. If a corresponding MU-RTS frame is transmitted with a bandwidth exceeding a 160 MHz band and a MURTS type field is 11, B0 of an RU allocation field in a user information field may be configured by 8 bits or 9 bits. If the RU allocation field is 9 bits, the field may be configured as shown in FIG. 14. If the RU allocation field is 8 bits, the field may be configured as shown in FIG. 30.

If a MURTS type field is 11, an EHT STA having received the MU-RTS frame from an AP may check a bandwidth field and a bandwidth expansion field to identify a bandwidth in which the MU-RTS frame is transmitted. A channel required to be emptied for CTS transmission may be identified through the punctured channel field. In addition, a bandwidth that a corresponding STA is required to use for transmission may be identified through a RU allocation field. A method of interpreting the RU allocation field may vary according to a MURTS type field and a bandwidth used to transmit a MU-RTS frame. An EHT STA having identified a punctured channel and a RU allocation field interpreted according to the MURTS type field and the bandwidth used to transmit the MU-RTS frame may empty a 20 MHz channel indicated by the punctured channel field and transmit a CTS frame in the remaining channels according to a value indicated by the RU allocation field.

A HE STA having received the MU-RTS frame may fail to decipher the punctured channel field. Therefore, the HE STA may transmit a CTS frame in a channel indicated by a RU allocation field without emptying a particular 20 MHz channel.

In the process of exchange between a MU-RTS frame and a CTS frame, the CTS frame may be transmitted only in one or more 20 MHz channels. In this case, an operation of exchange between a MU-RTS frame and a CTS frame may be performed as follows.

FIGS. 33A to 33D show a third embodiment of an operation of protecting frame transmission or reception through a procedure of exchanging an MU-RTS frame and a CTS frame between an AP and multiple STAs according to an embodiment of the present disclosure. A description identical or similar to an operation illustrated in FIGS. 28A to 28D and FIGS. 31A to 33D may be omitted.

Referring to FIGS. 33A to 33D, an AP may simultaneously perform a frame transmission or reception procedure with multiple STAs. The process of simultaneously transmitting or receiving a frame with the multiple STAs may be performed through a MU-OFDMA or MU-MIMO operation. The AP may perform a procedure of exchange between a MU-RTS frame and a CTS frame before transmission of a corresponding frame in order to protect a corresponding frame transmission or reception procedure. The MU-RTS frame may be transmitted using one channel among a primary 20 MHz channel, a primary 40 MHz channel, a primary 80 MHz channel, a primary 160 MHz or 80+80 MHz channel, a primary 240 MHz or primary 160+80 MHz channel, and a primary 320 MHz or 160+160 MHz channel. If a 20 MHz channel among 20 MHz channels other than the primary 20 MHz has a busy channel state or is not to be used, only the corresponding 20 MHz channel may be emptied and the remaining channels may be used for transmission. For example, when a primary 80 MHz channel is used to transmit a MU-RTS frame, if a 20 MHz channel in a secondary 40 MHz channel is occupied, the corresponding channel may be emptied and only the remaining channels may be used to transmit a MU-RTS frame.

The MU-RTS may indicate an ID (e.g., association ID) of an STA that is to transmit CTS, and a channel in which each STA is to transmit a CTS frame. The channel to be used to transmit a CTS frame may be a particular 20 MHz channel or multiple 20 MHz channels. The type of the multiple 20 MHz channels may be limited. In addition, a 20 MHz channel (punctured channel) in which MU-RTS is not transmitted and is emptied may be additionally indicated. The MU-RTS frame may be configured as described later with reference to FIG. 34. The MU-RTS frame may be a frame that requests multiple STAs to simultaneously transmit CTS frames. The multiple STAs may include an HE STA defined in IEEE 802.11ax, and may include an EHT STA defined in IEEE 802.11be. A HE STA is unable to be indicated to transmit a CTS frame in a channel rather than a primary 20 MHz channel, a primary 40 MHz channel, a primary 80 MHz channel, a primary 160 MHz, or a primary 80+80 MHz channel.

Referring to FIG. 33A, an AP may transmit MU-RTS frames to multiple STAs, and receive CTS frames that are simultaneously transmitted from the STAs after passage of a SIFS time from a transmission end time point of PPDUs including the MU-RTS frames. Transmission of the CTS frame may be repeated every 20 MHz channel. The CTS frame may be a non-HT duplicated PPDU type. The CTS frames transmitted by the multiple STAs may be identically configured. In view of the AP, the AP may receive a CTS frame in each 20 MHz channel. The reception power of the CTS frame received in each 20 MHz channel may be different. If the AP receives a CTS frame as a response for MU-RTS, the AP may perform a MU-OFDMA or MU-MIMO operation with multiple STAs, based on the bandwidth of the received CTS frame.

As described above, the transmission bandwidths of the CTS frames transmitted by STAs having received the MU-RTS frame may be different from each other. For example, referring to part (b) of FIG. 18, in a case where a channel indicated to transmit a CTS frame in a MU-RTS frame is a primary 20 MHz channel, STA1 may perform a channel sensing operation only in the primary 20 MHz channel. The channel sensing operation may be performed for a SIFS time. If the primary 20 MHz channel is idle, a CTS frame may be transmitted. The CTS frame may be transmitted in a non-HT PPDU type. STA1 may receive a downlink frame within the corresponding 20 MHz channel after transmitting the CTS frame. The STA transmitting the CTS frame may be a HE STA or an EHT STA.

Referring to FIG. 33C, in a case where a channel indicated to transmit a CTS frame in a MU-RTS frame is the second-ary lowest 20 MHz channel, an STA (e.g., STA2) indicated by a user information field of the MU-RTS frame may perform a channel sensing operation only in the 20 MHz channel. The channel sensing operation may be performed for a SIFS time. If the 20 MHz channel is idle, a CTS frame may be transmitted. The CTS frame may be transmitted in a non-HT PPDU type. STA2 may receive a downlink frame within the corresponding 20 MHz channel after transmitting the CTS frame. The STA transmitting the CTS frame may be an EHT STA.

Referring to FIG. 33D, in a case where a channel indi-cated to transmit a CTS frame in a MU-RTS frame is a primary 80 MHz channel wherein a particular 20 MHz channel is emptied, an STA (e.g., STA3) indicated by a user information field of the MU-RTS frame may perform a channel sensing operation only in a remaining channel of the primary 80 MHz channel except for the indicated 20 MHz channel. If a result of channel sensing indicates that the channel is idle, a CTS frame may be transmitted. The CTS frame may be transmitted in a non-HT duplicated PPDU type. STA3 may receive a downlink frame within the channel in which the MU-RTS frame and the CTS frame have been changed, after transmitting the CTS frame. The STA transmitting the CTS frame may be an EHT STA.

A MU-RTS frame used in the procedure of exchange between the MU-RTS frame and a CTS frame may be obtained by changing a RU allocation field of a conventional MU-RTS frame to be able to indicate multiple 20 MHz bands. A field indicating a punctured channel may be added to the MU-RTS frame. Alternatively, the MU-RTS frame may be configured as below.

Figure 34:
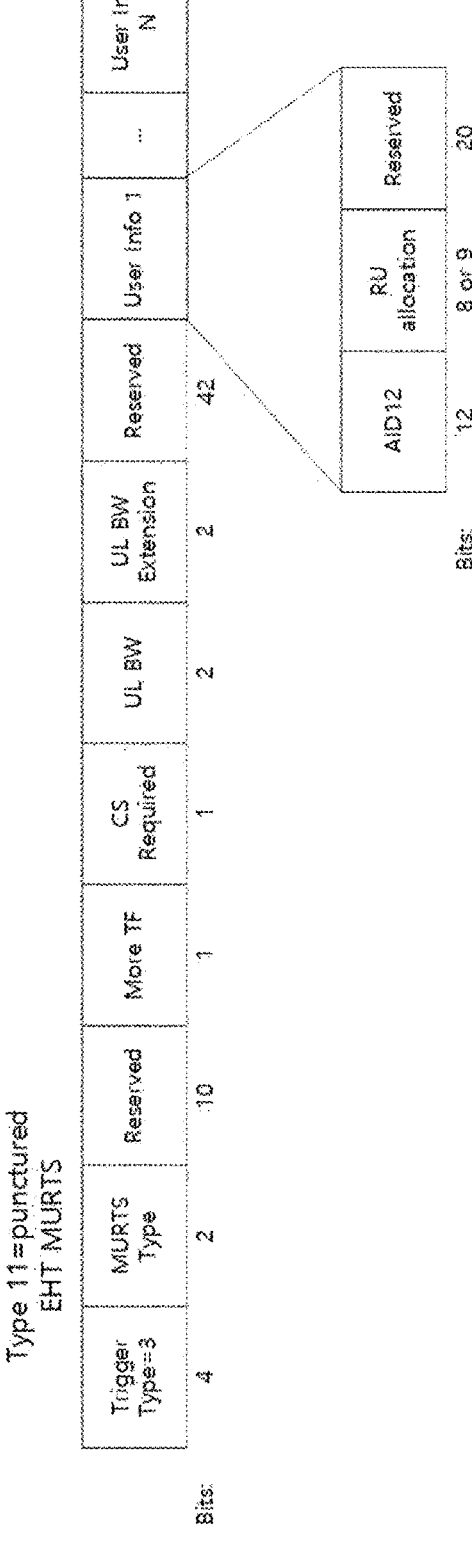
FIG. 34 shows a fourth embodiment illustrating a structure of an MU-RTS frame according to an embodiment of the present disclosure.

FIG. 34 shows a fourth embodiment illustrating a struc-ture of an MU-RTS frame according to an embodiment of the present disclosure. A part configured to be identical to that of a MU-RTS frame illustrated in FIG. 29 or FIG. 32 may not be described.

Referring to FIG. 34, a MU-RTS frame may be configured in a type of a trigger frame, and may be configured by a common field and one or more user information fields. The common field may be configured by a trigger type field, an indication field relating to whether a trigger frame is addi-tionally transmitted after the frame, a field indicating whether a carrier sensing operation of a reception terminal is required, a field of a bandwidth of an uplink frame, a field related to bandwidth expansion of an uplink frame, and a reservation field. The common field may additionally include a MURTS type field. The remaining fields in the common field except for a field indicating the MURTS type field may be configured to be the same as shown in FIG. 14. The field indicating the MURTS type field may indicate that the MU-RTS frame is transmitted with some 20 MHz channels that are emptied. For example, the MURTS type field may be configured to be 11. The common field may further include a punctured channel field. The punctured field may be included when the MURTS type field is configured to be 11. When the punctured field is included, the field may be configured to be identical to that of the MU-RTS frame of FIG. 17.

The user information field may be differently configured according to whether a terminal indicated by the field is an HE STA or an EHT STA. If the user information field indicates an HE STA, the user information field may be configured by an AID field of 12 bits and an RU allocation field of 8 bits. B0 of the RU allocation field indicates whether a bandwidth is a 160 MHz or 80+80 MHz band-width, and B7-B1 may be indicated as shown in Table 3. If the user information field indicates an EHT STA, the user information field may be configured by an AID field of 12 bits and an RU allocation field of 8 bits of 9 bits. If the RU allocation field is 9 bits, B1-B0 of the RU allocation field may indicate a segment position of a 80 MHz band in which a primary channel transmitting a corresponding CTS frame is positioned, when a channel with a 320 MHz bandwidth is divided into four 80 MHz channel segments. B0 may designate the position of the segment of the 80 MHz band. For example, if B0 is configured to be 0, this may indicate that the corresponding 80 MHz segment is included in a lower 160 MHz channel of a low 320 MHz or 160+160 MHz primary channel. If B0 is configured to be 1, this may indicate that the corresponding 80 MHz segment is included in a higher 160 MHz channel of a low 320 MHz or 160+160 MHz primary channel.

The transmission bandwidth of the CTS frame and the position thereof in a 80 MHz segment may be indicated by B8-B2 of the RU allocation field. The B8-B2 value of the RU allocation field may be configured as shown in Table 8 below.

TABLE 8

| B8-B2 value | Description |
| --- | --- |
| 60 | Lowest 20 MHz channel in 80 MHz segment indicated by B1-B0 |
| 61 | Second lowest 20 MHz channel in 80 MHz segment indicated by B1-B0 |
| 62 | Third lowest 20 MHz channel in 80 MHz segment indicated by B1-B0 |
| 63 | Fourth lowest 20 MHz channel in 80 MHz segment indicated by B1-B0 |
| 64 | Lowest 40 MHz channel in 80 MHz segment indicated by B1-B0 |
| 65 | Second lowest 40 MHz channel in 80 MHz segment indicated by B1-B0 |
| 66 | 80 MHz channel indicated by B1-B0 |
| 67 | 160 MHz or 80 + 80 MHz channel corresponding to position indicated by B1-B0 |
| 68 | 320 MHz or 160 + 160 MHz primary channel |
| 81-84 | 20 MHz channel + 40 MHz channel in 80 MHz segment indicated by B1-B0 (81: When lowest 20 MHz channel is emptied, 82: When second lowest 20 MHz channel is emptied, 83: When third lowest 20 MHz channel is emptied, 84: When fourth lowest 20 MHz channel is emptied) |
| 85-88 | 40 MHz channel + 80 MHz channel in 160 MHz or 80 + 80 MHz channel corresponding to position indicated by B1-B0 (85: When lowest 40 MHz channel is emptied, 86: When second lowest 40 MHz channel is emptied, 87: When third lowest 40 MHz channel is emptied, 88: When fourth lowest 40 MHz channel is emptied) |
| 97-108 | 40 MHz channel + 80 MHz channel + 80 MHz channel in 320 MHz or 160 + 160 MHz primary channel |

TABLE 8-continued

| B8-B2 value | Description |
|---|---|
| | (97: When highest 80 MHz channel and lowest 40 MHz channel are emptied, |
| | 98: When highest 80 MHz channel and second lowest 40 MHz channel are emptied, |
| | 99: When highest 80 MHz channel and third lowest 40 MHz channel are emptied, |
| | 100: When highest 80 MHz channel and fourth lowest 40 MHz channel are emptied, |
| | 101: When highest 80 MHz channel and fifth lowest 40 MHz channel are emptied, |
| | 102: When highest 80 MHz channel and sixth lowest 40 MHz channel are emptied, |
| | 103: When lowest 80 MHz channel and lowest 40 MHz channel are emptied, |
| | 104: When lowest 80 MHz channel and second lowest 40 MHz channel are emptied, |
| | 105: When lowest 80 MHz channel and third lowest 40 MHz channel are emptied, |
| | 106: When lowest 80 MHz channel and fourth lowest 40 MHz channel are emptied, |
| | 107: When lowest 80 MHz channel and fifth lowest 40 MHz channel are emptied, |
| | 108: When lowest 80 MHz channel and sixth lowest 40 MHz channel are emptied) |
| 109-112 | 80 MHz channel + 80 MHz channel + 80 MHz channel in 320 MHz or 160 + 160 MHz primary channel |
| | (109: When lowest 80 MHz channel is emptied, |
| | 110: When second lowest 80 MHz channel is emptied, |
| | 111: When third lowest 80 MHz channel is emptied, |
| | 112: When fourth lowest 80 MHz channel is emptied) |
| 113-120 | 40 MHz channel + 80 MHz channel + 80 MHz channel in 320 MHz or 160 + 160 MHz primary channel |
| | (113: When lowest 40 MHz channel is emptied, |
| | 114: When second lowest 40 MHz channel is emptied, |
| | 115: When third lowest 40 MHz channel is emptied, |
| | 116: When fourth lowest 40 MHz channel is emptied, |
| | 117: When fifth lowest 40 MHz channel is emptied, |
| | 118: When sixth lowest 40 MHz channel is emptied, |
| | 119: When seventh lowest 40 MHz channel is emptied, |
| | 120: When eighth lowest 40 MHz channel is emptied) |

Values not shown in Table 8 may not be used in the RU allocation field.

If the B8-B2 value indicates a 320 MHz or 160+160 MHz primary channel or indicates multiple RUs in 320 MHz or 160+160 MHz, the B1-B0 value of the RU allocation field may be indicated by 11.

If the RU allocation field is configured by 8 bits, B1-B0 of the RU allocation field may indicate a segment position of a 80 MHz band in which a primary channel transmitting a corresponding CTS frame is positioned, when a channel with a 320 MHz bandwidth is divided into four 80 MHz channel segments.

The transmission bandwidth of the CTS frame and the position thereof in a 80 MHz segment may be indicated by B8-B2 of the RU allocation field. The B7-B2 value of the RU allocation field may be configured as shown in Table 9 below.

TABLE 9

| B7-B2 value | Description |
|---|---|
| 0 | Lowest 20 MHz channel in 80 MHz segment indicated by B1-B0 |
| 1 | Second lowest 20 MHz channel in 80 MHz segment indicated by B1-B0 |
| 2 | Third lowest 20 MHz channel in 80 MHz segment indicated by B1-B0 |

TABLE 9-continued

| B7-B2 value | Description |
|---|---|
| 3 | Fourth lowest 20 MHz channel in 80 MHz segment indicated by B1-B0 |
| 4 | Lowest 40 MHz channel in 80 MHz segment indicated by B1-B0 |
| 5 | Second lowest 40 MHz channel in 80 MHz segment indicated by B1-B0 |
| 6 | 80 MHz channel indicated by B1-B0 |
| 7 | 160 MHz or 80 + 80 MHz channel corresponding to position indicated by B1-B0 |
| 8 | 320 MHz or 160 + 160 MHz primary channel |
| 21-24 | 20 MHz channel + 40 MHz channel in 80 MHz segment indicated by B1-B0 |
| | (21: When lowest 20 MHz channel is emptied, |
| | 22: When second lowest 20 MHz channel is emptied, |
| | 23: When third lowest 20 MHz channel is emptied, |
| | 24: When fourth lowest 20 MHz channel is emptied) |
| 25-28 | 40 MHz channel + 80 MHz channel in 160 MHz or 80 + 80 MHz channel corresponding to position indicated by B1-B0 |
| | (25: When lowest 40 MHz channel is emptied, |
| | 26: When second lowest 40 MHz channel is emptied, |
| | 27: When third lowest 40 MHz channel is emptied, |
| | 28: When fourth lowest 40 MHz channel is emptied) |
| 37-48 | 40 MHz channel + 80 MHz channel + 80 MHz channel in 320 MHz or 160 + 160 MHz primary channel |
| | (37: When highest 80 MHz channel and lowest 40 MHz channel are emptied, |
| | 38: When highest 80 MHz channel and second lowest 40 MHz channel are emptied, |
| | 39: When highest 80 MHz channel and third lowest 40 MHz channel are emptied, |
| | 40: When highest 80 MHz channel and fourth lowest 40 MHz channel are emptied, |
| | 41: When highest 80 MHz channel and fifth lowest 40 MHz channel are emptied, |
| | 42: When highest 80 MHz channel and sixth lowest 40 MHz channel are emptied, |
| | 43: When lowest 80 MHz channel and lowest 40 MHz channel are emptied, |
| | 44: When lowest 80 MHz channel and second lowest 40 MHz channel are emptied, |
| | 45: When lowest 80 MHz channel and third lowest 40 MHz channel are emptied, |
| | 46: When lowest 80 MHz channel and fourth lowest 40 MHz channel are emptied, |
| | 47: When lowest 80 MHz channel and fifth lowest 40 MHz channel are emptied, |
| | 48: When lowest 80 MHz channel and sixth lowest 40 MHz channel are emptied,) |
| 49-52 | 80 MHz channel + 80 MHz channel + 80 MHz channel in 320 MHz or 160 + 160 MHz primary channel |
| | (49: When lowest 80 MHz channel is emptied, |
| | 50: When second lowest 80 MHz channel is emptied, |
| | 51: When third lowest 80 MHz channel is emptied, |
| | 52: When fourth lowest 80 MHz channel is emptied) |
| 53-60 | 40 MHz channel + 80 MHz channel + 80 MHz channel in 320 MHz or 160 + 160 primary MHz channel |
| | (53: When lowest 40 MHz channel is emptied, |
| | 54: When second lowest 40 MHz channel is emptied, |
| | 55: When third lowest 40 MHz channel is emptied, |
| | 56: When fourth lowest 40 MHz channel is emptied, |
| | 57: When fifth lowest 40 MHz channel is emptied, |
| | 58: When sixth lowest 40 MHz channel is emptied, |
| | 59: When seventh lowest 40 MHz channel is emptied, |
| | 60: When eighth lowest 40 MHz channel is emptied) |

Values not shown in Table 9 may not be used in the RU allocation field.

If the B8-B2 value indicates a 320 MHz or 160+160 MHz primary channel or indicates multiple RUs in 320 MHz or 160+160 MHz, the B1-B0 value of the RU allocation field may be indicated by 11.

If a MURTS type field is 11, an EHT STA having received the MU-RTS frame from an AP may check a bandwidth field and a bandwidth expansion field to identify a bandwidth in which the MU-RTS frame is transmitted. In addition, one or more 20 MHz channels in which a corresponding STA is required to transmit a CTS frame may be identified through a RU allocation field. A method of interpreting the RU allocation field may vary according to the type (e.g., a HE STA or EHT STA) of a terminal receiving a MU-RTS frame and a MURTS type field. An EHT STA having identified a RU allocation field interpreted according to the MURTS type field may transmit a CTS frame in one or more 20 MHz channels indicated by the RU allocation field. If the MU-RTS frame includes a punctured channel field added thereto, the EHT STA may refer to the field and transmit a CTS frame in one or more 20 MHz channels indicated by the RU allocation field.

A HE STA having received the MU-RTS frame may fail to decipher the added punctured channel field. Therefore, the HE STA may transmit a CTS frame in a channel indicated by a RU allocation field without emptying a particular 20 MHz channel.

An indicator requesting transmission of a CTS frame in a primary 20 MHz channel may be added to a MU-RTS frame described above with reference to FIG. 19. If the indicator for transmitting a CTS frame in a primary 20 MHz channel is configured, a STA having received the MU-RTS frame may transmit a CTS frame in multiple 20 MHz frames including the primary 20 MHz channel even when the RU allocation field does not indicate the primary 20 MHz channel.

The operation of exchanging a MU-RTS frame and a CTS frame described above with reference to FIG. 13, FIG. 16, or FIG. 18 may also be performed between an AP belonging to an AP MLD and a terminal belonging to a STA MLD. The STA MLD may be incapable of an STR operation in some links. Therefore, By transmitting the MU-RTS frame for a plurality of terminals including other terminals of the corresponding STA MLD from the AP MLD in another link of the terminal belonging to the corresponding STA MLD, An MU-RTS frame and CTS frame exchange operation can be started in one link of the AP MLD. The operation between the AP MLD and the STA MLD may be performed as follows.

FIGS. 35A to 35C show an embodiment illustrating a process of channel reservation through a procedure of exchanging an MU-RTS frame and a CTS frame during an operation for multiple terminals according to an embodiment of the present disclosure.

Referring to FIGS. 35A to 35C, even if some STAs are incapable of a STR operation and thus are unable to transmit a CTS frame with respect to a MU-RTS frame transmitted by an AP belonging to an AP MLD, when another STA transmits a CTS frame in a corresponding channel, the AP may perform a process of channel reservation through a procedure of exchanging a MU-RTS frame and a CTS frame. For example, multiple MPs may belong to an AP MLD. The APs may operate links, respectively. For example, AP1 and AP2 may belong to the AP MLD. AP1 may operate link1, and AP2 may operate link2. A STA MLD or a STA not belong to a STA MLD may be connected to an AP in an AP MLD. For example, STA1-1 and STA1-2 included in STA MLD1 may be connected to the AP MLD. STA1-1 and STA1-2 may be connected to AP1 and AP2, respectively. STA2-1 and STA2-2 included in STA MLD2 may be connected to AP1 and AP2, respectively. STA1-1 and STA1-2 belonging to STA MLD1 may be incapable of an STR operation. That is, while STA1-1 is performing a transmission operation in link1, STA1-2 may be unable to perform a reception operation. STA2-1 and STA2-2 belonging to STA MLD2 may be capable of an STR operation. In addition, STA3 not belonging to a STA MLD may be connected to AP1.

Referring to FIG. 35A, AP1 belonging to the AP MLD may perform a frame transmission or reception operation with multiple terminals connected to the AP. For example, AP1 may simultaneously transmit downlink frames to STA1-1, STA2-1, and STA3 by using an OFDMA operation. The AP may perform a procedure of exchange between a MU-RTS frame and a CTS frame with the multiple terminals in order to protect a corresponding frame transmission or reception operation.

If an STR operation is possible between the APs belonging to the AP MLD, AP2 may independently perform a channel access operation for frame transmission while AP1 is performing a frame transmission or reception operation. After the channel access operation, a frame transmission or reception operation with multiple terminals may be performed. For example, if there is downlink data to be transmitted to multiple terminals, AP2 may simultaneously transmit the data by using a downlink MIMO operation or a downlink OFDMA operation with STA1-2 and STA2-2. In order to protect the corresponding frame transmission or reception operation, the AP may be to transmit a MU-RTS frame to the multiple terminals to perform a procedure of exchange between a MU-RTS frame and a CTS frame.

Referring to FIG. 35B, STA MLD1 incapable of an STR operation in link1 and link2 receives a frame in link1, and even if the MU-RTS frame is received in link2, STA MLD1 may be unable to transmit a CTS frame as a response therefor. Referring to FIG. 35C, a STA capable of transmitting a CTS frame as a response for the MU-RTS frame may use a channel indicated by MU-RTS to transmit a CTS frame. The STA transmitting the CTS frame may be a STA MLD not transmitting a frame in link1 at a time point of reception in link2, or a STA MLD or STA not belonging to a STA MLD which is capable of an STR operation in link1 and link2. The operation of transmitting a CTS frame as a response for MU-RTS may be performed as illustrated in FIG. 13, FIG. 16, or FIG. 18.

Referring to FIG. 35A, in view of the AP MLD, even in a case where the AP MLD fails to receive a CTS frame for the transmitted MU-RTS frame from a STA of a STA MLD incapable of an STR operation, if another terminal indicated to transmit a CTS frame by using the same band transmits the CTS frame, the AP MLD may determine that the exchange between the MU-RTS frame and the CTS frame is successful. Therefore, AP2 of the AP MLD may transmit downlink frames even to terminals which are incapable of an STA operation and thus have failed to transmit a CTS frame. The frames includes a frame transmitted to a terminal incapable of an STR operation. Therefore, if a frame transmitted in link1 or link2 requests transmission of a response frame (e.g., ACK frame or BlockAck frame), the transmission end time points of downlink frames transmitted in link1 and link2 may be the same.

Referring again to FIG. 35B, STA1-2 that is incapable of an STR operation and thus has failed to transmit a CTS response for a received MU-RTS frame may receive a downlink frame transmitted by AP2 in the link according to transmission of, by another terminal (e.g., STA2-2), a CTS frame in a corresponding channel.

If the MLD incapable of an STR operation participates in a MU-RTS frame exchange process, the MLD may fail to transmit a CTS response for the received MU-RTS as in the following situation, and thus there is no CTS frame in a particular channel.

FIGS. 36A to 36C illustrate an operation in which a CTS frame for an MU-RTS frame is not transmitted in a particular 20 MHz channel according to an embodiment of the present disclosure.

Referring to FIG. 36A, in a case where a channel expansion operation is performed as illustrated in FIG. 13 in order to transmit a MU-RTS frame, when STAs indicated using a CTS frame by using an expansion channel includes only STAs receiving a downlink frame in a link in which an STR operation is not permitted, the expansion channel may not be used to transmit a CTS frame. That is, in the process where an AP MLD transmits a frame in one link, the AP MLD completes a channel access operation in another link and then expands a channel to perform an operation of exchange between a MU-RTS frame and a CTS frame. The MU-RTS frame may be transmitted using one channel among a primary 40 MHz channel, a primary 80 MHz channel, a primary 160 MHz or 80+80 MHz channel, a primary 240 MHz or 160+80 MHz channel, or a primary 320 MHz or 160+160 MHz channel. In a case of an STA which is capable of an STR operation or is not receiving a frame in another link, the STA may transmit a CTS frame for a received MU-RTS frame as shown in FIG. 20C. On the other hand, in a case of an STA which is already receiving a frame in another link in which an STR operation is impossible, the STA may be unable to transmit a CTS frame for a received MU-RTS frame as shown in FIG. 35B. In a case where STAs indicated to transmit a CTS frame in the expansion channel include only STAs incapable of transmitting a CTS frame for a received MU-RTS frame as shown in FIG. 35B, a CTS frame for a transmitted MU-RTS frame may be unable to be transmitted in the expansion channel. For example, AP1 and AP2 may belong to an AP MLD. AP1 may operate link1, and AP2 may operate link2. STA1-1 and STA1-2 may belong to STA MLD1. STA2-1 and STA2-2 may belong to STA MLD2. STA1-1, STA2-1, and STA3 may be connected to AP1, and STA1-2 and STA2-2 may be connected to AP2. STA1-1 and STA1-2 of STA MLD1 may be incapable of an STR operation link1 and link2. AP1 may transmit a downlink frame to STA1-1, STA2-1, and STA3 by using a multi-user OFDMA operation. AP1 may transmit a downlink frame to STA1-1. AP1 may additionally perform a procedure of exchange between an RTS frame or a MU-RTS frame and a CTS frame to protect the downlink frame. While AP1 is performing frame transmission or reception with STA1-1 or multiple terminals including STA1-1, AP2 may complete a channel contention process for frame transmission in link2.

AP2 may be to transmit a downlink frame to multiple terminals including STA1-2. For example, AP2 may be to transmit a downlink frame to STA1-2 and STA2-2. In order to protect the operation of transmitting a downlink frame, the AP2 may perform a procedure of exchange between a MU-RTS frame and a CTS frame before transmission of the corresponding frame. The transmission of a MU-RTS frame may be performed using the same bandwidth as that of a downlink frame. For example, when AP2 is to transmit a downlink frame through a primary 80 MHz channel, AP2 may transmit a MU-RTS frame by using a 80 MHz bandwidth as well. The MU-RTS frame may indicate a primary 40 MHz channel as a transmission band of a CTS frame transmitted by STA2-2, and a primary 80 MHz channel as a transmission bandwidth of a CTS frame transmitted by STA1-2. STA1-1 is receiving a frame in link1, and thus STA1-2 may be unable to transmit a CTS frame as a response for a MU-RTS frame received in link2. STA2-2 may transmit a CTS frame as a response for a MU-RTS frame. AP2 has received a CTS frame only in a 40 MHz band for a MU-RTS frame transmitted with a 80 MHz band, and thus may transmit a downlink frame by using only the 40 MHz band. That is, in a secondary 40 MHz channel rather than a primary 40 MHz channel, a frame transmission or reception operation may be unable to be performed even if the actual channel is idle.

In addition, even in a case where an operation of exchanging a MU-RTS frame and a CTS frame is performed after a particular 20 MHz channel is emptied as shown in FIGS. 31A to 33D or FIGS. 33A to 33D, reception of a CTS frame for a transmitted MU-RTS frame may fail in the particular 20 MHz channel. Referring to FIG. 36B, as illustrated in FIG. 36A, AP1 and AP2 may belong to an AP MLD, STA1-1 and STA1-2 may belong to STA MLD1, and STA2-1 and STA2-2 may belong to STA MLD2. AP1 and AP2 may operate link1 and link2, respectively, and STA1-1 and STA1-2 may be incapable of an STR operation link1 and link2. AP1 may perform an operation of transmitting a downlink frame to multiple terminals including STA1-1 or multiple terminals including STA1-1. During the transmission of the frame, AP2 may complete a channel access operation for frame transmission in link2. AP2 may additionally perform an operation of exchange between a MU-RTS frame and a CTS frame in order to protect a downlink frame to be transmitted. A reception STA of the MU-RTS frame may be an STA receiving a downlink frame. For example, when AP2 is to transmit a downlink frame to STA1-2 and STA2-2, AP2 may transmit a MU-RTS frame to the corresponding terminals. AP2 may transmit the MU-RTS frame after emptying a particular 20 MHz band as shown in FIG. 16 or FIG. 18. STA1-2 and STA2-2 having received the MU-RTS frame may transmit a CTS frame as a response for the received MU-RTS frame. The CTS frame may be allowed to be transmitted only in a channel indicated by the MU-RTS frame to transmit the CTS frame as illustrated in FIG. 18. STA1-1 is receiving a frame in link1, and thus STA1-2 may be unable to transmit a CTS frame for the MU-RTS frame. STA2-2 may transmit a CTS frame as a response for a MU-RTS frame. If only STA1-2 is indicated to transmit the CTS frame for a particular 20 MHz channel, CTS transmission may have not been performed in the 20 MHz channel. AP2 having failed to receive a CTS frame as a response for a MU-RTS frame in the 20 MHz band may empty a corresponding 20 MHz channel even if the 20 MHz channel is actually idle, and then transmit a downlink frame. In a case where the channel in which reception of a CTS response for a MU-RTS frame has failed is a primary 20 MHz channel, even if a CTS frame for the MU-RTS frame is received through another channel, AP2 may not able to perform a downlink frame transmission or reception operation with STA1-2 and STA2-2. In addition, in a case where a CTS response for a MU-RTS frame is received in at least a primary 20 MHz channel, transmission of a downlink frame following CTS response reception may be performed.

Alternatively, even when some of STAs communicating with an AP temporarily change a primary channel, the CTS response for the MU-RTS frame may be unable to be transmitted. Referring to FIG. 36C, in a situation where the AP MLD transmits a frame to STA MLD1 and STA MLD2 as described above with reference to FIG. 36A, when before frame transmission of AP2 in link2, a primary channel of STA2-2 has temporarily moved to another channel rather than a primary channel of the AP, STA2-2 may transmit a CTS response for a received MU-RTS frame, based on the primary channel of STA2-2. For example, if transmission of a CTS frame using a 40 MHz bandwidth is indicated for a MU-RTS frame of FIG. 14 or FIG. 15, STA2-2 may transmit a CTS frame by using a primary 20 MHz of STA2-2 as a response for the MU-RTS frame received from AP2. STA1-2 may use the same primary channel as that of AP2. STA1-1 and STA1-2 are incapable of an STR operation and STA1-1 is receiving a frame in link1. Therefore, STA1-2 may be unable to transmit a CTS frame as a response for the received MU-RTS frame. If only STA1-2 is indicated to transmit the CTS frame for a particular 20 MHz channel, CTS transmission may have not been performed in the 20 MHz channel. In a case where the channel in which reception of a CTS response for a MU-RTS frame has failed is a primary 20 MHz channel, even if a CTS frame for the MU-RTS frame is received through another channel, AP2 may not able to perform a downlink frame transmission or reception operation with STA1-2 and STA2-2.

In the present disclosure, in a case where, while a downlink frame is transmitting to an STA belonging to the MLD incapable of an STR operation, a channel access in another link is completed and a frame is transmitted to another STA belonging to the MLD, the following downlink frame transmission operation may be performed.

Figure 37:
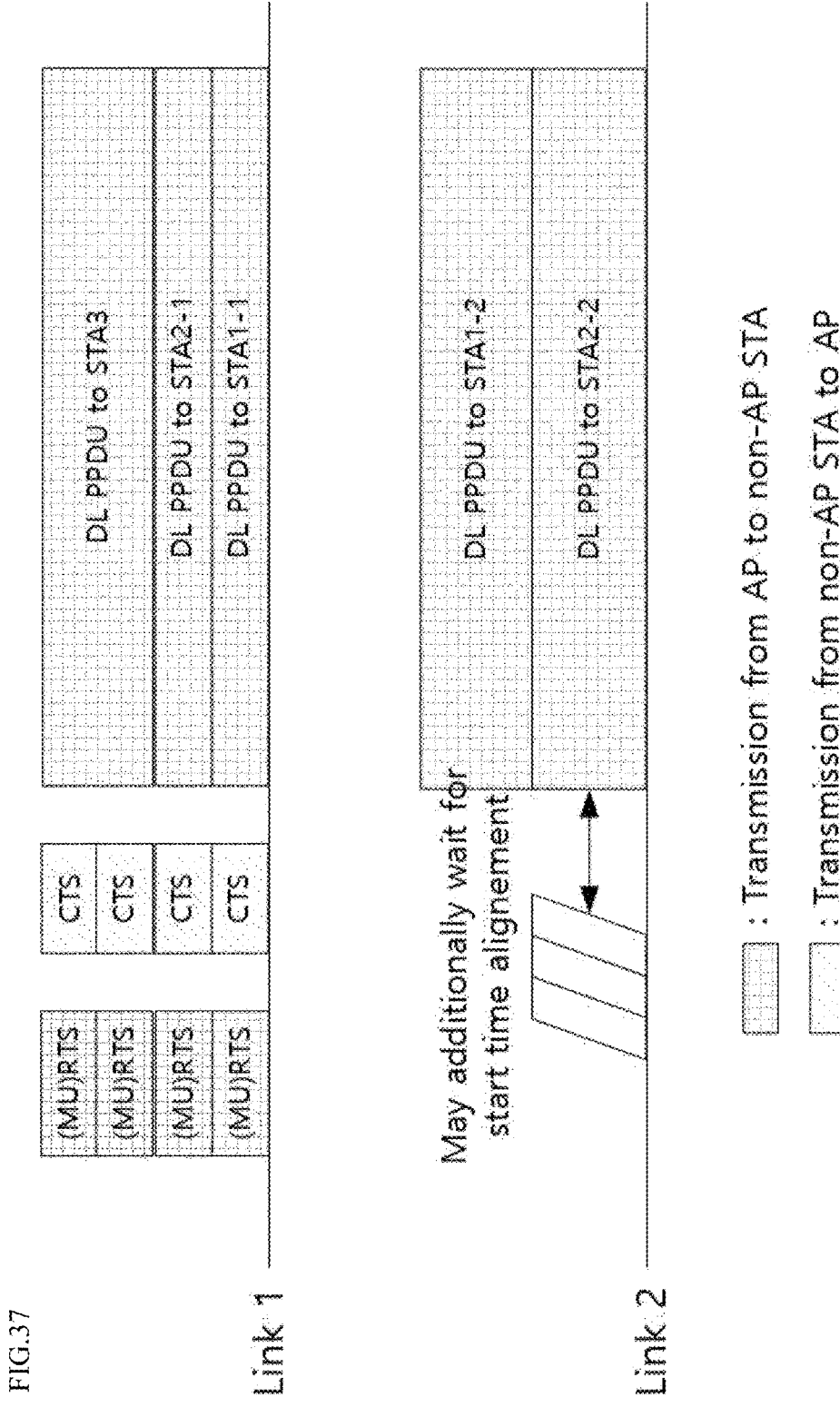
FIG. 37 shows a first embodiment of an operation in which an AP MLD imposes an additional condition to omit transmission of an MU-RTS frame according to an embodiment of the present disclosure.

FIG. 37 shows a first embodiment of an operation in which an AP MLD imposes an additional condition to omit transmission of an MU-RTS frame according to an embodiment of the present disclosure.

Referring to FIG. 37, in a case where, while a frame transmission process is being performed in one link, a channel access operation for frame transmission in another link is completed, when a downlink frame is transmitted, in the corresponding link, to terminals including a terminal incapable of a CTS response for transmission of a MU-RTS frame, the AP MLD may omit transmission of the MU-RTS frame. That is, even when the length of a PHY service data unit (PSDU) to be transmitted in the corresponding link exceeds a particular value (e.g., dot11RTSThreshold) and thus transmission of an RTS frame or a MU-RTS frame is required, a process of exchange between the MU-RTS frame and a CTS frame may be omitted. For example, AP1 and AP2 may belong to an AP MLD. AP1 may operate link1, and AP2 may operate link2. STA1-1 and STA1-2 may belong to STA MLD1. STA2-1 and STA2-2 may belong to STA MLD2. STA1-1, STA2-1, and STA3 may be connected to AP1, and STA1-2 and STA2-2 may be connected to AP2. STA1-1 and STA1-2 of STA MLD1 may be incapable of an STR operation link1 and link2. AP1 may transmit a downlink frame to STA1-1, STA2-1, and STA3 by using a multi-user OFDMA operation. Alternatively, AP1 may transmit a downlink frame to STA1-1. AP1 may additionally perform a procedure of exchange between an RTS frame or a MU-RTS frame and a CTS frame to protect the downlink frame. While AP1 is performing frame transmission or reception with STA1-1 or multiple terminals including STA1-1, AP2 may complete a channel contention process for frame transmission in link2. AP2 may be to transmit a downlink frame to multiple terminals including STA1-2. If one or more among reception STAs of the frame to be transmitted belong to a STA MLD incapable of a STR operation for link1, and a STA belonging to the MLD is receiving a frame in link1, AP2 may transmit a downlink frame without an operation of exchange between a MU-RTS frame and a CTS frame. In a case where the completion time point of the channel contention process is before the transmission end time point of a CTS frame in link1, even if a channel access operation in link2 is completed, AP2 may perform a channel sensing operation in link1 up to the start time point of a PPDU including a downlink frame, and then perform a frame transmission operation at the corresponding time point.

If the completion time point of the channel contention process in link2 occurs during the transmission time of a downlink frame in link1, the following operation may be performed according to the remaining transmission time of a PPDU including a downlink frame in link1.

Figure 38:
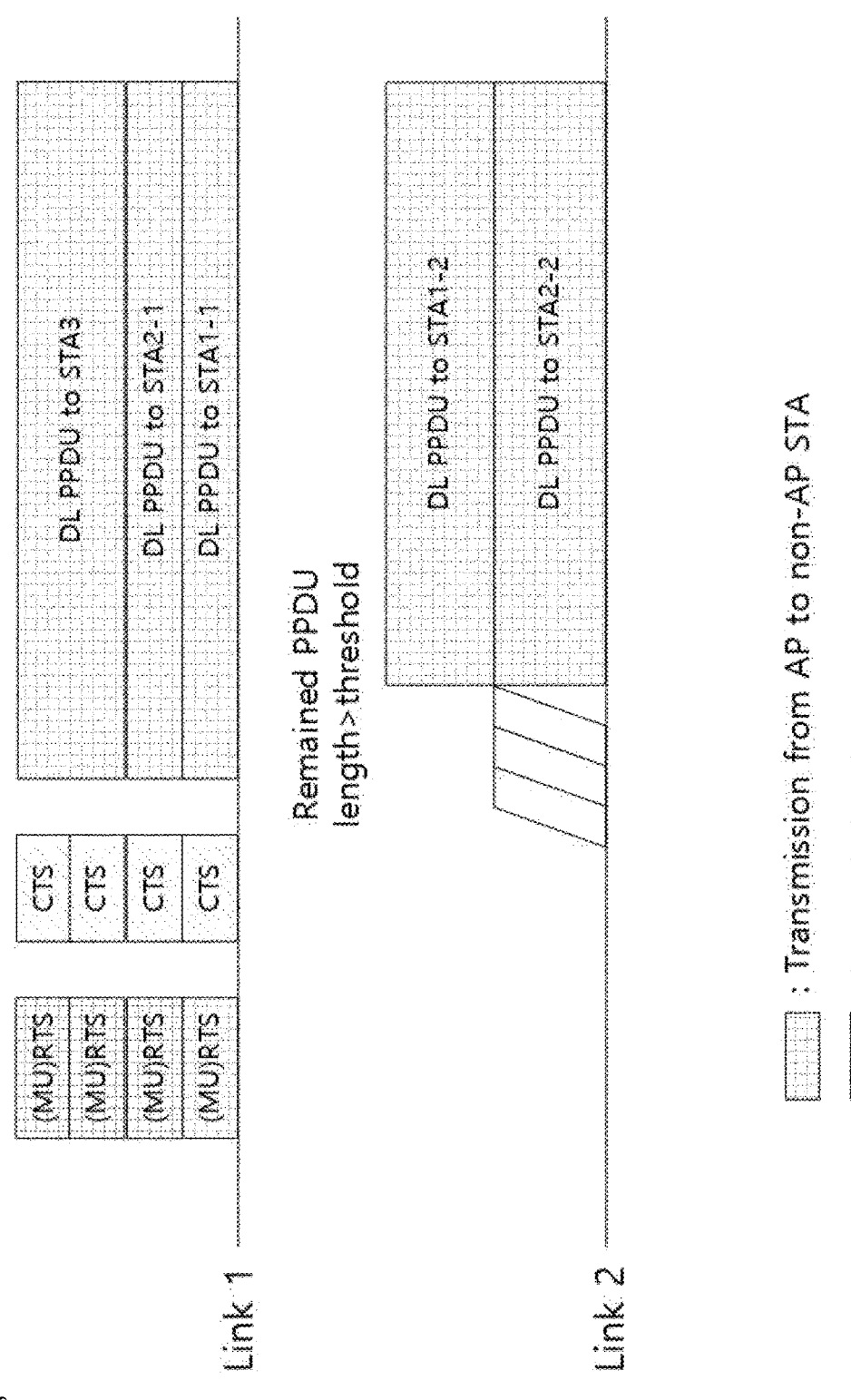
FIG. 38 shows a second embodiment of an operation in which an AP MLD imposes an additional condition to omit transmission of an MU-RTS frame according to an embodiment of the present disclosure.

FIG. 38 shows a second embodiment of an operation in which an AP MLD imposes an additional condition to omit transmission of an MU-RTS frame according to an embodiment of the present disclosure.

Referring to FIG. 38, in a case where, while an operation for frame transmission is being performed in one link, a channel access operation for frame transmission in another link is completed, when the corresponding link includes a terminal incapable of a CTS response for transmission of a MU-RTS frame, the AP MLD may omit transmission of the MU-RTS frame. If the completion time point of the channel access operation is during the transmission time of a PPDU including a downlink frame in the other link, an operation of transmitting a MU-RTS frame and a CTS frame may be omitted at a channel access completion time point in the corresponding link, and a downlink frame may be transmitted. That is, even when the length of a PHY service data unit (PSDU) to be transmitted in the corresponding link exceeds a particular value (e.g., dot11RTSThreshold) and thus transmission of an RTS frame or a MU-RTS frame is required, a process of exchange between the MU-RTS frame and a CTS frame may be omitted. For example, while AP1 belonging to the AP MLD is performing frame transmission or reception with STA1-1 or multiple terminals including STA1-1 as described above with reference to FIG. 22, AP2 may complete a channel contention process for frame transmission in link2. In addition, AP2 may have data to transmit to multiple STAs including STA1-2. AP2 may complete channel contention in link2 while AP1 is transmitting a PPDU including a downlink frame in link1, and identify the remaining transmission time of the PPDU transmitted in link1 at the corresponding completion time point. If the remaining transmission time of the PPDU transmitted in link1 is a particular time or longer, AP2 may omit a process of exchange between MU-RTS and CTS frames and transmit a downlink frame to the terminals including STA1-2. The particular time may be a value stored in an AP. Alternatively, the particular time may be exchanged during a negotiation process for a multi-link operation between the AP MLD and the STA MLD.

When the completion time point of the channel contention in link2 occurs during the transmission time of a downlink frame in link1, and the remaining transmission time of the PPDU transmitted in link1 is within the particular time, the AP may transmit a downlink frame as in FIG. 23, and allow the transmission end time point of a PPDU including the frame to match the PPDU transmission end time point in link1. Alternatively, the AP may perform a process of exchanging a MU-RTS frame and a CTS frame.

Figure 39:
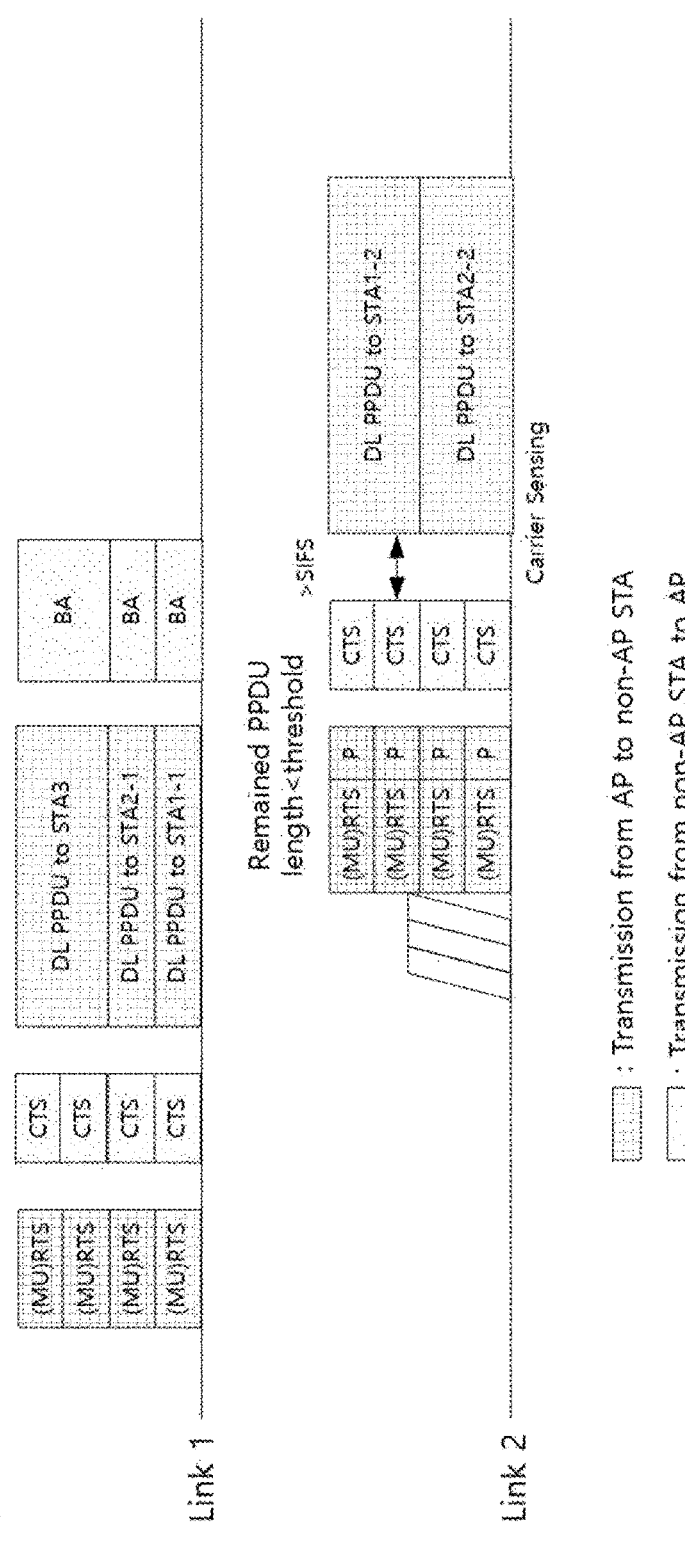
FIG. 39 shows an embodiment of an operation of transmitting an MU-RTS frame according to an additional condition imposed by an AP MLD according to an embodiment of the present disclosure.

FIG. 39 shows an embodiment of an operation of transmitting an MU-RTS frame according to an additional condition imposed by an AP MLD according to an embodiment of the present disclosure. A description overlapping with that for FIG. 37 and FIG. 38 may be omitted.

Referring to FIG. 39, when, while an AP MLD is transmitting a frame in one link, a channel access operation for frame transmission in another link is completed, and the time from the completion time point to the PPDU transmission end time point of the link already transmitting the frame is within a particular time, the AP MLD may perform an operation of transmitting a MU-RTS frame. For example, one AP (e.g., AP1) among APs belonging to the AP MLD may transmit a downlink frame. The downlink frame may be transmitted to multiple terminals. For example, AP1 may operate in link1, and transmit a downlink frame to STA1-1, STA2-1, and STA3. STA1-1 and STA1-2 belong to STA MLD1, and STA1-1 and STA1-2 may be incapable of an STR operation. Another AP (e.g., AP2) belonging to the same AP MLD of AP1 transmitting a downlink in link1 may complete a channel access operation for frame transmission. There may be multiple STAs for a frame which AP2 is to transmit, and one or more of them may be STAs receiving a frame in link2. For example, a downlink frame transmitted in link2 by AP2 may be transmitted to STA2-1 and STA2-2. In a case where the remaining time point of a PPDU including a frame transmitted in link1 at a time point at which AP2 has completed a channel access operation in link2 is within a particular time, if an operation of transmitting a MU-RTS frame is required according to the length of a PSDU to be transmitted, AP2 may transmit the MU-RTS frame. Alternatively, AP2 may perform a process of exchange between a MU-RTS frame and a CTS frame in order to protect a downlink frame to be transmitted. A padding bit may be added to the MU-RTS frame so that the transmission end time point thereof matches that of the downlink frame transmitted in link1. Alternatively, AP2 may additionally perform a channel sensing operation so that the transmission end time point of the MU-RTS frame matches the PPDU transmission end time point in link1.

Multiple STAs having received the MU-RTS frame may identify the MU-RTS frame, perform channel sensing for a channel indicated by the MU-RTS frame, and then transmit a CTS frame. The AP having received the CTS frame may transmit a downlink frame to the multiple STAs. If some STAs incapable of an STR operation in link1 are transmitting uplink response frames (e.g., BlockAck frames), downlink transmission may be suspended up to the transmission end time point of a PPDU including a response frame in the corresponding link (e.g., link1). A channel sensing operation may be performed for the suspended time to identify whether a corresponding channel is occupied by another terminal for the time.

When one or more terminals transmit a CTS frame as a response for a MU-RTS frame in a particular channel, the AP may determine that an operation of transmitting the MU-RTS frame has been successful. Therefore, the AP may induce, through the next operation, one or more STAs to transmit a CTS frame in channels of all 20 MHz bands in which a MU-RTS frame has been transmitted.

Figure 40:
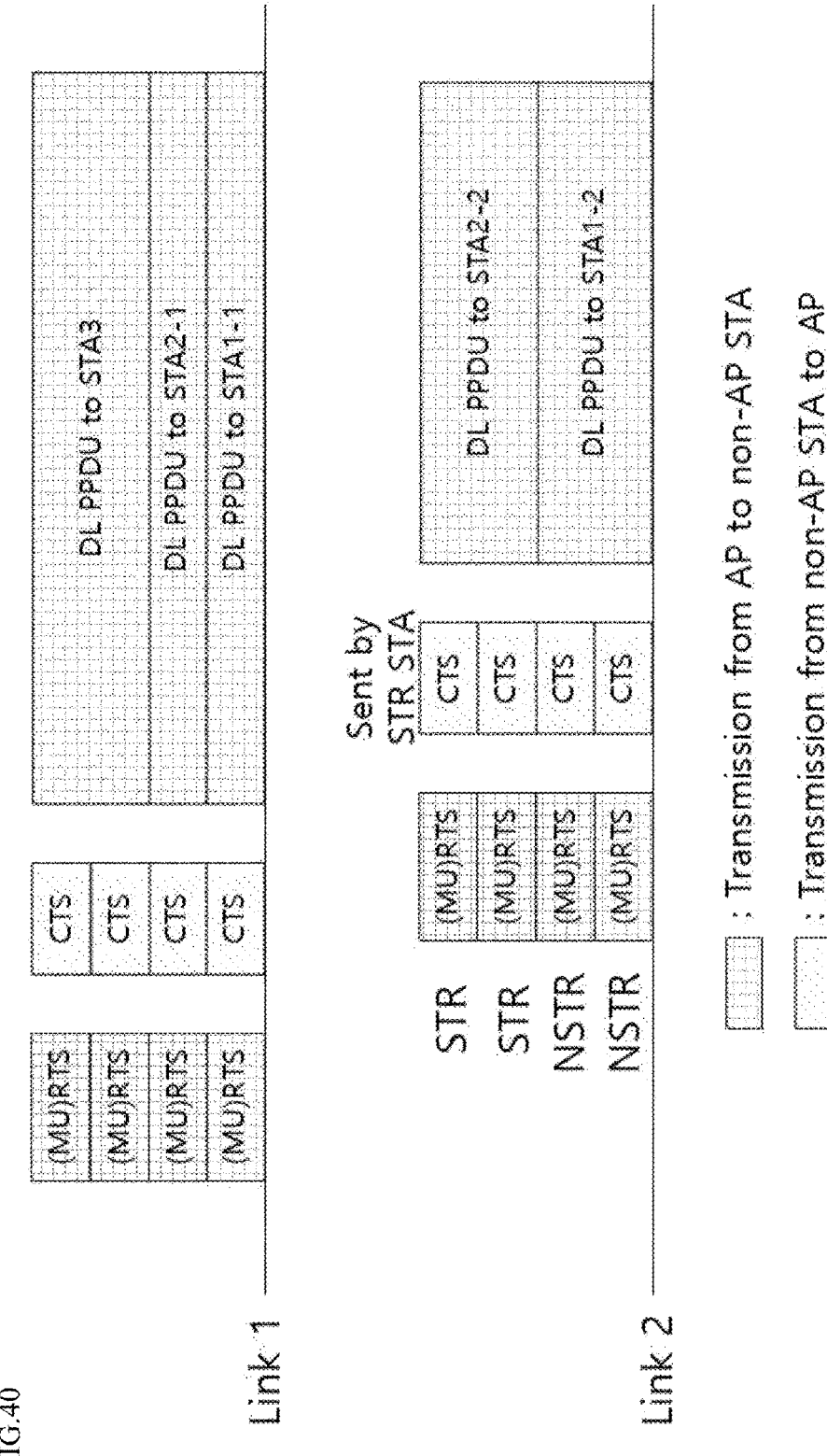
FIG. 40 shows a first embodiment of an operation of evading a situation in which a CTS frame is not transmitted at particular 20 MHz due to an operation of a corresponding STA MLD according to an embodiment of the present disclosure.

FIG. 40 shows a first embodiment of an operation of evading a situation in which a CTS frame is not transmitted at particular 20 MHz due to an operation of a corresponding STA MLD according to an embodiment of the present disclosure.

Referring to FIG. 40, in a case where an AP belonging to an AP MLD is to transmit a downlink frame to multiple terminals including an STA that is incapable of an STR operation and thus is unable to transmit a CTS frame, a channel may be indicated to the STA incapable of CTS transmission so that the STA transmits a CTS frame in a primary 20 MHz channel or some channels including a primary 20 MHz channel. Another STA may transmit a frame in an expansion channel. The other STA may be indicated to transmit a CTS frame in channels including a corresponding primary channel and an expansion channel. That is, another STA may be allowed to transmit a CTS frame in bands including a band used by the STA incapable of transmission of a CTS frame. For example, AP1 and AP2 may belong to the AP MLD. AP1 may operate link1, and AP2 may operate link2. A STA MLD or a STA not belong to a STA MLD may be connected to an AP in an AP MLD. For example, STA1-1 and STA1-2 included in STA MLD1 may be connected to AP1 and AP2, respectively. STA2-1 and STA2-2 included in STA MLD2 may be connected to AP1 and AP2, respectively. STA1-1 and STA1-2 belonging to STA MLD1 may be incapable of an STR operation. STA2-1 and STA2-2 belonging to STA MLD2 may be capable of an STR operation. In addition, STA3 may be additionally connected to AP1.

AP1 may complete a channel access operation in link1 and transmit a downlink frame. The downlink frame may be transmitted to STA1-1 or may be transmitted to multiple terminals including STA1-1. In order to protect a frame transmission operation in link1, AP1 may additionally perform a procedure of exchange between an RTS or MU-RTS frame and a CTS frame.

While AP1 is transmitting a downlink frame, AP2 may complete a channel access operation for transmitting a downlink. AP2 may have data to transmit to multiple STAs including STA1-2. AP2 may transmit a downlink frame to multiple terminals including STA1-2. When the length of a PSDU including the downlink frame is a particular length or longer, an operation of exchanging an RTS frame or MU-RTS frame and a CTS frame may be required. The AP may transmit the MU-RTS frame to multiple STAs. An STA (e.g., STA1-2) that is unable to transmit a CTS frame due to whether an STR operation is possible may be indicated to transmit a CTS frame in a primary 20 MHz channel or some channels including a primary channel. An STA capable of an STR operation or an STA not receiving a frame in link1 may be indicated to transmit a CTS frame in an expansion channel among channels in which a MU-RTS frame is transmitted. The STA capable of an STR operation may be an STA belonging to an STA MLD capable of an STR operation. Alternatively, the STA may be an STA belonging to an STA MLD not performing a frame reception operation in link1. Alternatively, the STA may be an STA not belonging to an STA MLD. Each STA may transmit the CTS frame according to the operation of FIG. 13 or FIG. 16. Therefore, even when STA1-2 is incapable of an STR operation and thus is unable to transmit a CTS frame, another STA transmits a CTS frame in multiple channels including a primary channel, whereby AP2 may receive a CTS frame for a transmitted MU-RTS frame. AP2 having received the CTS frame for the MU-RTS frame may determine that an operation of transmitting the MU-RTS frame has been successful. Accordingly, AP2 may transmit a downlink frame to multiple terminals.

In a case where an STR operation is impossible due to interference inside the device and thus some STAs are unable to transmit a CTS response for a received MU-RTS frame, another STA may be requested to transmit a CTS frame in all bands as below.

Figure 41:
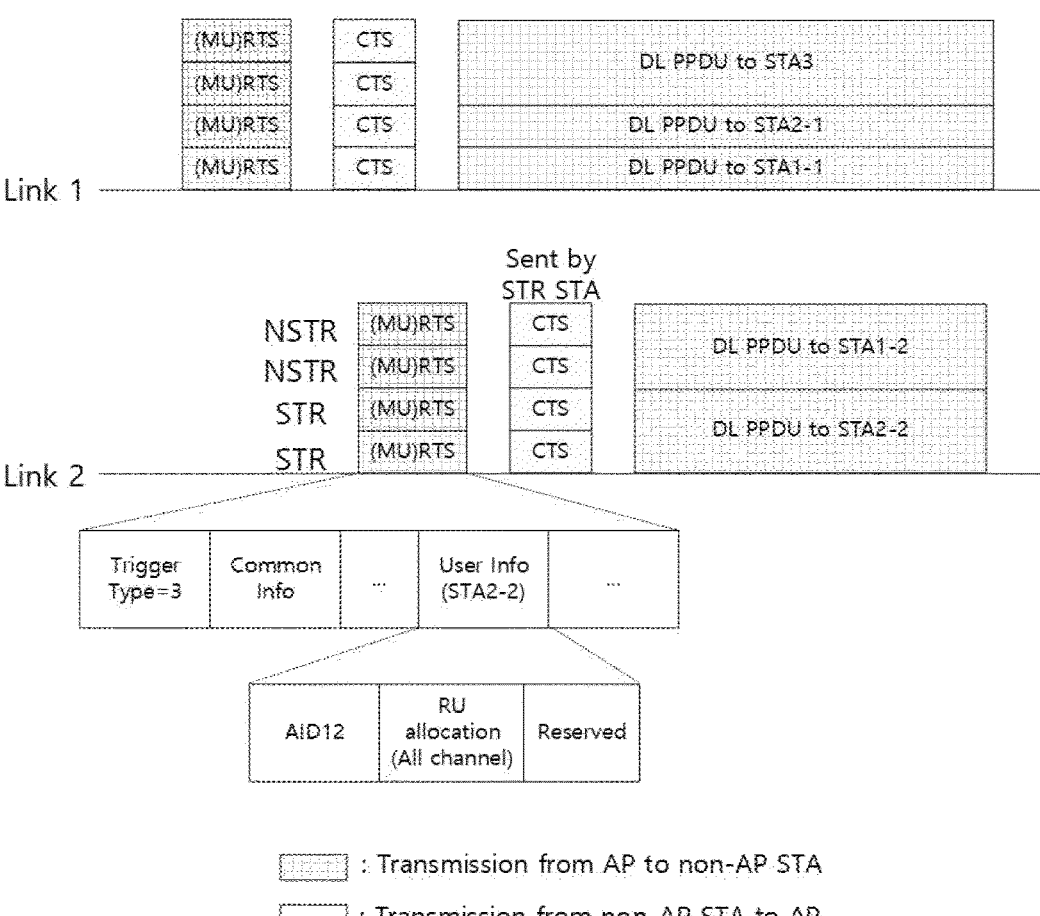
FIG. 41 shows a second embodiment of an operation of evading a situation in which a CTS frame is not transmitted at particular 20 MHz due to an operation of a corresponding STA MLD according to an embodiment of the present disclosure.

FIG. 41 shows a second embodiment of an operation of evading a situation in which a CTS frame is not transmitted at particular 20 MHz due to an operation of a corresponding STA MLD according to an embodiment of the present disclosure. A description overlapping with that of FIG. 40 may be omitted.

Referring to FIG. 41, in a case where an AP belonging to an AP MLD is to transmit a downlink frame to multiple terminals including an STA that is incapable of an STR operation and thus is unable to transmit a CTS frame, a STA capable of CTS transmission may be indicated to transmit a CTS frame in all bands. For example, STA MLD1, STA MLD2, and STA3 may be connected to an AP MLD as illustrated in FIG. 25. AP1 may complete a channel access operation in link1 and transmit a downlink frame to multiple terminals including STA1-1. In order to protect a frame transmission operation in link1, AP1 may additionally perform a procedure of exchange between an RTS or MU-RTS frame and a CTS frame.

While AP1 is transmitting a downlink frame, AP2 may complete a channel access operation for transmitting a downlink. AP2 may have data to transmit to multiple STAs including STA1-2. AP2 may transmit a downlink frame to multiple terminals including STA1-2. When the length of a PSDU including the downlink frame is a particular length or longer, an operation of exchanging an RTS frame or MU-RTS frame and a CTS frame may be required. The AP may transmit the MU-RTS frame to multiple STAs. A terminal incapable of an STR operation may be unable to transmit a CTS frame as a response for the MU-RTS frame. In a case where the some terminals are unable to transmit a CTS frame and thus it is determined that a CTS frame is not to be transmitted in a particular 20 MHz channel, AP2 may request another STA capable of transmission of a CTS frame to transmit a CTS frame in channels including the corresponding channel. The other STA may be an STA belonging to an STA MLD capable of an STR operation. Alternatively, the STA may be an STA belonging to an STA MLD not performing a frame reception operation in link1. Alternatively, the STA may be an STA not belonging to an STA MLD. For example, AP2 may transmit a downlink frame to STA2-2 only in a primary 40 MHz channel. AP2 may transmit a downlink frame to STA1-2 in a secondary 40 MHz channel. STA1-1 is receiving a frame in STA, and thus STA1-2 may be unable to transmit a CTS frame as a response for MU-RTS. AP2 may request, through a MU-RTS frame, STA2-2 to transmit a CTS response by using all bands. STA2-2 having received the MU-RTS frame may transmit a CTS frame through all bands through which the MU-RTS frame has been received. Accordingly, AP2 may receive a CTS frame for a transmitted MU-RTS frame. AP2 having received the CTS frame for the MU-RTS frame may determine that an operation of transmitting the MU-RTS frame has been successful. Accordingly, AP2 may transmit a downlink frame to multiple terminals.

In a case where the STA MLD incapable of an STR operation is incapable of an STR operation only for some channels, the AP MLD may perform an operation of identifying whether a channel of each STA is empty, instead of an operation of exchanging an RTS or MU-RTS frame and CTS. The corresponding operation may be performed through a process in which an AP transmits a bandwidth query report poll (BQRP) frame to multiple STAs and the multiple STAs transmits a bandwidth query report (BQR) frame. A channel in which each STA transmits a BQR frame may be different from a channel in which downlink data is transmitted. A process of identifying whether a channel is empty through an operation of transmitting a BQR frame may be performed as follows.

FIG. 42 shows a third embodiment of an operation of evading a situation in which a CTS frame is not transmitted at particular 20 MHz due to an operation of a corresponding STA MLD according to an embodiment of the present disclosure. A description overlapping with those of FIG. 40 and FIG. 41 may be omitted.

Referring to FIG. 42, in a case where an AP belonging to an AP MLD is to transmit a downlink frame to multiple terminals including an STA that is incapable of an STR operation and thus is unable to transmit a CTS frame, each STA may be requested to identify whether a corresponding 20 MHz is occupied, instead of performing a channel reservation process through a MU-RTS frame and a CTS frame. A channel state identified by the multiple STAs may be transmitted through a BQR frame. A frame requesting the BQR transmission may be a BQRP frame. For example, STA MLD1, STA MLD2, and STA3 may be connected to an AP MLD as illustrated in FIG. 25. AP1 may complete a channel access operation in link1 and transmit a downlink frame to multiple terminals including STA1-1. In order to protect a frame transmission operation in link1, AP1 may additionally perform a procedure of exchange between an RTS or MU-RTS frame and a CTS frame.

While AP1 is transmitting a downlink frame, AP2 may complete a channel access operation for transmitting a downlink. AP2 may have data to transmit to multiple STAs including STA1-2. AP2 may transmit a downlink frame to multiple terminals including STA1-2. When the length of a PSDU including the downlink frame is a particular length or longer, an operation of exchanging an RTS frame or MU-RTS frame and a CTS frame may be required. In a case where STA1-2 and STA1-1 are capable of an STR operation in a particular channel, AP2 may identify whether a channel is occupied for multiple STAs receiving a downlink frame, rather than performing a channel protection operation using transmission of a MU-RTS frame. The operation of identifying a channel situation for the multiple STAs may be performed by AP2 transmitting, to the multiple STAs, a request frame that requests to identify whether a corresponding 20 MHz channel is occupied. The request frame may be a frame requesting the multiple STAs to identify a channel situation. The request frame may be a bandwidth query report poll (BQRP) frame. The BQRP frame may be a frame requesting the multiple STAs to transmit BQR. A channel in which each STA is required to transmit BQR may be indicated. In a case where STA1-2 is able to transmit a frame in some channels, AP2 may designate, as a corresponding channel, a channel in which STA1-2 transmits a BQR frame.

The multiple STAs having received a BQRP frame from AP2 may identify transmission of a BQR frame being requested, through BQRP. Accordingly, the multiple STAs may perform channel sensing for all bands in which a corresponding STA is operable. Through this sensing, whether a corresponding 20 MHz channel is occupied may be identified. Each STA having identified whether a corresponding 20 MHz channel is occupied may transmit a BQR frame through a channel indicated in the BQRP frame. A PPDU in which the BQR frame is transmitted may be transmitted a type of a HE TB PPDU or EHT TB PPDU.

AP2 having received a BQR frame from the multiple STAs may identify whether a channel is occupied, for all bands in each STA. AP2 may transmit a downlink frame through a channel indicated as being empty in the BQR frame. A channel in which AP2 receives BQR from each STA and a channel in which AP2 transmits a downlink frame to a correspond STA may be different form each other.

In a case where an STR operation is impossible due to interference inside the device and thus a CTR frame for a MU-RTS frame transmitted by an AP is unable to be received in some channels rather than a primary channel as illustrated in FIG. 21, the AP may receive a CTS frame in some channels, then expand the channels, and transmit a frame as follows.

FIG. 43 shows a first embodiment of an operation of continuing frame transmission even when a CTS frame fails to be received for an MU-RTS frame in a particular 20 MHz channel according to an embodiment of the present disclosure. A description overlapping with that of FIG. 40 may be omitted.

Referring to FIG. 43, in a case where an AP belonging to an AP MLD is to transmit a downlink frame to multiple terminals including an STA that is incapable of an STR operation and thus is unable to transmit a CTS frame, a STA capable of CTS transmission may be indicated to transmit a CTS frame in all bands. For example, STA MLD1, STA MLD2, and STA3 may be connected to an AP MLD as illustrated in FIG. 25. AP1 may complete a channel access operation in link1 and transmit a downlink frame to multiple terminals including STA1-1. In order to protect a frame transmission operation in link1, AP1 may additionally perform a procedure of exchange between an RTS or MU-RTS frame and a CTS frame.

While AP1 is transmitting a downlink frame, AP2 may complete a channel access operation for transmitting a downlink. AP2 may have data to transmit to multiple STAs including STA1-2. AP2 may transmit a downlink frame to multiple terminals including STA1-2. When the length of a PSDU including the downlink frame is a particular length or longer, an operation of exchanging an RTS frame or MU-RTS frame and a CTS frame may be required. AP2 may transmit a MU-RTS frame to multiple STAs including STA1-2. A STA capable of transmission of a CTS frame among STAs having received the MU-RTS frame may perform carrier sensing for a channel indicated by the MU-RTS frame, and then transmit a CTS frame. A STA (e.g., STA1-2) incapable of an STR operation and thus incapable of transmission of a CTS frame for the MU-RTS frame may be unable to transmit a CTS frame as a response for the MU-RTS frame. STA1-2 is unable to transmit a CTS frame due to a situation where an STR operation is impossible, so that a CTS frame for transmitted MU-RTS may be unable to be transmitted in a particular 20 MHz channel. AP2 may transmit the MU-RTS frame to STAs including STA1-2, and then recognize that a CTS frame may not be transmitted in a particular 20 MHz channel due to the characteristic of STA1-2 incapable of an STR operation. In this case, even if a CTS frame is not received in the 20 MHz band, when a CTS frame is received in another band, a downlink frame may be transmitted using even the 20 MHz band. For example, in a case where STA2-2 is indicated to transmit a CTS frame for the MU-RTS frame in a primary 40 MHz channel and STA1-2 is indicated to transmit a CTS frame in a primary 80 MHz channel, even when a CTS frame fails to be received in a secondary 40 MHz channel, AP2 may transmit a downlink frame to STA1-2 and STA2-2 by using a 80 MHz channel. AP2 may additionally perform a channel sensing operation for a particular time for a channel in which a CTS frame has failed to be received. Only an energy detection (ED) operation of identifying a reception energy level may be included in the channel sensing operation. A reference energy level used to determine a channel being occupied in the ED operation may be configured to be lower than an energy level used to determine whether a channel is occupied in a wireless LAN operation. For example, the reference energy level used to determine whether a channel is occupied in the ED operation may be configured to be −82 dBm. The particular time may be a time after the transmission end time point of the MU-RTS frame before transmission of a downlink frame. Alternatively, the particular time may be a particular IFS time (e.g., SIFS, PIFS, or AIFS).

AP2 may recognize that reception of a CTS frame may fail even when a MU-RTS frame is transmitted due to the characteristic of disabled STR of some of reception STAs of a downlink frame. AP2 may omit a process of transmitting a MU-RTS frame for a band in which a frame is transmitted to a corresponding STA, and perform a procedure of exchange a MU-RTS frame and a CTS frame only for a different band.

FIG. 44 shows a second embodiment of an operation of continuing frame transmission even when a CTS frame fails to be received for an MU-RTS frame in a particular 20 MHz channel according to an embodiment of the present disclosure. A description overlapping with those of FIG. 40 and FIG. 43 may be omitted.

Referring to FIG. 44, in a case where an AP belonging to an AP MLD is to transmit a downlink frame to multiple terminals including an STA that is incapable of an STR operation and thus is unable to transmit a CTS frame, a STA capable of CTS transmission may be indicated to transmit a CTS frame in all bands. For example, STA MLD1, STA MLD2, and STA3 may be connected to an AP MLD as illustrated in FIG. 25. AP1 may complete a channel access operation in link1 and transmit a downlink frame to multiple terminals including STA1-1. In order to protect a frame transmission operation in link1, AP1 may additionally perform a procedure of exchange between an RTS or MU-RTS frame and a CTS frame.

While AP1 is transmitting a downlink frame, AP2 may complete a channel access operation for transmitting a downlink. AP2 may have data to transmit to multiple STAs including STA1-2. AP2 may transmit a downlink frame to multiple terminals including STA1-2. When the length of a PSDU including the downlink frame is a particular length or longer, an operation of exchanging an RTS frame or MU-RTS frame and a CTS frame may be required. AP2 may recognize that even if AP2 transmits the MU-RTS frame to STAs including STA1-2, a CTS frame may not be transmitted in a particular 20 MHz channel due to STA1-2 incapable of an STR operation. In this case, AP2 may empty a channel in which it is recognized that a CTS frame is unable to be transmitted, and perform a channel reservation process using exchange between a MU-RTS frame and a CTS frame only for a different channel. For example, in a case where AP2 is to transmit a downlink frame to STA2-2 in a primary 40 MHz channel and transmit a downlink frame to STA1-2 by using a secondary 80 MHz, AP2 may transmit a MU-RTS frame for the primary 40 MHz to receive a CTS frame. After receiving a CTS frame in the primary 40 MHz channel, AP2 may expand the use channel to the primary 80 MHz channel and transmit a frame to STA1-2 and STA2-2. AP2 may perform a channel sensing operation for a particular time for a secondary 40 MHz channel. Only an energy detection (ED) operation of identifying a reception energy level may be included in the channel sensing operation. A reference energy level used to determine a channel being occupied in the ED operation may be configured to be lower than an energy level used to determine whether a channel is occupied in a wireless LAN operation. For example, the reference energy level used to determine whether a channel is occupied in the ED operation may be configured to be −82 dBm. The particular time may be a time after the transmission end time point of the MU-RTS frame before transmission of a downlink frame. Alternatively, the particular time may be a particular IFS time (e.g., SIFS, PIFS, or AIFS).

Figure 45:
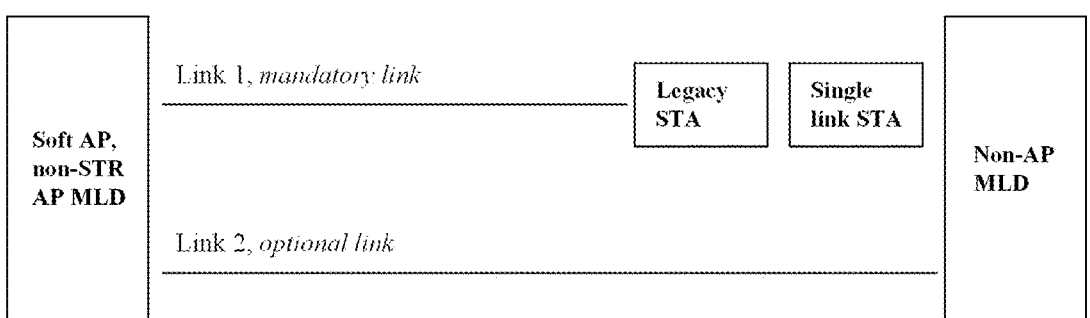
FIG. 45 shows an operation of a soft AP according to an embodiment of the present disclosure.

FIG. 45 shows an operation of a soft AP according to an embodiment of the present disclosure.

The soft AP may be an AP station. In addition, the soft AP may be an AP included in a multi-link device. The soft AP may be included in a non-STR multi-link device. When the soft AP is included in a non-STR multi-link device, this multi-link device may be called a non-STR soft AP multi-link device.

When a non-STR soft AP multi-link device operates in multiple links, the multiple links may be classified as a mandatory link and an optional link. Specifically, the multiple links may include at least one mandatory link. An operation of a non-STR soft AP multi-link device with a legacy station or a single-link station may be restricted to be performed only in a mandatory link. Specifically, connection (association) and authentication of a non-STR soft AP multi-link device with a legacy station or a single-link station may be restricted to be performed in a mandatory link. The single-link station may be a station incapable of operating in multiple links.

The mandatory link and the optional link of a non-STR soft AP multi-link device may be designated by the non-STR soft AP multi-link device. Specifically, when a multi-link is set up between a non-STR soft AP multi-link device and a non-AP multi-link device, a mandatory link and an optional link may be configured. For example, if a mandatory link is designated among multiple links, the links other than the mandatory link may be optional links.

According to a detailed embodiment, multiple links may be designated as mandatory links. The multiple links designated as mandatory links may be links in which STR is possible. For example, if multiple links in which a non-STR soft AP multi-link device operates include a first link and a second link and the non-STR soft AP multi-link device performs transmission in a first link, same may perform reception in a second link. The first link and the second link may be mandatory links. The mandatory links are restricted to be identically configured for multiple devices communicating with the non-STR soft AP multi-link device. Specifically, it may be not allowed that different mandatory links are configured for multiple devices communicating with the non-STR soft AP multi-link device.

In addition, the optional link of the non-STR soft AP multi-link device may be used only for communication between the non-STR soft AP multi-link device and a multi-link device. The optional link may not be used for communication between the non-STR soft AP multi-link device and a legacy station or a single-link station. In addition, association and authentication of the non-STR soft AP multi-link device with a multi-link device may be performed in a mandatory link.

In an embodiment of FIG. 45, a non-STR soft AP multi-link device (soft AP or non-STR AP MLD) operates a first link (link1) and a second link (link2). The first link (link1) is a mandatory link and the second link (link2) is an optional link. The non-STR soft AP multi-link device (soft AP or non-STR AP MLD) communicates with a non-AP multi-link device (non-AP MLD) through the second link (link2). Specifically, the non-STR soft AP multi-link device (soft AP or non-STR AP MLD) may perform association and authentication with the non-AP multi-link device (non-AP MLD) through the second link (link2). The non-STR soft AP multi-link device (soft AP or non-STR AP MLD) communicates with a legacy station (legacy STA) and a single-link station (single link STA) through the first link (link1). The non-STR soft AP multi-link device (soft AP or non-STR AP MLD) performs association and authentication with the legacy station (legacy STA) and the single-link station (single link STA) through the first link (link1).

A channel access method for a mandatory link and a channel access method for an optional link may be different from each other. This will be further explained with reference to FIG. 45 to FIG. 47.

Figure 46:
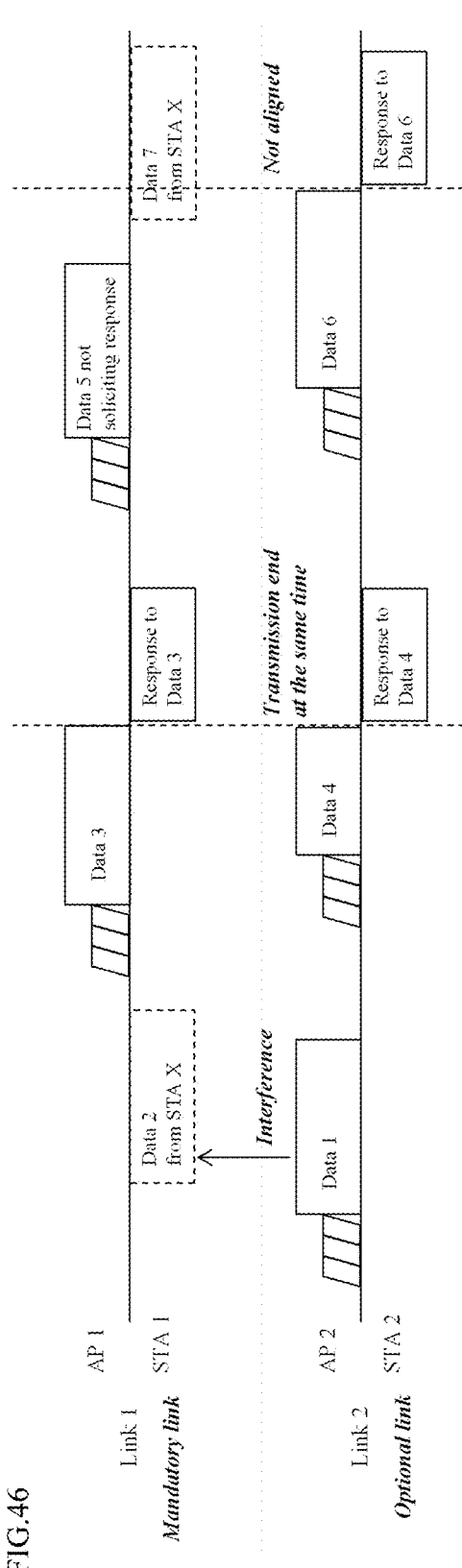
FIG. 46 shows a non-STR soft AP multi-link device transmitting a PPDU in a mandatory link and an optional link according to an embodiment of the present disclosure.

FIG. 46 shows a non-STR soft AP multi-link device transmitting a PPDU in a mandatory link and an optional link according to an embodiment of the present disclosure.

In a case where a channel access is independently performed in a mandatory link and an optional link described above, when a non-STR soft AP multi-link device performs transmission in the optional link, same may be unable to perform reception in the mandatory link. In order to prevent this problem, whether transmission is performed in an optional link may be determined according to whether transmission proceeds in a mandatory link. A non-STR soft AP multi-link device may determine whether to perform transmission in an optional link, based on whether transmission is performed in a mandatory link. Specifically, when the non-STR soft AP multi-link device performs transmission, the non-STR soft AP multi-link device may necessarily perform transmission in a mandatory link. In addition, a non-AP multi-link device connected to the non-STR soft AP multi-link device may determine whether to perform transmission in an optional link, based on whether transmission is performed in a mandatory link. Specifically, when the non-AP multi-link device connected to the non-STR soft AP multi-link device performs transmission, the non-AP multi-link device may necessarily perform transmission in a mandatory link.

Therefore, the non-STR soft AP multi-link device may perform transmission in an optional link only when transmission is performed in a mandatory link. When the non-STR soft AP multi-link device does not perform transmission in a mandatory link, the non-STR soft AP multi-link device may not be allowed to perform transmission in an optional link.

When random backoff-based channel access is performed, the following embodiments may be applied. In a case where, even if a backoff counter reaches 0 in an optional link, a backoff counter fails to reach 0 in a mandatory link, a non-STR soft AP multi-link device may not perform transmission in the optional link. Specifically, the non-STR soft AP multi-link device may wait until the backoff counter reaches 0 in a mandatory link. In a case where, when a backoff counter reaches 0 in an optional link, a backoff counter reaches 0 in a mandatory link or transmission is being performed in the mandatory link, the non-STR soft AP multi-link device may start transmission in the optional link.

In a case where channel access is performed according to a result of channel sensing for a time interval having a fixed length, the following embodiments may be applied. Even in a case where a non-STR soft AP multi-link device detects a channel of an optional link being idle for a pre-designated time interval, when transmission in a mandatory link has not been performed, start of transmission in the optional link may not be allowed. The pre-designated time interval may be a PIFS. In another specific embodiment, only when a non-STR soft AP multi-link device performs transmission in a mandatory link, the non-STR soft AP multi-link device may perform channel sensing in an optional link for a pre-designated time interval to perform a channel access.

The non-STR soft AP multi-link device may align the end of a PPDU transmitted in a mandatory link with the end of a PPDU transmitted in an optional link. Simultaneous terminating of transmission of multiple PPDUs may be called aligning the ends of PPDUs. In addition, when the difference between the transmission end time points of multiple PPDUs is smaller than a threshold or is equal to or smaller than the threshold, the ends of the multiple PPDUs may be considered to be aligned. The threshold may be a pre-designated value. Specifically, the threshold may be a value configured based on an SIFS. In addition, the threshold may be a value configured based on a SIFS and a signal extension length. For example, the threshold may be a value obtained by dividing, by 2, the sum of a SIFS and a signal expansion length. The threshold may be 8 us. Only when a PPDU transmitted in one link among a mandatory link and an optional link does not include a frame inducing instant response, the non-STR soft AP multi-link device may be allowed not to align the end of the PPDU. Specifically, the non-STR soft AP multi-link device may align the end of a PPDU including a frame inducing immediate response with the end of a PPDU not including a frame inducing instant response, or configure the end of a PPDU not including a frame inducing instant response to be earlier than the end of a PPDU including a frame inducing instant response. For example, not aligning the ends of PPDUs may imply that the end of a PPDU not including a frame inducing response coincides with each other or is earlier than the end of a PPDU including a frame inducing instant response.

In an embodiment of FIG. 46, a non-STR soft AP multi-link device includes a first AP (AP1) and a second AP (AP2). The first AP (AP1) and the second AP (AP2) operate in a first link (link1) that is a mandatory link and a second link (link2) that is an optional link, respectively. The first AP (AP1) and the second AP (AP2) are combined with a first station (STA1) and a second station (STA2) included in a non-STR multi-link device, respectively. When the second AP (AP2) transmits data (data1) to the second station (STA2), if the first station (STA1) transmits data (data2) to the first AP (AP1), the first AP (AP1), the first AP (AP1) may be unable to receive data (data2).

As in an embodiment described above, when the first AP (AP1) and the second AP (AP2) simultaneously transmit PPDUs, the ends of the PPDUs of the first AP (AP1) and the second AP (AP2) are aligned. When the first AP (AP1) transmits a PPDU including data (data3) and the second AP (AP2) transmits a PPDU including data (data4), the first AP (AP1) and the second AP (AP2) may align the ends of the PPDUs. In addition, when a PPDU transmitted in one link does not include a frame inducing instant response, the first AP (AP1) and the second AP (AP2) may be allowed not to align the end of the PPDU. Data (data 5) transmitted by the first AP (AP1) does not induce instant response, and thus the first AP (AP1) may stop PPDU transmission earlier than a PPDU transmitted by the second AP (AP2).

The embodiments related to a channel access operation of a non-STR soft AP multi-link device described above may be applied to a non-AP multi-link device connected to the non-STR soft AP multi-link device in the same way.

When an exception where PPDU ends are not aligned is allowed in the embodiments described above, a non-STR soft AP multi-link device is required to receive data in a link while transmitting a PPDU in another link. For example, as illustrated in FIG. 45, while the second AP (AP2) is transmitting a PPDU including data (data 6), the first AP (AP 1) may receive a PPDU including data (data 7) from the first station. Due to the transmission of the PPDU including data (data 6), the first AP (AP1) may be unable to receive the PPDU including data (data 7). Therefore, a method in which PPDU reception in one link is not interfered with may be required.

Figure 47:
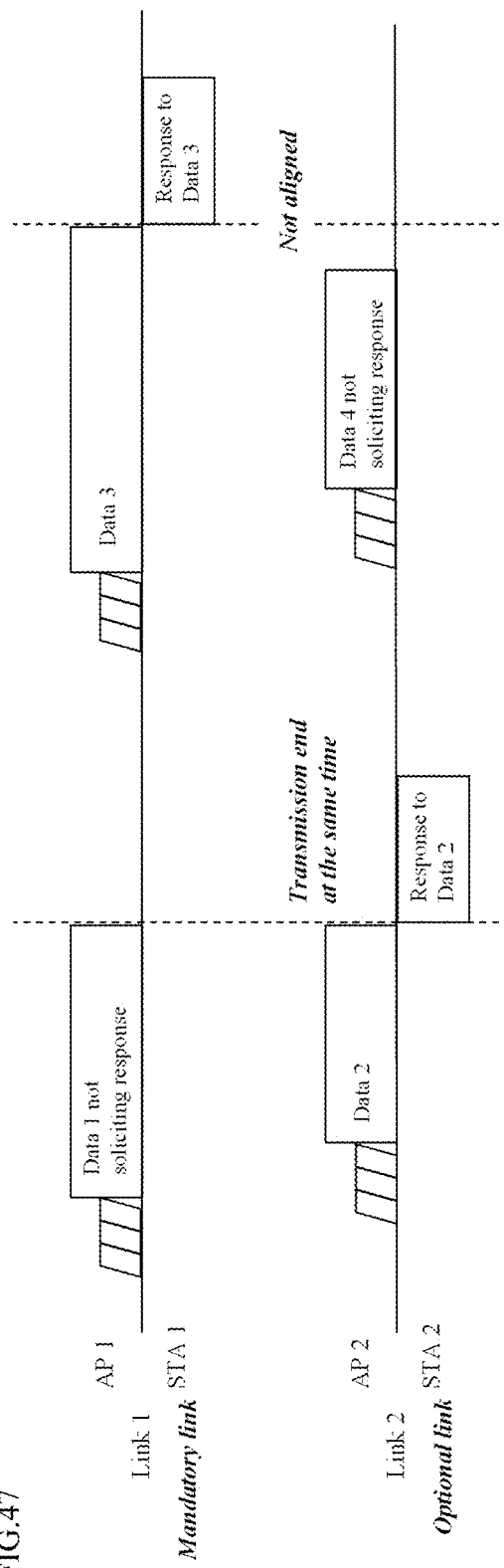
FIG. 47 shows a non-STR soft AP multi-link device transmitting a PPDU in a mandatory link and an optional link according to an embodiment of the present disclosure.

FIG. 47 shows a non-STR soft AP multi-link device transmitting a PPDU in a mandatory link and an optional link according to an embodiment of the present disclosure.

A non-STR soft AP multi-link device may determine whether to align the end of a PPDU including a frame inducing instant response, based on whether the PPDU is transmitted in a mandatory link or an optional link. Specifically, when the non-STR soft AP multi-link device transmits a PPDU including a frame inducing instant response in an optional link, the non-STR soft AP multi-link device may be required to align a PPDU transmitted in a mandatory link and the end of the PPDU transmitted in the optional link. That is, when the non-STR soft AP multi-link device transmits a PPDU not including a frame inducing instant response in an optional link, the non-STR soft AP multi-link device may be allowed not to align a PPDU transmitted in a mandatory link and the end of the PPDU transmitted in the optional link.

In an embodiment of FIG. 47, a non-STR soft AP multi-link device includes a first AP (AP1) and a second AP (AP2). The first AP (AP1) and the second AP (AP2) operate in a first link (link1) that is a mandatory link and a second link (link2) that is an optional link, respectively. The first AP (AP1) and the second AP (AP2) are combined with a first station (STA1) and a second station (STA2) included in a non-STR multi-link device, respectively. When the second AP (AP2) transmits data (data1) to the second station (STA2), if the first station (STA1) transmits data (data2) to the first AP (AP1), the first AP (AP1), the first AP (AP1) may be unable to receive data (data2). As in an embodiment as described above, while the first AP (AP1) is transmitting a PPDU including data (data1) not inducing instant response in a mandatory link, when the second AP (AP2) transmits a PPDU including data (data2) inducing instant response, the first AP (AP1) and the second AP (AP2) may align the ends of the PPDUs. If the second AP (AP2) transmits a PPDU not including data (data4) inducing instant response, the first AP (AP1) and the second AP (AP2) do not align the ends of the PPDUs. Specifically, the second AP (AP2) may terminate transmission of the PPDU before the transmission of the PPDU by the first AP (AP1) ends.

In the embodiments described above, an operation of a non-STR soft AP multi-link device may be the same as an operation of a non-AP multi-link device.

Even if a multi-link device sets up multiple links, the multi-link device may be unable to support simultaneous transmission or simultaneous reception in the multiple links. This type of multi-link device may perform transmission or reception in multiple links on a condition of transmitting or receiving a limited type of frame or PPDU. The limited type of frame or PPDU may indicate limiting a frame type or an MCS used for transmission, the number of special streams used for transmission, and a frequency bandwidth used for transmission. An operation of this type of multi-link device may be called an improved multi-link operation. In an improved multi-link operation, a multi-link device may focus a processing or transmission capability used in one or more links, on one or more other links. A non-STR soft AP multi-link device may not perform an improved multi-link device operation. Specifically, an improved multi-link device operation may not be allowed in multiple links configured by a non-STR soft AP multi-link device. For example, a non-STR soft AP multi-link device may not configure an improved multi-link device operation of a multi-link device operating in multiple links configured by the non-STR soft AP multi-link device. Specifically, a non-STR soft AP multi-link device may perform signaling wherein the same device rejects or does not support an improved multi-link operation. This is because, in an improved multi-link operation, transmission is impossible in a mandatory link when transmission is performed in an optional link.

Figure 48:
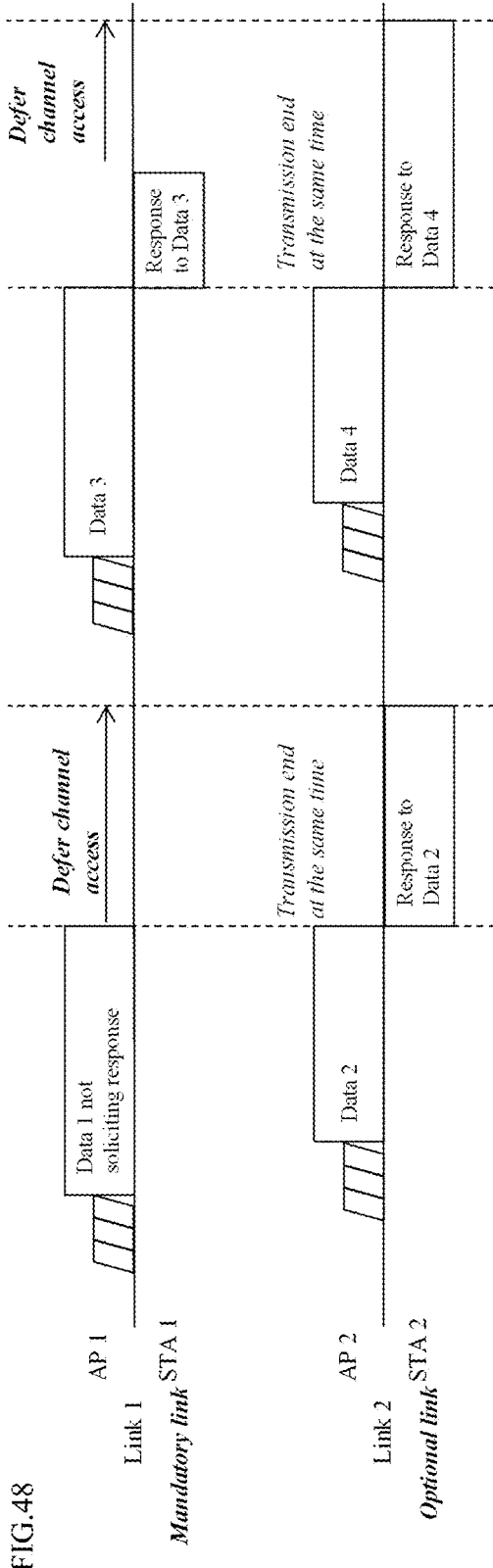
FIG. 48 shows a non-STR soft AP multi-link device performing channel access in a mandatory link and an optional link according to an embodiment of the present disclosure.

FIG. 48 shows a non-STR soft AP multi-link device performing channel access in a mandatory link and an optional link according to an embodiment of the present disclosure.

While a non-STR soft AP multi-link device is performing reception in an optional link, the non-STR soft AP multi-link device may delay channel access in a mandatory link. This is because, while the non-STR soft AP multi-link device is performing reception in an optional link, when the non-STR soft AP multi-link device performs transmission in a mandatory link, the reception in the optional link may be interfered with. Channel access defer may indicate not performing channel access for a defer duration. In addition, channel access defer may indicate not starting transmission even if a backoff counter has reached 0. In addition, a non-STR soft AP multi-link device may defer channel access even before an address or an identifier of a transmitter of a PPDU received in an optional link is identified. In this case, channel access defer may continue until reception is ended in the optional link.

In an embodiment of FIG. 48, a non-STR soft AP multi-link device includes a first AP (AP1) and a second AP (AP2). The first AP (AP1) and the second AP (AP2) operate in a first link (link1) that is a mandatory link and a second link (link2) that is an optional link, respectively. The first AP (AP1) and the second AP (AP2) are combined with a first station (STA1) and a second station (STA2) included in a non-STR multi-link device, respectively. The first AP (AP1) transmits data (data1) not inducing instant response to the first station (STA1), and the second AP (AP2) transmits data (data2) inducing instant response to the second station (STA2). While the second AP (AP2) is receiving a response for the data (data2) from the second station (STA2), the first AP (AP1) may defer channel access. In addition, the first AP (AP1) transmits data (data3) inducing instant response to the first station (STA1), and the second AP (AP2) transmits data (data4) inducing instant response to the second station (STA2). The first AP (AP1) receives a response for the data (data3) from the first station (STA1), and the second AP (AP2) receives a response for the data (data4) from the second station (STA2). While the second AP (AP2) is receiving a response for the data (data4) from the second station (STA2), the first AP (AP1) may defer channel access.

In another specific embodiment, while a non-STR soft AP multi-link device is transmitting a PPDU not including a frame inducing instant response in a mandatory link, the same device may not transmit a PPDU including a frame inducing instant response in an optional link.

Figure 49:
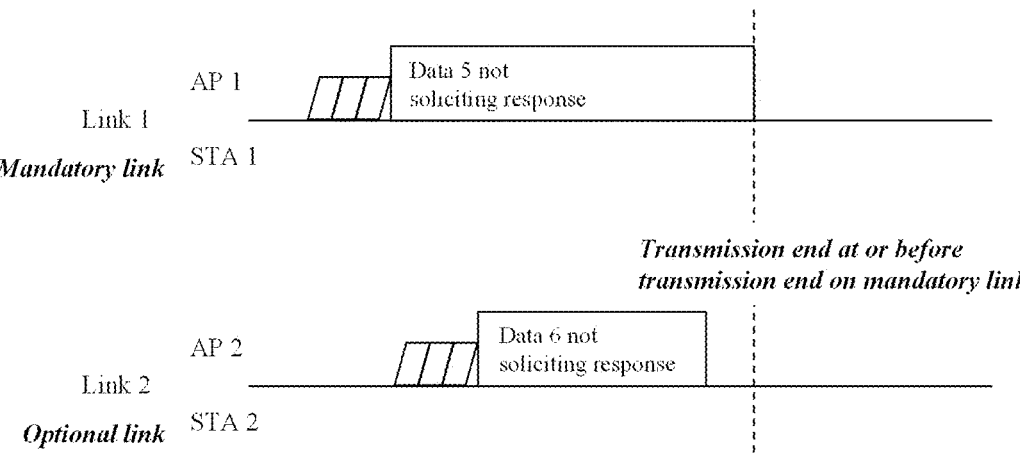
FIG. 49 shows a non-STR soft AP multi-link device transmitting a PPDU in a mandatory link and an optional link according to an embodiment of the present disclosure.

FIG. 49 shows a non-STR soft AP multi-link device transmitting a PPDU in a mandatory link and an optional link according to an embodiment of the present disclosure.

In a case where a non-STR soft AP multi-link device transmits a PPDU not including a frame inducing instant response in both a mandatory link and an optional link, the non-STR soft AP multi-link device may terminate PPDU transmission in the optional link not to be later than PPDU transmission in the mandatory link. That is, termination of PPDU transmission in an optional link may be earlier than or equal to termination of PPDU transmission in a mandatory link. This is because, if PPDU transmission in a mandatory link is terminated earlier than PPDU transmission in an optional link, transmission by a station to a non-STR soft AP multi-link device in the mandatory link may be interfered with.

In an embodiment of FIG. 49, a non-STR soft AP multi-link device includes a first AP (AP1) and a second AP (AP2). The first AP (AP1) and the second AP (AP2) operate in a first link (link1) that is a mandatory link and a second link (link2) that is an optional link, respectively. The first AP (AP1) and the second AP (AP2) are combined with a first station (STA1) and a second station (STA2) included in a non-STR multi-link device, respectively.

In a case where the multi-link device communicating with the non-STR soft AP multi-link device transmits a PPDU not including a frame inducing instant response in both a mandatory link and an optional link, the multi-link device may terminate transmission in the optional link earlier than PPDU transmission in the mandatory link. This is because, in a case where another station perform transmission to the non-STR soft AP multi-link device in an optional link, the non-STR soft AP multi-link device may perform reception.

An AP multi-link device and a non-AP multi-link device may negotiate about multi-link use in a scanning and association process described above with reference to FIG. 5. In the scanning process, an AP of the AP multi-link device may perform signaling of information on multiple links. Specifically, the AP of the AP multi-link device may include, in a beacon frame, at least one of an indicator indicating that an operation is possible in multiple links, the number of available links, and information relating to multiple links. In addition, in the scanning process, a station of the non-AP multi-link device may perform signaling of information on multiple links. Specifically, the station of the non-AP multi-link device may include, in a probe frame, an indicator indicating that an operation is possible in multiple links. In addition, the station of the non-AP multi-link device may include, in a probe frame, at least one of the number of available links, and information relating to multiple links.

In the scanning process, the non-AP multi-link device having identified used link information and whether the AP multi-link device performs a multi-link operation may connect to the AP multi-link device. The AP multi-link device and the non-AP multi-link device may start a negotiation process for a multi-link operation. The negotiation for a multi-link operation may be performed in a process of access between the AP of the AP multi-link device and the station of the non-AP multi-link device. When the station of the non-AP multi-link device sends an access request frame to the AP of the AP multi-link device, the station of the non-AP multi-link device may transmit an indicator indicating that a multi-link operation is available, and a request indicator requesting to perform a multi-link operation. The AP having received the access request frame from the station may identify an indicator requesting a multi-link operation. If the AP is capable of a multi-link operation, the AP may transmit, to the station, an access response frame allowing a multi-link operation and including link information to be used in the multi-link operation and a parameter used in each link. The parameter for the multi-link operation may include at least one of a frequency band of each of multiple links used in the multi-link operation, a bandwidth expansion direction of the frequency band of each of the multiple links, a target beacon transmission time (TBTT), and whether an STA operation is performed. The AP multi-link device and the non-AP multi-link device for which use of a multi-link operation has been identified through exchange between an access request frame and an access request response frame may perform a frame transmission operation using multiple links after the access process.

Figure 50:
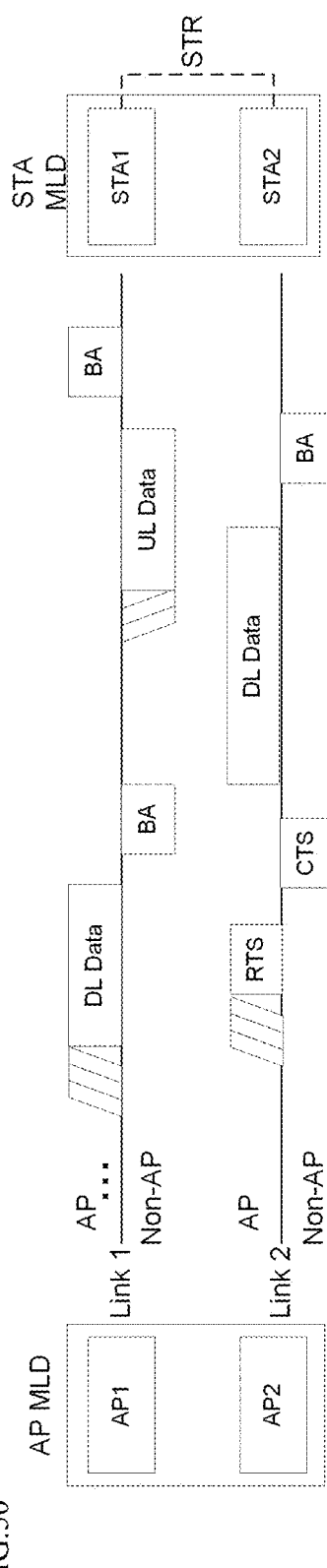
FIG. 50 shows independent transmission being performed in multiple links according to an embodiment of the present disclosure.

FIG. 50 shows independent transmission being performed in multiple links according to an embodiment of the present disclosure.

An AP multi-link device and a non-AP multi-link device having completed a negotiation for a multi-link operation may independently perform transmission or reception for each link, or simultaneously perform transmission or reception in multiple links. In a case where transmission or reception is independently performed in each of multiple links, an AP of the AP multi-link device and a station of a non-AP multi-link device independently perform channel contention for transmission. Therefore, a transmission start time point and a transmission end time point of each link may not be the same. In addition, a transmission opportunity (TXOP) obtained in a channel access procedure in each link may be independently obtained.

In an embodiment of FIG. 50, an AP multi-link device (AP MLD) includes a first AP (AP1) and a second AP (AP2), and the first AP (AP1) and the second AP (AP2) operate in a first link (link1) and a second link (link2), respectively. A non-AP multi-link device (STA MLD) includes a first station (STA1) and a second station (STA2), and the first station (STA1) and the second station (STA2) operate in the first link (link1) and the second link (link2), respectively. The first AP (AP1) and the second AP (AP2) independently perform channel access in the first link (link1) and the second link (link2), respectively. The first station (STA1) and the second station (STA2) independently perform channel access in the first link (link1) and the second link (link2), respectively. Therefore, the AP multi-link device (AP MLD) and the non-AP multi-link device (STA MLD) may perform reception in one link while performing transmission in another link.

This embodiment may increase a transmission efficiency in individual links. However, in a case where the non-AP multi-link device or the AP multi-link device does not support STR, channel access being independently performed in each of multiple links may not be allowed. In a case where a non-AP multi-link device or an AP multi-link device does not support STR, other embodiments may be applied. These embodiments will be explained with reference to FIG. 50.

Figure 51:
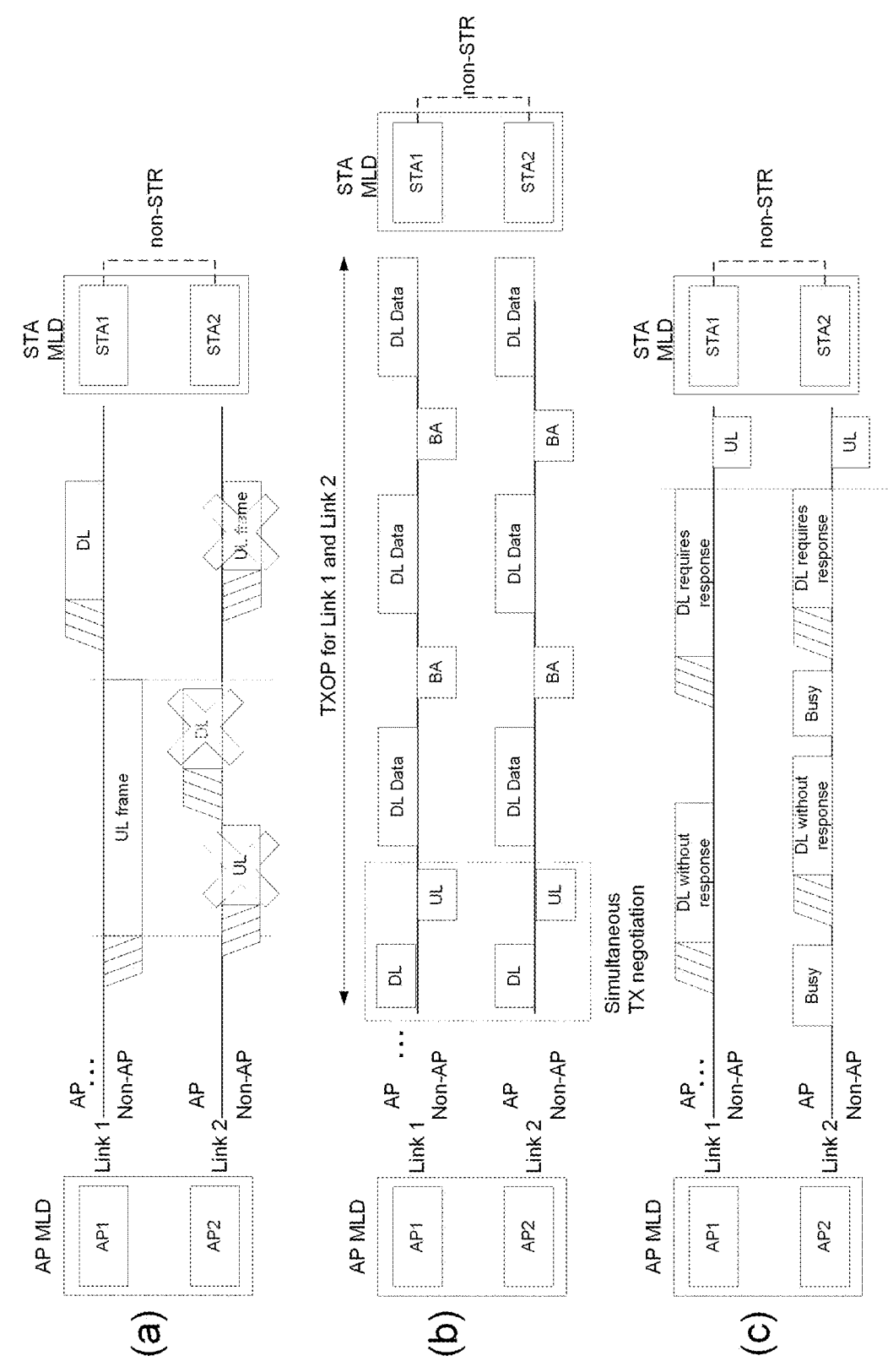
FIG. 51 illustrates an operation in which a multi-link device performs transmission in a non-STR link pair.

FIGS. 51A to 51C illustrate an operation in which a multi-link device performs transmission in a non-STR link pair.

A non-STR multi-link device not supporting STR is unable to perform reception in one link when performing transmission in another link. Therefore, when a non-STR multi-link device independently performs channel access in each of multiple links, transmission failure may occur. In an embodiment of FIG. 50A, an AP multi-link device (AP MLD) includes a first AP (AP1) and a second AP (AP2), and the first AP (AP1) and the second AP (AP2) operate in a first link (link1) and a second link (link2), respectively. A non-AP multi-link device (STA MLD) includes a first station (STA1) and a second station (STA2), and the first station (STA1) and the second station (STA2) operate in the first link (link1) and the second link (link2), respectively. While the first station (STA1) is performing uplink transmission (UL frame) to the first AP (AP1), communication between the second station (STA2) and the second AP (AP2) may be difficult.

If there is a non-STR link pair, a multi-link device performing transmission in a non-STR link may align the transmission start time points and the transmission end time points of frames transmitted in the non-STA link pair. The transmission start and the transmission end time points of the frame may be a transmission start time point and a transmission end time point of a PPDU including the frame. For the above alignment, a multi-link device may use a padding or padding bit. For this simultaneous transmission, a negotiation for simultaneous transmission may be performed. The negotiation for simultaneous transmission may include frame exchange during which a TXOP is obtained for simultaneous transmission. Specifically, a multi-link device may transmit a request frame in multiple links in which a TXOP is to be obtained. A multi-link device having received the request frame may transmit a response frame after an interval of a short interframe space (SIFS) from the request frame. The request frame may be a control frame. In addition, the request frame may be a request-to-send frame (RTS) frame or a multi-user (MU)-RTS frame. In addition, the response frame may be a clear-to-send (CTS) frame. At the time of transmission of the request frame or the response frame described above, if one link is not idle, a multi-link device may transmit the request frame or a response frame in an idle link among multiple links. In an embodiment of FIG. 50B, as described with reference to FIG. 50A, a first AP (AP1) and a second AP (AP2) operate in a first link (link1) and a second link (link2), respectively. In addition, a first station (STA1) and a second station (STA2) operate in the first link (link1) and the second link (link2), respectively. A non-AP multi-link device is a non-STR multi-link device, and thus the first AP (AP1) and the second AP (AP2) simultaneously transmit a frame and simultaneously receive a frame. The first AP (AP1) and the second AP (AP2) simultaneously transmit a request frame to secure a TXOP. The first station (STA1) and the second station (STA2) simultaneously transmit a response frame as a response for the request frame. Thereafter, in the secured TXOP, the first AP (AP1) and the second AP (AP2) exchange a frame with the first station (STA1) and the second station (STA2).

However, the channel states of the multiple links are different from each other, transmission in a non-STR link pair may be unable to simultaneously start. By taking this into consideration, multiple stations performing transmission to a non-STR multi-link device may align the ends of PPDUs. Specifically, multiple stations performing transmission to a non-STR multi-link device may align the ends of PPDUs even when failing to align the starts of the PPDUs. In addition, as described above, if one PPDU among PPDUs transmitted in a non-STR link pair does not include a frame inducing instant response, the end of the other PPDU may not be aligned with the end of the PPCU not including a frame inducing instant response. In an embodiment of FIG. 50B, as described with reference to FIG. 50A, a first AP (AP1) and a second AP (AP2) operate in a first link (link1) and a second link (link2), respectively. In addition, a first station (STA1) and a second station (STA2) operate in the first link (link1) and the second link (link2), respectively. A non-AP multi-link device is a non-STR multi-link device, and thus the first AP (AP1) and the second AP (AP2) align the ends of PPDUs when simultaneously transmitting the PPDUs. If the first AP (AP1) transmits a PPDU not including a frame inducing instant response, the first AP (AP1) and the second AP (AP1) do not align the ends of PPDUs. When the first AP (AP 1) and the second AP (AP2) simultaneously transmit PPDUs, the first AP (AP1) and the second AP (AP1) align the ends of the PPDUs.

A non-STR link pair described above indicates a link pair in which STR is impossible. A non-STR link group may imply that multiple links included in the non-STR link group include a non-STR link pair. An embodiment applied in a case where some of multiple links in which an AP multi-link device operates corresponds to a non-STR link pair will be described with reference to FIGS. 51A to 51C.

Figure 52:
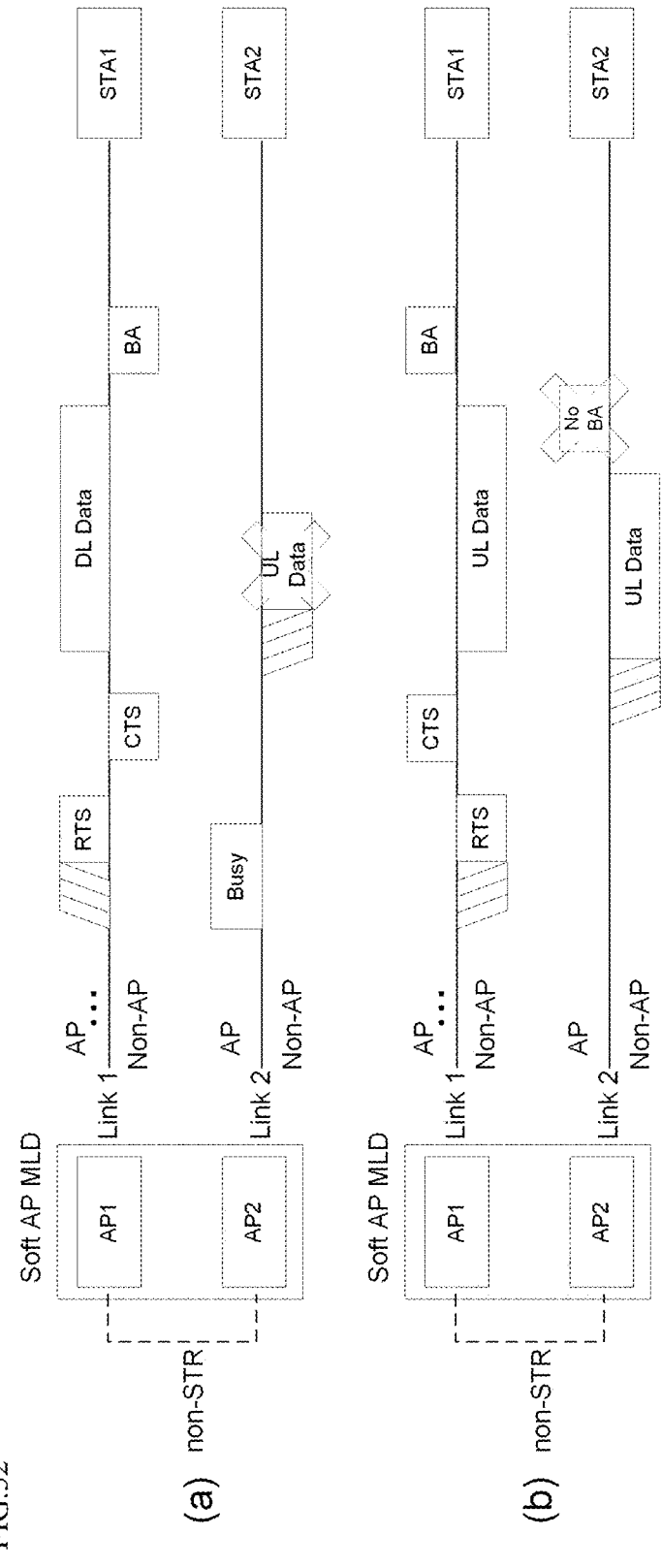
FIG. 52 shows an embodiment of the present disclosure applied when some of multiple links in which an AP multi-link device operates corresponds to a non-STR link pair.

FIGS. 52A and 52B show an embodiment of the present disclosure applied when some of multiple links in which an AP multi-link device operates corresponds to a non-STR link pair.

A multi-link device may be combined with a station not included in a multi-link device. It is difficult for the station not included in a multi-link device to determine whether transmission is performed in another link. In addition, in a case where stations included in different multi-link devices perform communication in a non-STR link pair, it is difficult for the stations included in the different multi-link devices to determine whether transmission is performed in a link other than the link in which a corresponding station operates. In FIGS. 51A to 51C, a non-STR AP multi-link device communicates with a first station (STA1) and a second station (STA2) not included in a multi-link device. In an embodiment of FIG. 51A, a first AP (AP1) and a second AP (AP2) attempt to perform channel access in a first link (link1) and a second link (link2), respectively. The first AP (AP1) succeeds in channel access, and starts a frame exchange sequence starting from RTS frame transmission. The second AP (AP2) fails in channel access, and thus is unable to start a frame exchange sequence. As described above, the second AP (AP2) is unable to determine whether transmission is performed in the first link. When the first AP (AP1) transmits data to the first station (STA1) in the first link (link1), the second station (STA2) may perform uplink transmission. In an embodiment of FIG. 51B, the first station (STA1) succeeds in channel access, and starts a frame exchange sequence starting from RTS frame transmission. The second station (STA2) succeeds in channel access and attempts to perform uplink transmission. While the first AP (AP1) is receiving data transmitted by the first station (STA1) in the first link (link1), transmission of the second station (STA2) may be completed in the second link (link2). The first AP (AP1) is receiving data transmitted by the first station (STA1) in the first link (link1), and thus the second AP (AP2) may be unable to transmit a response for transmission of the second station (STA2). In addition, the second station (STA2) may be unable to identify whether the transmission of the second station (STA2) has been successful. An embodiment for preventing this failure in frame exchange will be described with reference with FIG. 53.

Figure 53:
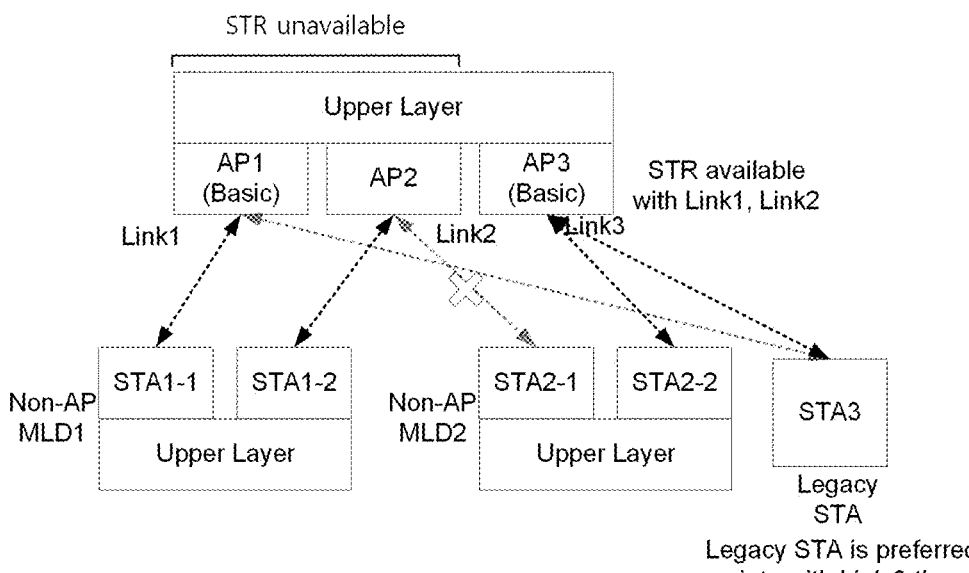
FIG. 53 shows that a multi-link device operates in multiple links including a non-STR link pair according to an embodiment of the present disclosure.

FIG. 53 shows that a multi-link device operates in multiple links including a non-STR link pair according to an embodiment of the present disclosure.

In a case where a multi-link device operates in multiple links including a non-STR link pair, the multi-link device may designate, as a basic link, at least one of the multiple links. The basic link may be a mandatory link described above. The multi-link device may designate, as a basic link, one link of the multiple links. A link of the multiple links other than the basic link may be called an expansion link.

When a non-AP multi-link device is to connect to a link included in a non-STR link pair, an AP multi-link device may induce the non-AP multi-link device to connect to all the links included in the non-STR link pair. In addition, when a station not included in the non-AP multi-link device is to connect to a link included in an STR link pair, the AP multi-link device may induce the station not included in the non-AP multi-link device to access a link included in the STR link pair.

In another specific embodiment, an AP multi-link device may allow connection of a station not included in a non-AP multi-link device only in a basic link. The station not included in the non-AP multi-link device may be connected to the AP multi-link device only in a basic link of the AP multi-link device.

In an embodiment of FIG. 53, a non-STRAP multi-link device (non-STRAP MLD) operates in a first link (link1), a second link (link2), and a third link (link3) belonging to a link pair in which STR is possible. The first link (link1) and the second link (link2) are a non-STR link pair, the first link (link1) and the third link (link3) are an STR link pair in which STR is possible, and the second link (link2) and the third link (link3) are an STR link pair in which STR is possible. The non-STR AP multi-link device (non-STRAP MLD) designates the first link (link1) and the third link (link3) as basic links. A third station (STA3) not included in a multi-link device may be connected to the non-STR AP multi-link device (non-STR AP MLD) in the first link (link1) or the third link (link3). The third station (STA3) not included in a multi-link device may be unable to be connected to the non-STRAP multi-link device (non-STRAP MLD) in the first link (link1) or the second link (link2). The non-STR multi-link device (non-STR AP MLD) may induce the third station (STA3) to be connected to the non-STR multi-link device (non-STR AP MLD) in the third link (link3).

In the embodiments described above, the channel load of the basic link may be excessively increased. In order to prevent the increase, the number of links included in the non-STR link pair may be limited. The number of links included in the non-STR link pair may be 2.

In the embodiments described above, an AP multi-link device may induce connection to a basic link in a negotiation for a multi-link operation. These embodiments will be explained with reference to FIG. 54.

Figure 54:
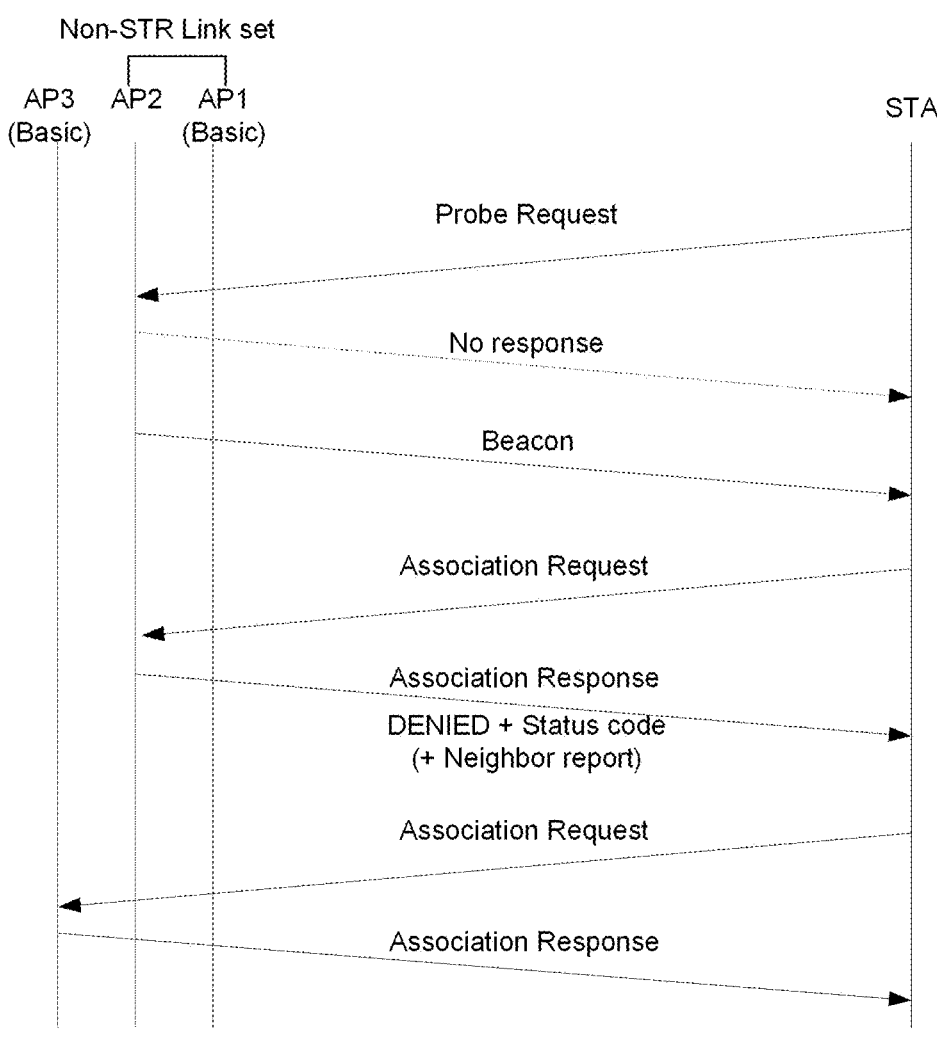
FIG. 54 shows an operation in which an AP multi-link device according to an embodiment of the present disclosure is combined with a station not included in a multi-link device.

FIG. 54 shows an operation in which an AP multi-link device according to an embodiment of the present disclosure is combined with a station not included in a multi-link device.

When a station not included in a multi-link device sends a connection request to an AP multi-link device in an expansion link, the AP multi-link device may reject the connection request of the station. In a detailed method, when a station not included in a multi-link device transmits a probe request frame to an AP multi-link device, the AP multi-link device may not transmit a probe response frame to the station. In addition, when a station not included in a multi-link device transmits a connection request frame to an AP multi-link device in an expansion link, the AP multi-link device may transmit, to the station, a connection response frame including an indicator rejecting the connection request. The connection response frame may include a field indicating a state code that proposes access to another link. For example, the state code that proposes access to another link may be 82. In addition, the connection response frame may include information on a link proposed to be accessed. The information on the link proposed to be accessed may be a type of a neighbor report information element. The neighbor report information element may include at least one of an SSID, a channel and an operation class, and timing information. The link proposed to be accessed may be a basic link included in an STR link pair. The station not included in a multi-link may attempt to connect to the link proposed by the AP multi-link device to be accessed, based on the information on the link proposed by the AP multi-link device to be accessed.

In addition, the AP multi-link device may simultaneously transmit beacon frames in an expansion link and a basic link.

In addition, the AP multi-link device may transmit a beacon frame in an expansion link in a type by which the station not included in a multi-link device is unable to decode. Specifically, for example, all the values of an IBSS STA subfield and an ESS subfield of a capability information field in the beacon frame may be configured to be 1. The station not included in a multi-link device is unable to decode the beacon, and thus unable to transmit a connection request based on the beacon frame. In this embodiment, the AP multi-link device may transmit a beacon frame even in a basic link included in a non-STR link pair in a type by which the station not included in a multi-link device is unable to decode. In addition, the AP multi-link device may configure, to be a pre-designated value, some fields of a BSS load information element of a beacon frame transmitted in an expansion link. The AP multi-link device may configure a BSS load information element of a beacon frame transmitted in an expansion link, to indicate a maximum value of a channel use rate. In addition, the AP multi-link device may configure a BSS load information element transmitted in an expansion link, to indicate a maximum value of the number of connected stations. The station having received the beacon frame configured above may determine that connection in an expansion link is impossible or connection efficiency is expected to degrade, and thus not attempt to perform connection. In another specific embodiment, the AP multi-link device may not transmit a beacon frame in an expansion link.

The embodiments described above may be applied to a basic link included in a non-STR link pair as well as an expansion link. For example, even though a station not included in a multi-link device transmits a connection request frame in a basic link included in a non-STR link pair, an AP multi-link device may transmit a frame rejecting connection.

In an embodiment of FIG. 54, a station (STA) not included in a multi-link device transmits a probe request frame to a second AP (AP2) operating in an expansion link. The second AP (AP2) may not transmit a probe response frame to the station (STA). The station (STA) not included in a multi-link device transmits a connection request frame to the second AP (AP2) operating in the expansion link. The second AP (AP2) transmits a connection response frame including a state code rejecting connection to the station (STA). The connection response frame may include information on a link in which a third AP (AP3) or a first AP (AP1) operates as described above. The station (STA) transmits a connection request frame to the third AP (AP3), based on the information on the link in which the third AP (AP3) operates.

Figure 55:
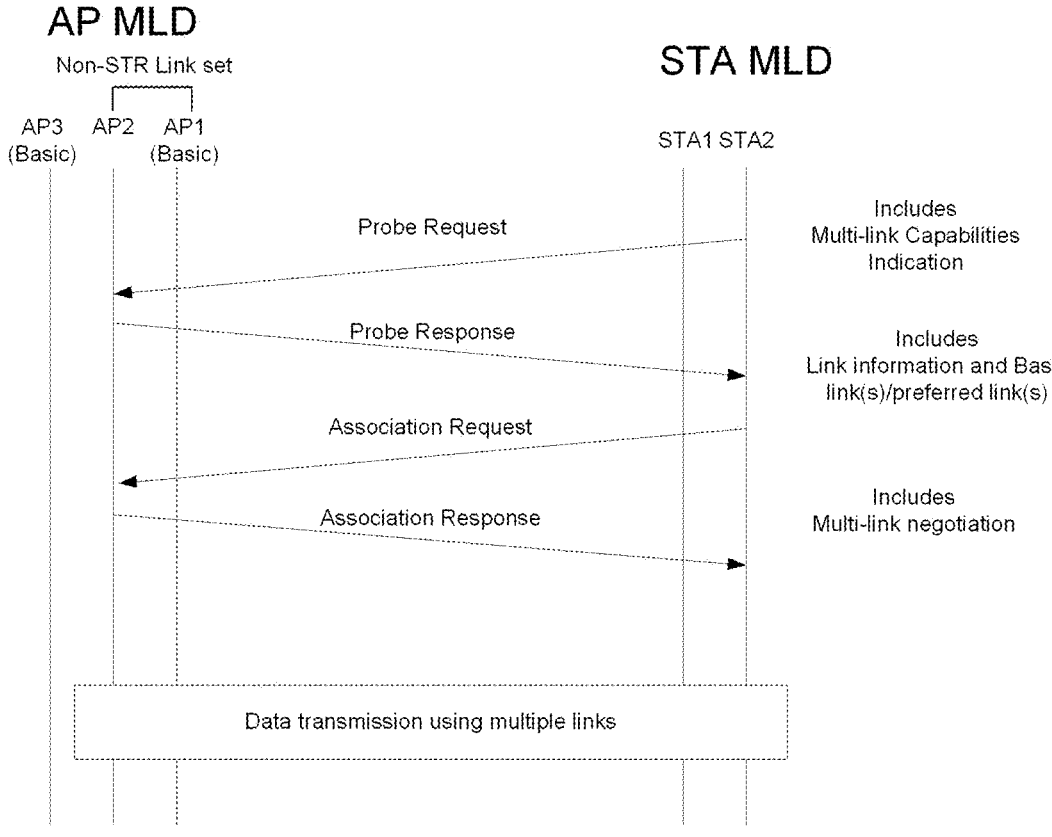
FIG. 55 shows an operation in which an AP multi-link device according to an embodiment of the present disclosure is combined with a station included in a multi-link device.

FIG. 55 shows an operation in which an AP multi-link device according to an embodiment of the present disclosure is combined with a station included in a multi-link device.

A non-AP multi-link device may request information on a link for a multi-link operation from an AP multi-link device by using a probe request frame. Specifically, the probe request frame may include an indicator requesting link information for a multi-link operation. The AP multi-link device having received the probe request frame including the information on the link for the multi-link operation may transmit a probe response frame including the information on the link for the multi-link operation to the non-AP multi-link device. The information on the link for the multi-link operation may include at least one of information on an STR link pair, information on a non-STR link pair, and information on a basic link. The non-AP multi-link device may obtain the information on the link for the multi-link operation from the probe response frame.

The non-AP multi-link device may transmit a multi-link operation request to the AP multi-link device by using a connection request frame. The connection request frame may include an indicator indicating a request to perform a multi-link operation. The AP multi-link device having received the multi-link operation request may determine whether the multi-link operation is acceptable. Specifically, if the connection request frame includes an indicator indicating a request to perform a multi-link operation, the AP multi-link device may determine whether the multi-link operation is acceptable. In a detailed embodiment, the AP multi-link device may determine whether the non-AP multi-link device requests connection in a non-STR link pair, or the non-AP multi-link device requests connection in a basic link of a non-STR link pair. In addition, the AP multi-link device may determine whether the non-AP multi-link device requests connection in multiple links. If the non-AP multi-link device requests connection in an unavailable link, the AP multi-link device may reject a connection request of the non-AP multi-link device. Specifically, if the non-AP multi-link device requests connection in an expansion link of a non-STR link pair, the AP multi-link device may reject a connection request of the non-AP multi-link device. In addition, if the non-AP multi-link device requests connection only in some links of a non-STR link pair, the AP multi-link device may reject a connection request of the non-AP multi-link device. The multi-link device may transmit a connection response frame indicating rejection of connection to reject a connection request of the non-AP multi-link device. In addition, the multi-link device may transmit a connection response frame indicating a link different from the link in which the non-AP multi-link device has requested connection.

In an embodiment of FIG. 55, a non-AP multi-link device (STA MLD) transmits a probe request frame to an AP multi-link device (AP MLD). The probe request frame includes an indicator (multi-link capabilities indication) requesting link information for a multi-link operation. The AP multi-link device (AP MLD) transmits a probe response frame including the link information for the multi-link operation to the non-AP multi-link device (STA MLD). The non-AP multi-link device (STA MLD) obtains the link information for the multi-link operation. The non-AP multi-link device (STA MLD) transmits a connection request frame including information for a multi-link negotiation to the AP multi-link device (AP MLD). The AP multi-link device (AP MLD) transmits whether the multi-link operation is accepted, to the non-AP multi-link device (STA MLD) by using a connection response frame.

When the multi-link device performs transmission in a non-STR link pair, transmission in an expansion link may be limited according to whether transmission in a basic link is performed. This limitation will be explained with reference to FIG. 55.

Figure 56:
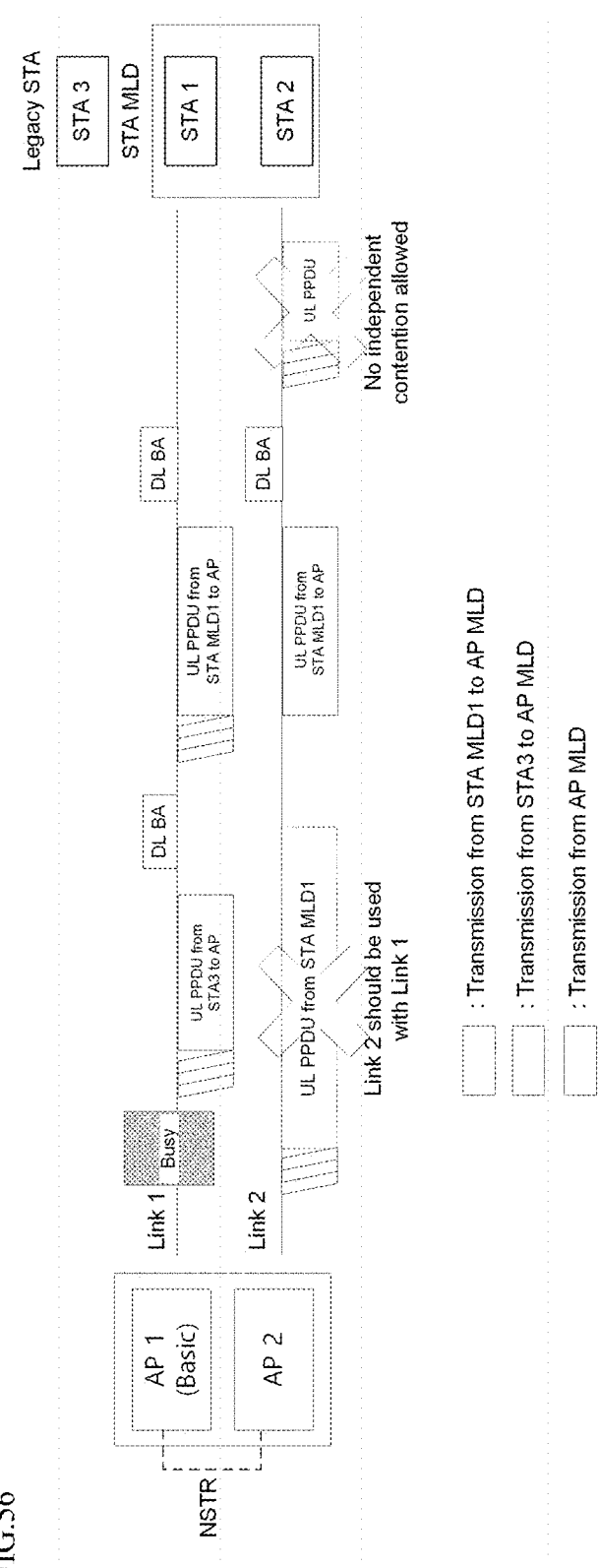
FIG. 56 shows that a multi-link device according to an embodiment of the present disclosure performs transmission in non-STR link pair, based on a basic link.

FIG. 56 shows that a multi-link device according to an embodiment of the present disclosure performs transmission in non-STR link pair, based on a basic link.

As described above, in a case where an AP multi-link device and a station not included in a multi-link device communicate with each other in a non-STR link pair, and an AP multi-link device and a station of a multi-link device communicate with each other in only some links of a non-STR link pair, a basic link may be designated. A multi-link device may perform independent channel access only in a basic link. Specifically, a multi-link device may perform transmission even in an expansion link on a condition of performing transmission in a basic link. Therefore, when a basic link is occupied, transmission of a multi-link device in an expansion link may not be allowed. The multi-link device may be an AP multi-link device or a non-AP multi-link device.

In an embodiment of FIG. 56, an AP multi-link device includes a first AP (AP1) and a second AP (AP2). The first AP (AP1) and the second AP (AP2) operate in the first link (link1) and the second link (link2), respectively. In addition, a non-AP multi-link device includes a first station (STA1) and a second station (STA2). The first station (STA1) and the second station (STA2) operate in the first link (link1) and the second link (link2), respectively. A third station (STA3) not included in a multi-link may be connected to the first AP (AP1) in the first link. If the first station (STA1) does not perform transmission in the first link (link1), the second station (STA2) is unable to perform transmission in the second link (link2). When the first station (STA1) performs transmission in the first link (link1), the second station (STA2) performs transmission in the second link (link2).

In the embodiment described above, an operation of performing an all-channel access before transmission will be described with reference to FIG. 57.

Figure 57:
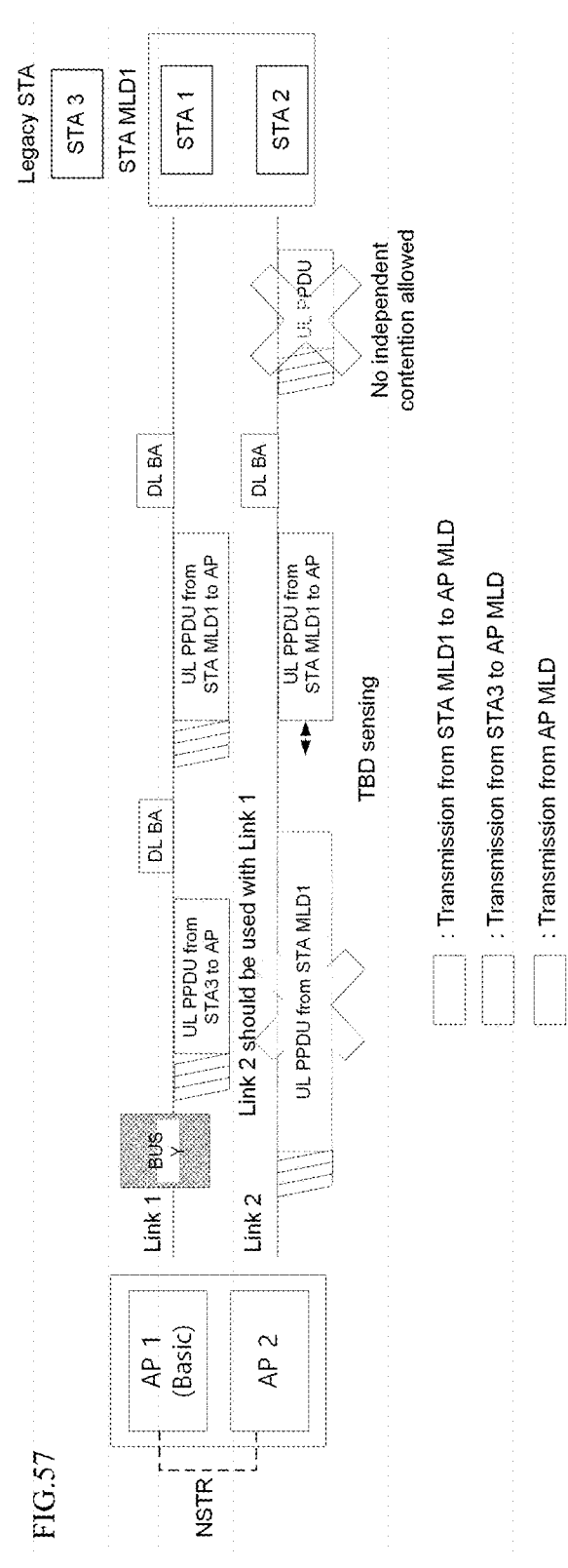
FIG. 57 shows that a multi-link device according to an embodiment of the present disclosure performs channel access to perform transmission in non-STR link pair, based on a basic link.

FIG. 57 shows that a multi-link device according to an embodiment of the present disclosure performs channel access to perform transmission in non-STR link pair, based on a basic link.

When a multi-link device has succeeds in a random backoff-based channel access in a basic link, and an expansion link is idle continuously for a pre-designated time interval at the time of the success of the channel access in the basic link, the multi-link device may simultaneously perform transmission in the basic link and the expansion link. The pre-designated time interval may be a PIFS. In addition, the pre-designated time interval may be an AIFS. In another specific embodiment, when the multi-link device has succeeds in a random backoff-based channel access in a basic link, and an expansion link is also idle as much as the basic link is, the multi-link device may simultaneously perform transmission in the basic link and the expansion link. The multi-link device may be an AP multi-link device or a non-AP multi-link device.

Even when a channel access has been successful in a basic link, if an expansion link is not idle, an AP multi-link device may not perform transmission. In another specific embodiment, even when a channel access has been successful in a basic link, if an expansion link is not idle, an AP multi-link device may initialize a value of a backoff counter in the basic link and restart a channel access. This operation may be identically applied to a non-AP multi-link device.

An embodiment of FIG. 57 specifies a channel access operation in the embodiment of FIG. 55. If the first station (STA1) has been successful in a channel access in the first link (link1) that is a basic link, the second station (STA2) determines whether the second link (link2) has been continuously idle for a pre-designated time interval, at the time of success of the channel access in the first link (link1). When the channel access is successful in the first link (link1), the second link (link2) has been continuously idle for a pre-designated time interval, and thus the first station (STA1) and the second station (STA2) simultaneously perform transmission.

Another channel access method which may be applied in a non-STR link pair will be described with reference to FIG. 57.

Figure 58:
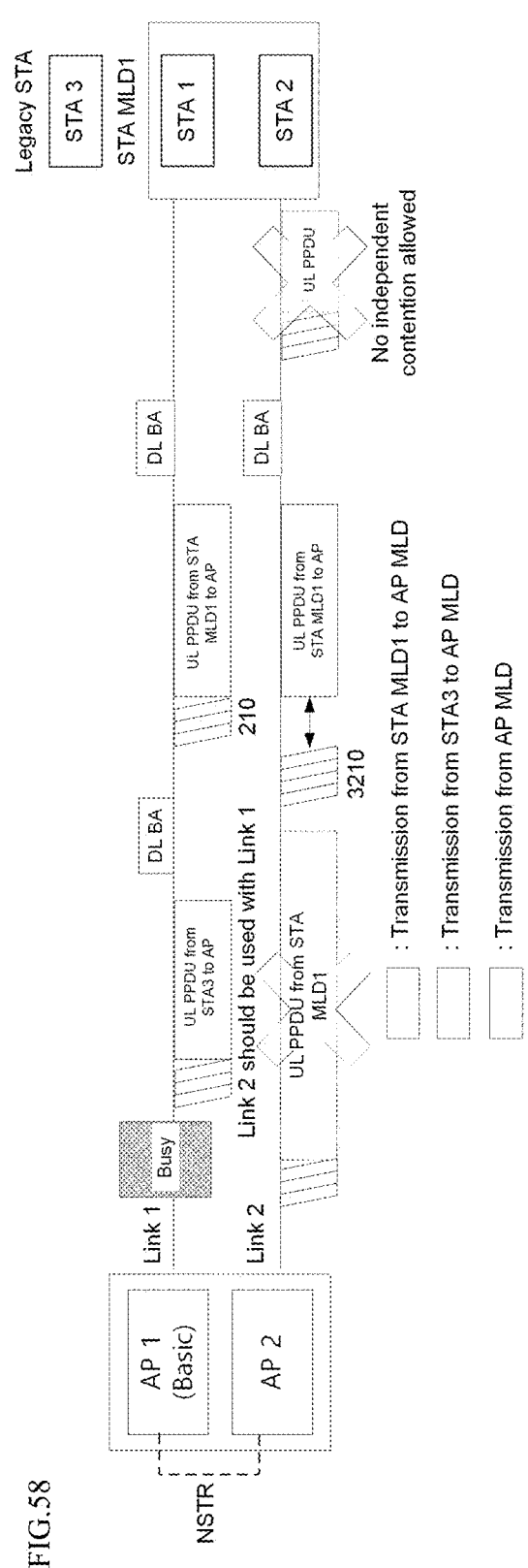
FIG. 58 shows that a multi-link device according to an embodiment of the present disclosure performs channel access to perform transmission in non-STR link pair, based on a basic link.

FIG. 58 shows that a multi-link device according to an embodiment of the present disclosure performs channel access to perform transmission in non-STR link pair, based on a basic link.

A multi-link device may independently perform a random backoff-based channel access in a non-STR link pair. Even when a backoff counter reaches 0 in a first link, if a backoff counter does not reach 0 in a second link, the multi-link device may not start transmission and wait. Specifically, even when a backoff counter reaches 0 in a first link, until a backoff counter reaches 0 in a second link, the multi-link device may not start transmission. The multi-link device may simultaneously perform transmission in the first link and the second link when the backoff counter reaches 0. If the first link is a basic link and the second link is detected as not being idle, the multi-link device may perform transmission only in the first link. Even when the multi-link device is successful a channel access only in an expansion link, transmission of the multi-link device only in the expansion link may not be allowed. The multi-link device may be an AP multi-link device or a non-AP multi-link device.

In the embodiment of FIG. 58, even when a backoff counter reaches 0 in the second link (link2), due to failure of the first station (STA1) in a channel access in the first link that is a basic link, the second station (STA2) does not start transmission and waits. When the first station (STA1) is successful in a channel access in the first link (link1) that is a basic link, the first station (STA1) and the second station (STA2) simultaneously perform transmission.

A channel access method of a case where one non-AP multi-link device is connected to all links in a non-STR link pair will be described with reference to FIG. 59 and FIG. 60.

Figure 59:
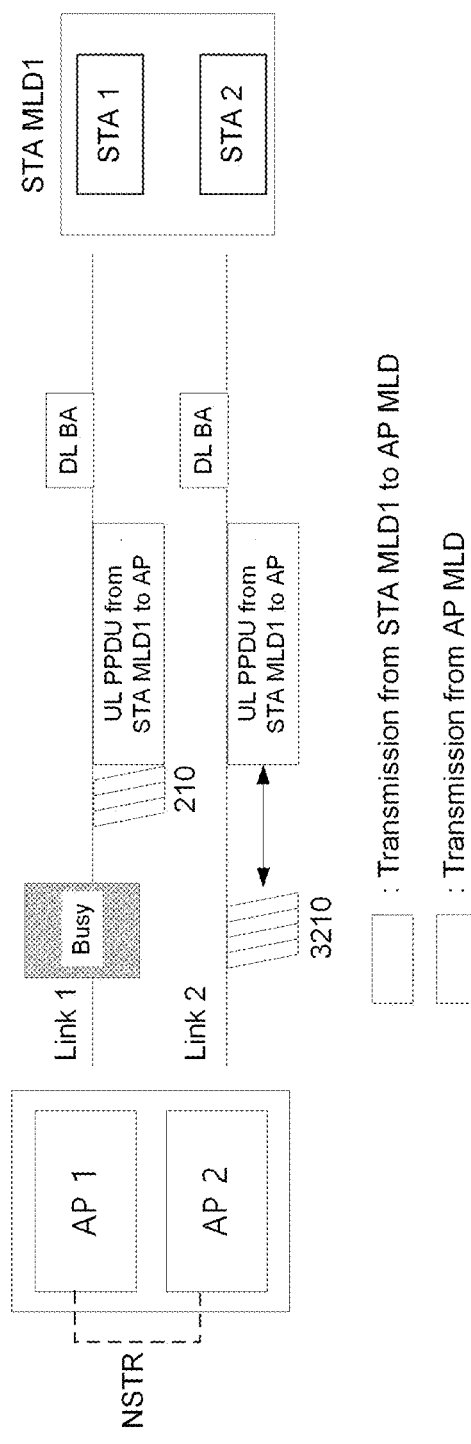
FIG. 59 shows a channel access of a multi-link device according to an embodiment of the present disclosure in a case where a non-AP multi-link device is connected to all links in a non-STR link pair.

FIG. 59 shows a channel access of a multi-link device according to an embodiment of the present disclosure in a case where a non-AP multi-link device is connected to all links in a non-STR link pair.

A multi-link device may independently perform a random backoff-based channel access in a non-STR link pair. Even when a backoff counter reaches 0 in a first link, if a backoff counter does not reach 0 in a second link, the multi-link device may not start transmission and maintain 0 of the backoff counter. Specifically, even when a backoff counter reaches 0 in a first link, until a backoff counter reaches 0 in a second link, the multi-link device may not start transmission. The multi-link device may simultaneously perform transmission in the first link and the second link when the backoff counter reaches 0.

In the embodiment of FIG. 59, even when a backoff counter reaches 0 in the second link (link2), due to failure of the first station (STA1) in a channel access in the first link that is a basic link, the second station (STA2) does not start transmission and maintains 0 of the backoff counter. When the first station (STA1) is successful in a channel access in the first link (link1) that is a basic link, the first station (STA1) and the second station (STA2) simultaneously perform transmission.

The multi-link device may independently perform a random backoff-based channel access in a STR link pair. When a channel access is successful in one link first, the multi-link device may start transmission in the link. However, in a case where the multi-link device transmits a PPDU including an instant response, the multi-link device may align the ends of PPDUs transmitted in multiple links.

In the embodiments described above, when a multi-link device succeeds in a channel access in one link and waits for completion of a backoff procedure in another link, the multi-link device may perform channel sensing in the link in which the channel access is successful. When a channel in the link in which the channel access is successful is detected as not being idle, the multi-link device may restart a channel access procedure in the channel. An operation of a multi-link device in a case where the multi-link device succeeds in a channel access in one link and detects, as not being idle, a channel in a link in which a channel access fails, will be described with reference to FIG. 60.

Figure 60:
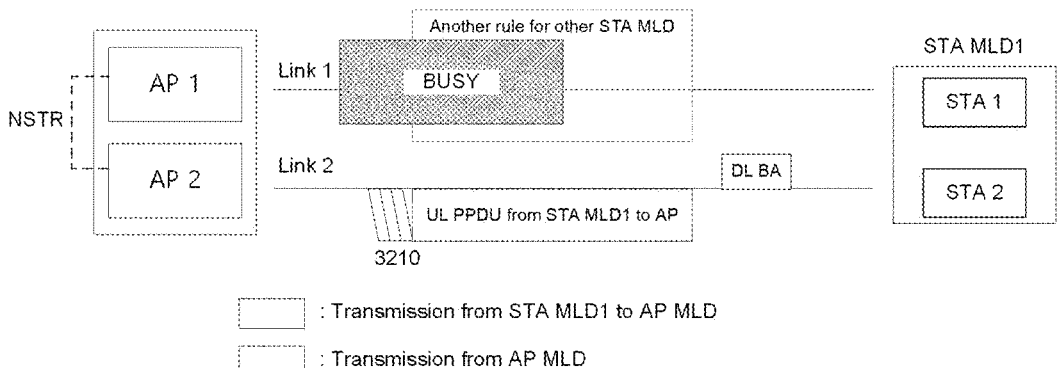
FIG. 60 shows a channel access of a multi-link device according to an embodiment of the present disclosure in a case where a non-AP multi-link device is connected to all links in a non-STR link pair.

FIG. 60 shows a channel access of a multi-link device according to an embodiment of the present disclosure in a case where a non-AP multi-link device is connected to all links in a non-STR link pair.

When a multi-link device succeeds in a channel access in a first link of a non-STR link pair and detects a channel in a second link as not being idle, the multi-link device may perform transmission in the first link. The multi-link device may determine whether to start transmission in the first link, according to the type of a signal occupying the second link. Specifically, when the signal occupying the second link is a frame transmitted from another BSS, the multi-link device may perform transmission in the first link. In another specific embodiment, when the signal occupying the second link is a frame transmitted from another BSS, the multi-link device may maintain 0 as a backoff counter value in the first link. When the second link becomes idle, the multi-link device may simultaneously transmit PPDUs in the first link and the second link.

In these embodiments, the multi-link device may determine whether the signal occupying the second link is a frame transmitted from another BSS, based on a MAC address field of a received frame. If at least one of MAC address fields of the received frame indicates the address of an AP to which at least one multi-link device is connected, the multi-link device may determine that the frame is an intra-BSS frame. In addition, if a BSSID field of the received frame indicates the address of an AP to which the multi-link device is connected, the multi-link device may determine that the frame is an intra-BSS frame. In addition, the multi-link device may determine whether the signal occupying the second link is a frame transmitted from another BSS, based on a BSS color indicated by a received PPDU. The PPDU may indicate the BSS color through a BSS color field of a signaling field or a group ID field and a partial AID field.

When the signal occupying the second link is not a Wi-Fi signal, the multi-link device may not perform transmission in the first link and maintain 0 of the backoff counter. In another specific embodiment, when the signal occupying the second link is not a Wi-Fi signal, the multi-link device may perform transmission in the first link.

In an embodiment of FIG. 60, an AP multi-link device includes a first AP (AP1) and a second AP (AP2). The first AP (AP1) and the second AP (AP2) operate in the first link (link1) and the second link (link2) that are a non-STR link pair, respectively. In addition, a non-AP multi-link device includes a first station (STA1) and a second station (STA2). The first station (STA1) and the second station (STA2) operate in the first link (link1) and the second link (link2), respectively. The first station (STA1) and the second station (STA2) independently perform a channel access in the first link (link1) and the second link (link2), respectively. If the first link (link1) is not idle and the second station (STA2) succeeds in a channel access in the second link (link2), the second station (STA2) may perform transmission in the second link (link2).

When a multi-link device is to transmit multiple PPDUs in a non-STR link pair, one link may be occupied by a frame transmitted from a BSS to which a station of a multi-link device belongs. A method of performing a channel access by a multi-link device will be described with reference to FIG. 61 to FIG. 63.

Figure 61:
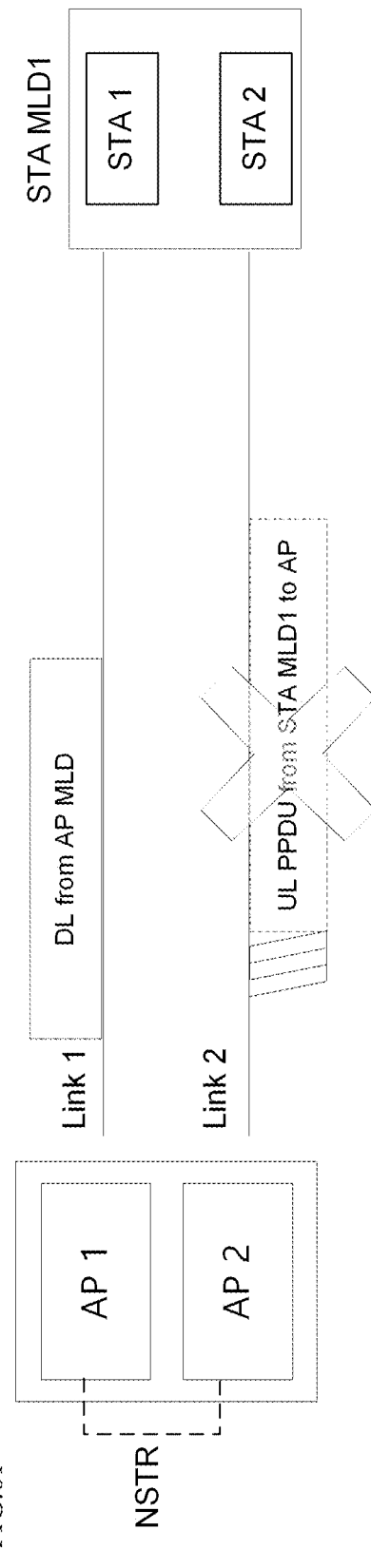
FIG. 61 shows a transmission operation of a non-AP multi-link device in a case where the non-AP multi-link device is connected to all the links in a non-STR link pair of an AP multi-link device and the AP multi-link device performs transmission in one link according to an embodiment of the present disclosure.

FIG. 61 shows a transmission operation of a non-AP multi-link device in a case where the non-AP multi-link device is connected to all the links in a non-STR link pair of an AP multi-link device and the AP multi-link device performs transmission in one link according to an embodiment of the present disclosure.

As described above, according to an embodiment of the present disclosure, an AP multi-link device may allow connection only when a non-AP multi-link device requests connection to all links of a non-STR link pair. The non-AP multi-link device may independently perform a channel access in each link of the non-STR link pair. While the AP multi-link device is performing transmission in one link of the non-STR link pair, the non-AP multi-link device may not perform transmission in the other link.

In an embodiment of FIG. 61, an AP multi-link device includes a first AP (AP1) and a second AP (AP2). The first AP (AP1) and the second AP (AP2) operate in the first link (link1) and the second link (link2) that are a non-STR link pair, respectively. In addition, a non-AP multi-link device includes a first station (STA1) and a second station (STA2). The first station (STA1) and the second station (STA2) operate in the first link (link1) and the second link (link2), respectively. The first station (STA1) and the second station (STA2) independently perform a channel access in the first link (link1) and the second link (link2), respectively. While the first AP (AP1) is performing transmission in the first link (link1), the second station (STA2) does not perform transmission in the second link (link2).

Figure 62:
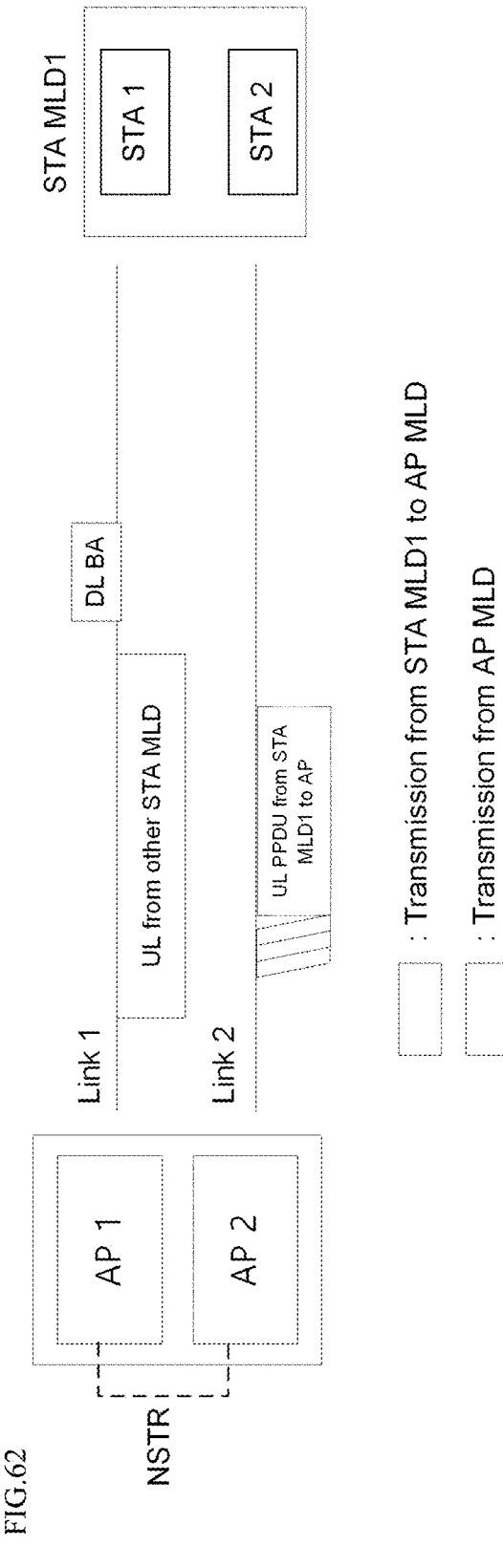
FIG. 62 shows a transmission operation of a non-AP multi-link device in a case where the non-AP multi-link device is connected to all the links in a non-STR link pair of an AP multi-link device and an intra-BSS frame transmitted by a different station is transmitted in one link according to an embodiment of the present disclosure.

FIG. 62 shows a transmission operation of a non-AP multi-link device in a case where the non-AP multi-link device is connected to all the links in a non-STR link pair of an AP multi-link device and an intra-BSS frame transmitted by a different station is transmitted in one link according to an embodiment of the present disclosure.

As described above, according to an embodiment of the present disclosure, an AP multi-link device may allow connection only when a non-AP multi-link device requests connection to all links of a non-STR link pair. The non-AP multi-link device may independently perform a channel access in each link of the non-STR link pair. When an intra-BSS frame transmitted by another station is detected in one link of the non-STR links, the non-AP multi-link device may perform transmission through the other link. The non-AP multi-link device may transmit only a PPDU not including a frame inducing instant response. In addition, the non-AP multi-link device may perform transmission until a time point at which transmission performed in a different link is expected to be terminated. The non-AP multi-link device may predict a transmission end time point, based on a length field value of an L-SIG field of a PPDU.

In an embodiment of FIG. 62, an AP multi-link device includes a first AP (AP1) and a second AP (AP2). The first AP (AP1) and the second AP (AP2) operate in the first link (link1) and the second link (link2) that are a non-STR link pair, respectively. In addition, a non-AP multi-link device includes a first station (STA1) and a second station (STA2). The first station (STA1) and the second station (STA2) operate in the first link (link1) and the second link (link2), respectively. The first station (STA1) and the second station (STA2) independently perform a channel access in the first link (link1) and the second link (link2), respectively. Another station rather than the first station (STA1) transmits an inter-BSS frame in the first link (link1). The second station (STA2) transmits a PPDU not including a frame inducing instant response in the second link (link2). The second station (STA2) performs transmission until termination of inter-BSS frame transmission by the other station.

Figure 63:
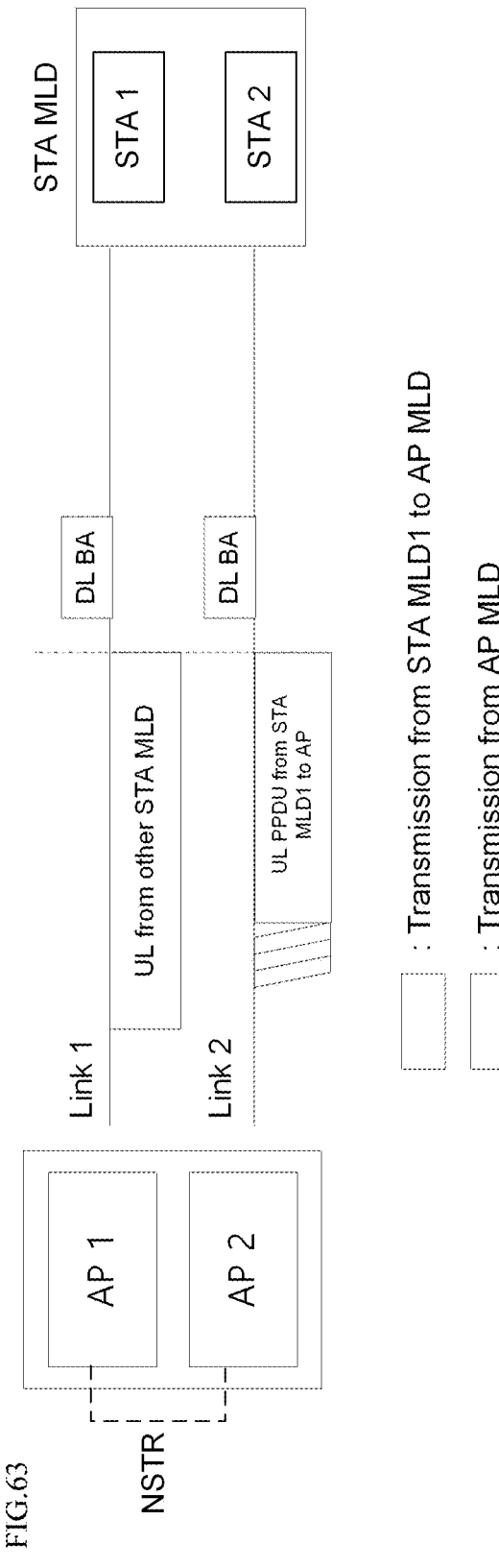
FIG. 63 shows a transmission operation of a non-AP multi-link device in a case where the non-AP multi-link device is connected to all the links in a non-STR link pair of an AP multi-link device and an intra-BSS frame transmitted by a different station is transmitted in one link according to another embodiment of the present disclosure.

FIG. 63 shows a transmission operation of a non-AP multi-link device in a case where the non-AP multi-link device is connected to all the links in a non-STR link pair of an AP multi-link device and an intra-BSS frame transmitted by a different station is transmitted in one link according to another embodiment of the present disclosure.

As described above, according to an embodiment of the present disclosure, an AP multi-link device may allow connection only when a non-AP multi-link device requests connection to all links of a non-STR link pair. The non-AP multi-link device may independently perform a channel access in each link of the non-STR link pair. When an intra-BSS frame transmitted by another station is detected in one link of the non-STR links, the non-AP multi-link device may perform transmission through the other link. Even when the non-AP multi-link device transmits a PPDU including a frame inducing instant response, the non-AP multi-link device may be required to complete the transmission until transmission of the intra-BSS frame transmitted by the other station is terminated. Specifically, when the non-AP multi-link device transmits a PPDU including a frame inducing instant response, the non-AP multi-link device may align the end of a PPDU of transmission of the intra-BSS frame transmitted by the other station with the end of the PPDU transmitted by the non-AP multi-link device. The non-AP multi-link device may predict a transmission end time point, based on a length field value of an L-SIG field of a PPDU.

In an embodiment of FIG. 63, an AP multi-link device includes a first AP (AP1) and a second AP (AP2). The first AP (AP1) and the second AP (AP2) operate in the first link (link1) and the second link (link2) that are a non-STR link pair, respectively. In addition, a non-AP multi-link device includes a first station (STA1) and a second station (STA2). The first station (STA1) and the second station (STA2) operate in the first link (link1) and the second link (link2), respectively. The first station (STA1) and the second station (STA2) independently perform a channel access in the first link (link1) and the second link (link2), respectively. Another station rather than the first station (STA1) transmits an inter-BSS frame in the first link (link1). The second station (STA2) transmits a PPDU not including a frame inducing instant response in the second link (link2). The second station (STA2) performs transmission until termination of inter-BSS frame transmission by the other station.

In the embodiments described with reference to FIG. 61 to FIG. 63, if the address of a transmitter of a MAC address field of an intra-BSS frame is the same as the address of an AP connected to a station, a station of a non-AP multi-link device may determine that the frame is an intra-BSS frame transmitted by another station. In addition, if a PPDU including the intra-BSS frame indicates uplink transmission, the station of the non-AP multi-link device may determine that the frame is an intra-BSS frame transmitted by another station. Determination on whether transmission is transmission of an intra-BSS frame may be the same as an operation described above.

Figure 64:
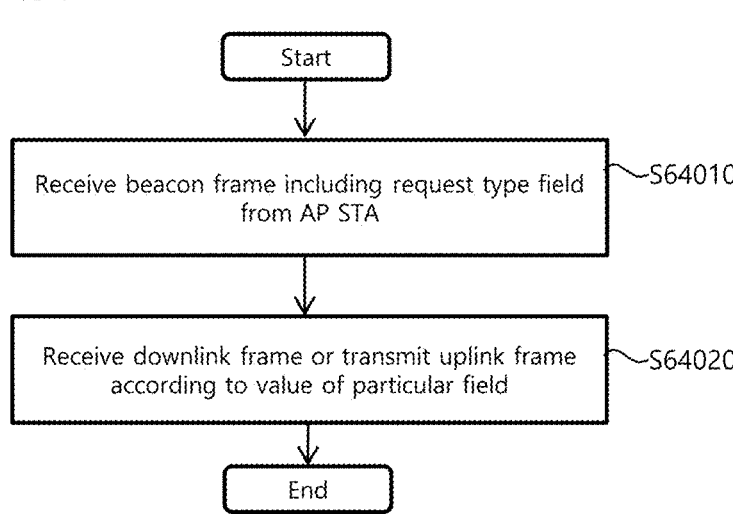
FIG. 64 is a flowchart showing an example of a method of transmitting a frame according to the present disclosure.

FIG. 64 is a flowchart showing an example of a method of transmitting a frame according to the present disclosure.

Referring to FIG. 64, a non-AP STA may receive a beacon frame including a request type field from an AP STA (operation S64010). The request type field may include a particular field for indicating a target wake time (TWT) for a low latency operation, and when a value of the particular field is configured to be a first particular value, a broadcast TWT service period (SP) is a TWT SP for the low latency operation.

Thereafter, the non-AP STA receives a downlink frame or transmits an uplink frame according to the value of the particular field (operation S64020). That is, in a case where a TWT SP is scheduled, the non-AP STA may, during the TWT SP, transmit or receive only limited frames (e.g., frames requiring low latency or sensitive to latency) and be unable to transmit or receive other frames, or preferentially transmit or receive only limited frames (e.g., the limited frames may have a high priority).

When the TWT SP for the low latency operation is configured, only a frame requiring low latency is transmittable during the TWT SP for the low latency operation.

The beacon frame may further include a quiet information element for protecting the TWT SP for the low latency operation, and an interval configured by the quiet information element and the TWT SP for the low latency operation may have an identical start time.

The quiet information element may be included in a control frame and/or a management frame (e.g., a probe response frame) as well as the beacon frame, and then be transmitted.

In addition, when the interval configured by the quiet information element and a part or an entirety of the TWT SP for the latency operation overlap with each other, a part or an entirety of an overlapping part of the interval configured by the quiet information element may be disregarded. That is, as described above, the non-AP STA may recognize that a quiet interval configured by the quiet information element does not overlap with the TWT SP for the low latency operation.

The interval configured by the quiet information element may be used for at least one STA to configure a NAV. That is, the NAV may be configured for the interval configured by the quiet information element.

When the value of the particular field is configured to be a second particular value, the particular field may indicate that transmission is restricted only in a type of a response frame for a downlink frame.

The beacon frame may further include a parameter field including a broadcast TWT information field, and the broadcast TWT information field may include information related to a TID for which frame transmission is restricted by the TWT for the low latency operation.

When the non-AP STA configures a multi-link device (MLD), the MLD may be unable to transmit a frame through another link while receiving the beacon frame.

An operation of transmitting a frame may be terminated before a start time of the TWT SP for the low latency operation.

The above description of the present disclosure is used for exemplification, and those skilled in the art would understand that the present disclosure can be easily modified to other detailed forms without changing the technical idea or an essential feature thereof. Thus, it is to be appreciated that the embodiments described above are intended to be illustrative in every sense, and not restrictive. For example, each element described as a single type may be implemented to be distributed and similarly, elements described to be distributed may also be implemented in an associated form.

The scope of the present disclosure is represented by the claims to be described below rather than the detailed description, and it is to be interpreted that the meaning and scope of the claims and all the changes or modified forms derived from the equivalents thereof come within the scope of the present disclosure.

The invention claimed is:

1. A non-access point station (non-AP STA) configured to operate in a wireless communication system, the non-AP STA comprising:

a communication module; and a processor configured to control the communication module, wherein the processor is configured to:

receive a management frame including a target wake time (TWT) element related to scheduling a restricted TWT service period (R-TWT SP) and a quiet element related to a quiet interval from an access point (AP), wherein the R-TWT SP indicates a TWT SP in which transmission of a latency sensitive traffic is prioritized, wherein the quiet interval indicates a duration in which no transmission occurs, and wherein the TWT element includes a TWT request type field including a specific field indicating a type of a frame transmitted during the TWT SP, and when the R-TWT SP is configured to the non-AP STA, receive or transmit the latency sensitive traffic according to a first specific value of the specific field, wherein the quiet interval is ignored based on whether the quiet interval overlaps with the R-TWT SP.

2. The non-AP STA of claim 1, wherein the quiet interval is ignored, and the latency sensitive traffic is transmitted or received according to the first specific value during the R-TWT SP when the quiet interval overlaps with the R-TWT SP.

3. The non-AP STA of claim 1, wherein the quiet interval is ignored based on a result of a comparison between a first time point of the R-TWT SP based on the TWT element and a second time point of the quiet interval based on the quiet element.

4. The non-AP STA of claim 3, wherein the first time point is a start time of the R-TWT SP, and wherein the second time point is a start time of the quiet interval.

5. The non-AP STA of claim 3, wherein the quiet interval is ignored when the first time point and the second time point are the same.

6. The non-AP STA of claim 3, wherein non-AP STAs scheduled for quiet intervals by the AP set network allocation vectors (NAVs) for the quiet intervals.

7. The non-AP STA of claim 6, wherein the first specific value indicates that transmission of the latency sensitive traffic is prioritized during the R-TWT SP.

8. The non-AP STA of claim 1, wherein a second specific value of the specific field indicates that transmission of frames of a feedback type is prioritized during a specific TWT SP.

9. The non-AP STA of claim 1, wherein the TWT element further includes a TWT information field including information related to a TID for the latency sensitive traffic.

10. The non-AP STA of claim 1, wherein, when the non-AP STA is affiliated with a multi-link device (MLD), the MLD is unable to transmit, link device (MLD), the MLD is unable to transmit, while receiving the management frame on a specific link, a frame on a link other than the specific link.

11. The non-AP STA of claim 1, wherein a transmission process by the non-AP STA ends before a start time of the R-TWT SP when the transmission process is performed before the R-TWT SP.

12. A method of transmitting a frame by a non-access point station (non-AP STA) configured to operate in a wireless communication system, the method comprising:

receiving a management frame including a target wake time (TWT) element related to scheduling a restricted TWT service period (R-TWT SP) and a quiet element related to a quiet interval from an access point, AP, wherein the R-TWT SP indicates a TWT SP in which transmission of a latency sensitive traffic is prioritized, wherein the quiet interval indicates a duration in which no transmission occurs, and wherein the TWT element includes a TWT request type field including a specific field indicating a type of a frame transmitted during the TWT SP; and when the R-TWT SP is configured to the non-AP STA, receiving or transmitting the latency sensitive traffic according to a first specific value of the specific field, wherein the quiet interval is ignored based on whether the quiet interval overlaps with the R-TWT SP.

13. The method of claim 12, wherein the quiet interval is ignored, and the latency sensitive traffic is transmitted or received according to the first specific value during the R-TWT SP when the quiet interval overlaps with the R-TWT SP.

14. The method of claim 12, wherein the quiet interval is ignored based on a result of a comparison between a first time point of the R-TWT SP based on the TWT element and a second time point of the quiet interval based on the quiet element.

15. The method of claim 14, wherein the first time point is a start time of the R-TWT SP, and wherein the second time point is a start time of the quiet interval.

16. The method of claim 14, wherein the quiet interval is ignored when the first time point and the second time point are the same.

17. The method of claim 14, wherein non-AP STAs scheduled for quiet intervals by the AP set network allocation vectors (NAVs) for the quiet intervals.

18. The method of claim 17, wherein the first specific value indicates that transmission of the latency sensitive traffic is prioritized during the R-TWT SP.

19. The method of claim 12, wherein a second specific value of the specific field indicates that transmission of frames of a feedback type is prioritized during a specific TWT SP.

20. The method of claim 12, wherein the TWT element further includes a TWT information field including information related to a TID for the latency sensitive traffic.

21. The method of claim 12, wherein, when the non-AP STA is affiliated with a multi-link device (MLD), the MLD is unable to transmit, while receiving the management frame on a specific link, a frame on a link other than the specific link.

22. The method of claim 12,
wherein a transmission process by the non-AP STA ends
before a start time of the R-TWT SP when the trans-
mission process is performed before the R-TWT SP.

* * * * *